(12) United States Patent
Fujiwara et al.

(10) Patent No.: US 7,062,477 B2
(45) Date of Patent: Jun. 13, 2006

(54) INFORMATION-PROCESSING APPARATUS, INFORMATION-PROCESSING METHOD AND STORAGE MEDIUM

(75) Inventors: Yoshihito Fujiwara, Kanagawa (JP); Masako Matsubayashi, Tokyo (JP); Naoya Kurami, Tokyo (JP); Hisao Nishioka, Chiba (JP); Yasuyoshi Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 576 days.

(21) Appl. No.: 09/975,799

(22) Filed: Oct. 11, 2001

(65) Prior Publication Data
US 2002/0091875 A1 Jul. 11, 2002

(30) Foreign Application Priority Data
Oct. 12, 2000 (JP) ............................. 2000-312329

(51) Int. Cl.
*G06F 15/18* (2006.01)
(52) U.S. Cl. .......................................... 706/21; 725/46
(58) Field of Classification Search ................. 706/21; 725/46
See application file for complete search history.

(56) References Cited
U.S. PATENT DOCUMENTS

| | | | | | |
|---|---|---|---|---|---|
| 5,790,801 A | * | 8/1998 | Funato | ........................ | 709/229 |
| 5,857,073 A | * | 1/1999 | Tsukamoto et al. | ......... | 709/208 |
| 5,864,670 A | * | 1/1999 | Hayashi et al. | ............. | 709/204 |
| 5,958,059 A | * | 9/1999 | Oishi | ......................... | 713/323 |
| 6,433,893 B1 | * | 8/2002 | Murayama | ................... | 358/434 |
| 6,470,337 B1 | * | 10/2002 | Nihei | ............................. | 707/5 |
| 6,530,083 B1 | * | 3/2003 | Liebenow | ..................... | 725/46 |
| 6,549,939 B1 | * | 4/2003 | Ford et al. | ................... | 709/217 |
| 6,559,964 B1 | * | 5/2003 | Tsukamoto et al. | ........ | 358/1.15 |
| 6,667,813 B1 | * | 12/2003 | Saruwatari et al. | ........ | 358/1.15 |
| 6,731,410 B1 | * | 5/2004 | Saito et al. | .................. | 358/468 |

* cited by examiner

*Primary Examiner*—George Davis
(74) *Attorney, Agent, or Firm*—Finnegan, Henderson, Farabow, Garrett & Dunner, L.L.P.

(57) ABSTRACT

In order to increase a response rate, a data mining server selects an advertisement mail among a plurality of advertisement mails to be sent in a test transmission to personal computers selected at random among those owned by registered customers. The data mining server then computes learning parameters for each of sent advertisement mails from learning data created from response results of the test transmissions. Then, the data mining server applies learning parameters of each advertisement mail to original assessment data of other personal computers each serving as an object of an actual transmission to find predicted values. Subsequently, the data mining server extracts assessment data with largest advertisement-mail predicted values from the original assessment data. The data mining server then synthesizes the extracted pieces of assessment data. Finally, the data mining server sorts the synthesized pieces of assessment data in an order of decreasing customer predicted values to create an assessment chart.

15 Claims, 60 Drawing Sheets

| PROFILE ITEM / CUSTOMER ID | DEMOGRAPHIC INFORMATION | | | | | | PRODUCT/SERVICE PURCHASE/ UTILIZATION HISTORY | | | | PERSONAL CHARACTERISTIC DATA | | | | | |
|---|---|---|---|---|---|---|---|---|---|---|---|---|---|---|---|---|
| | NAME | PHONE NUMBER | ADDRESS CODE | GENDER | AGE | FAMILY CODE | INCOME CODE | PRODUCT CODE | PURCHASE DATE | PRODUCT CODE | ... | QUESTION 1 | QUESTION 2 | QUESTION 3 | ... | QUESTION 17 | QUESTION 18 | ... |
| 100,000,001 | ANDOH | 2544 | 27 | 1 | 35 | 2 | 3 | 3 | 1999.4.01 | 7 | ... | 5 | 3 | 4 | ... | 2 | 1 | ... |
| 100,000,002 | TANAKA | 2878 | 32 | 1 | 24 | 4 | 4 | 7 | 1999.4.03 | 6 | ... | 4 | 2 | 1 | ... | 3 | 4 | ... |
| 100,000,003 | YAMASHITA | 1112 | 14 | 2 | 47 | 1 | 6 | 7 | 1999.4.15 | 4 | ... | 5 | 1 | 1 | ... | 5 | 4 | ... |
| 100,000,004 | SUZUKI | 7847 | 41 | 1 | 18 | 3 | 0 | 2 | 1999.5.17 | 4 | ... | 2 | 1 | 3 | ... | 1 | 5 | ... |
| 100,000,005 | SAITOH | 6245 | 22 | 2 | 33 | 3 | 2 | 1 | 1999.5.08 | 8 | ... | 5 | 1 | 5 | ... | 3 | 3 | ... |
| . | . | . | . | . | . | . | . | . | . | . | | . | . | . | | . | . | |
| 109,999,998 | YAMADA | 1383 | 27 | 2 | 42 | 4 | 3 | 7 | 2001.7.17 | 5 | ... | 1 | 2 | 1 | ... | 3 | 2 | . |
| 109,999,999 | SHIMIZU | 2998 | 13 | 1 | 51 | 2 | 8 | 7 | 2001.8.27 | 4 | ... | 2 | 4 | 5 | ... | 2 | 4 | . |
| 110,000,000 | KAWASAKI | 6555 | 12 | 1 | 21 | 1 | 2 | 6 | 2001.9.12 | 2 | ... | 5 | 5 | 4 | ... | 4 | 5 | . |

FIG.2

| PROFILE ITEM / CUSTOMER ID | DEMOGRAPHIC INFORMATION | | | | | | PRODUCT/SERVICE PURCHASE/ UTILIZATION HISTORY | | | | PERSONAL CHARACTERISTIC DATA | | | | | | |
|---|---|---|---|---|---|---|---|---|---|---|---|---|---|---|---|---|---|
| | NAME | PHONE NUMBER | ADDRESS CODE | GENDER | AGE | FAMILY CODE | INCOME CODE | PRODUCT CODE | PURCHASE DATE | PRODUCT CODE | ... | QUESTION 1 | QUESTION 2 | QUESTION 3 | ... | QUESTION 17 | QUESTION 18 |
| 100,000,001 | ANDOH | 2544 | 27 | 1 | 35 | 2 | 3 | 3 | 1999.4.01 | 7 | ... | 5 | 3 | 4 | ... | 2 | 1 |
| 100,000,002 | TANAKA | 2878 | 32 | 1 | 24 | 4 | 4 | 7 | 1999.4.03 | 6 | ... | 4 | 2 | 1 | ... | 3 | 4 |
| 100,000,003 | YAMASHITA | 1112 | 14 | 2 | 47 | 1 | 6 | 7 | 1999.4.15 | 4 | ... | 5 | 1 | 1 | ... | 5 | 4 |
| 100,000,004 | SUZUKI | 7847 | 41 | 1 | 18 | 3 | 0 | 2 | 1999.5.17 | 4 | ... | 2 | 1 | 3 | ... | 1 | 5 |
| 100,000,005 | SAITOH | 6245 | 22 | 2 | 33 | 3 | 2 | 1 | 1999.5.08 | 8 | ... | 5 | 1 | 5 | ... | 3 | 3 |
| ... | ...... | ...... | ...... | ...... | ...... | ...... | ...... | ...... | ...... | ...... | ...... | ...... | ...... | ...... | ...... | ...... | ...... |
| 109,999,998 | YAMADA | 1383 | 27 | 2 | 42 | 4 | 3 | 7 | 2001.7.17 | 5 | ... | 1 | 2 | 1 | ... | 3 | 2 |
| 109,999,999 | SHIMIZU | 2998 | 13 | 1 | 51 | 2 | 8 | 7 | 2001.8.27 | 4 | ... | 2 | 4 | 5 | ... | 2 | 4 |
| 110,000,000 | KAWASAKI | 6555 | 12 | 1 | 21 | 1 | 2 | 6 | 2001.9.12 | 2 | ... | 5 | 5 | 4 | ... | 4 | 5 |

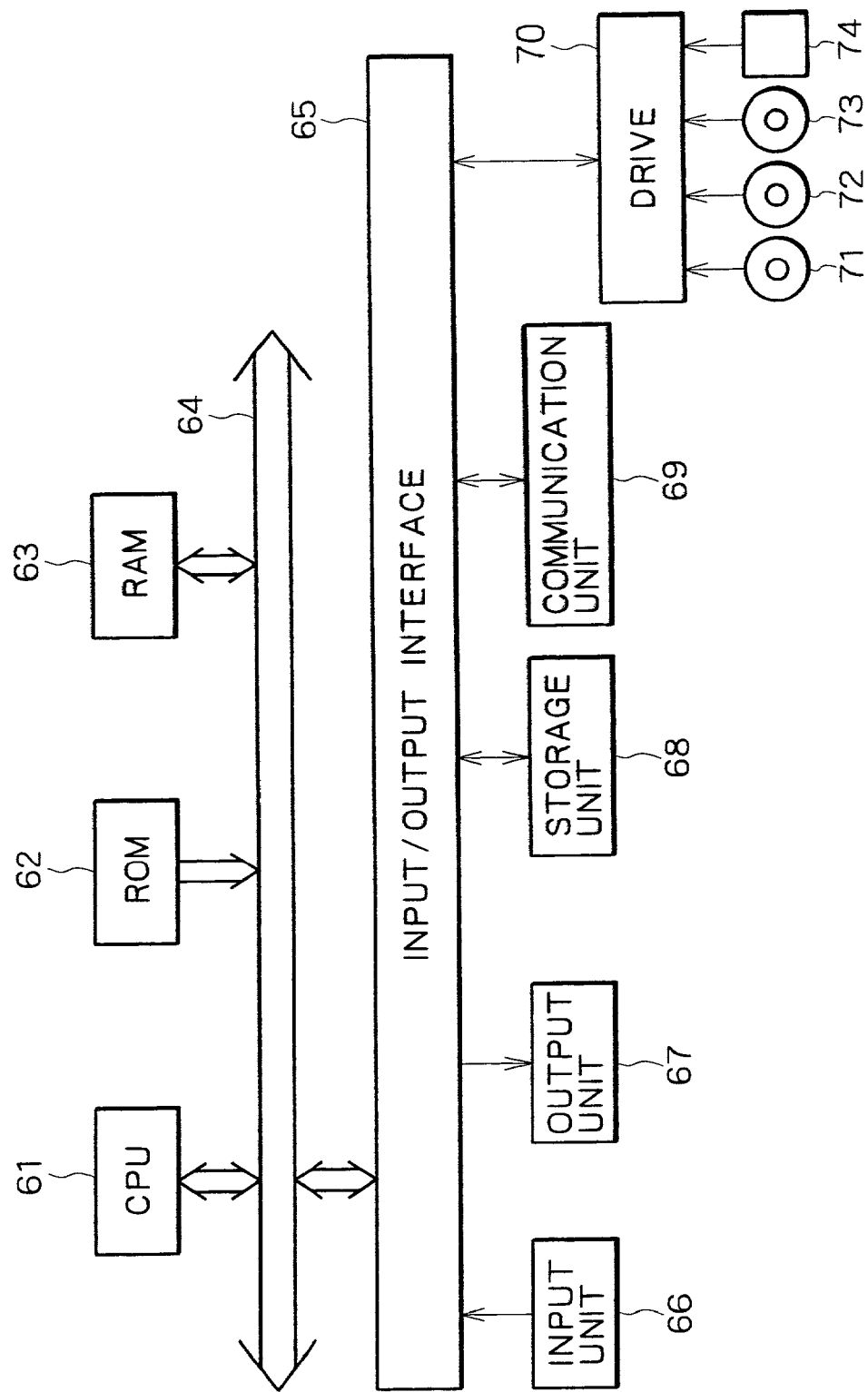

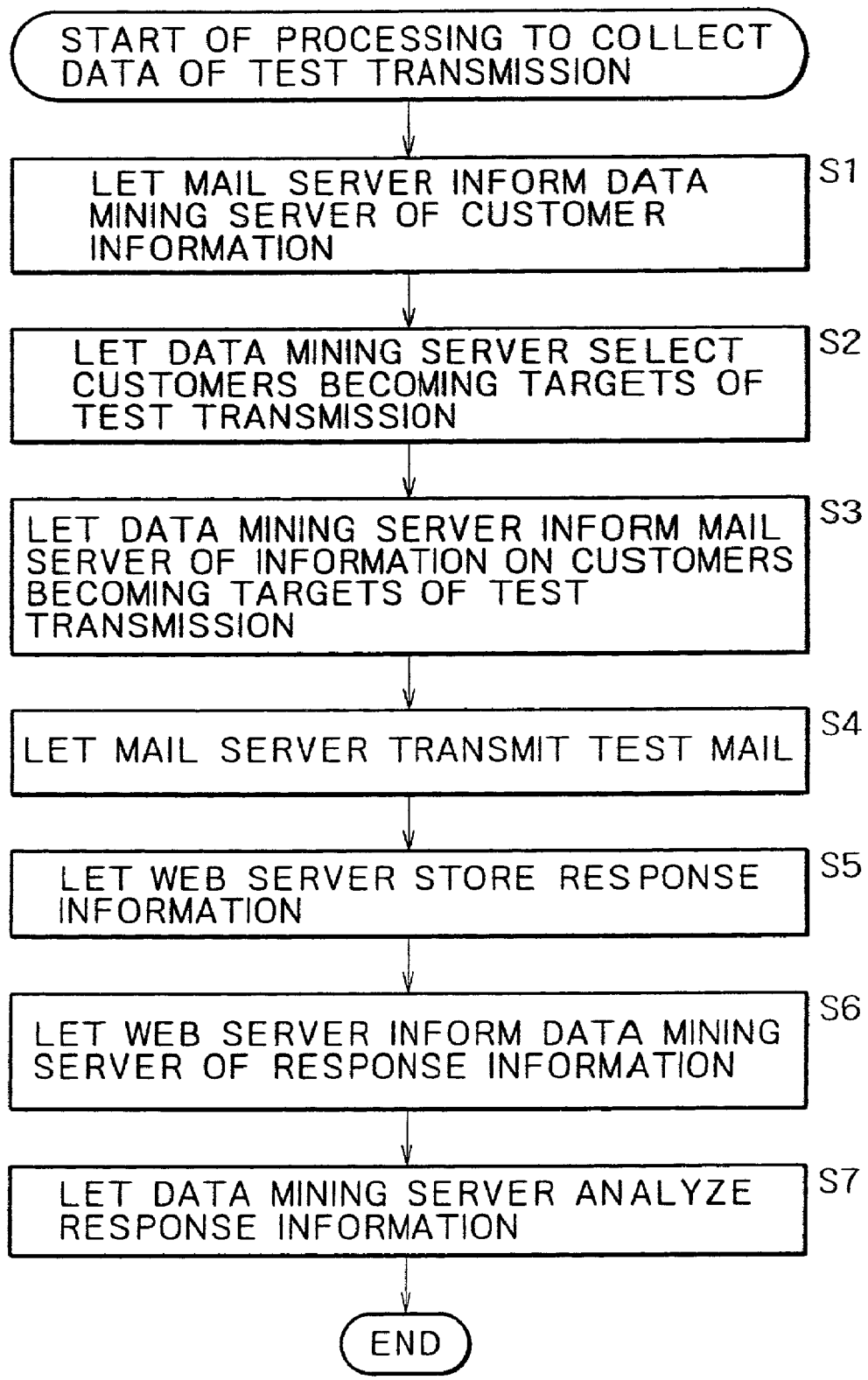

FIG. 7A

[TEST 1: CONFERENCE ROOM RENEWAL]

```
=ANNOUNCEMENT=================================================
  OASIS OF ELECTRONIC BRAINS:THE ABC MEETING ROOM HAS BEEN
  REMODELED INTO A COMPLETELY CONVENIENT MEETING PLACE.
===============================================================
  WHY DON'T YOU TRY TO ESCAPE FROM NOISES OF A BIG CITY, DELICATE
HUMAN RELATIONS AND MODERN LIVES CAUSING STRESS TO BE ACCUMULATED ?
  THE ABC MEETING ROOM UNRAVELS DAY-TO-DAY STRAINS, BEING FILLED UP
WITH THEMES THAT CAN SOFTEN THE ATMOSPHERE FOR YOUR MINDS.
  YOU WHO NEVER UTILIZED THIS MEETING ROOM OR HAVE NOT USED IT FOR A
LONG TIME ARE WELCOMED TO MAKE USE OF THIS PARTICULAR MOMENT.
ITS URL IS GIVEN BELOW:
http://www.ABC.com/Scripts/mail/mk.aps?=745383
```

MAIL A1 (COPY: PEACE OF MIND)

FIG. 7B

```
=ANNOUNCEMENT=================================================
  THE ABC MEETING ROOM WHICH ALWAYS CAUSES NERVOUSNESS AND HEART
BEATINGS HAS BEEN REMODELED INTO A COMPLETELY CONVENIENT MEETING
PLACE.
===============================================================
  DON'T YOU FEEL BORED BY MONOTONOUS DAYS AND HUMDRUM DAY-TO-DAY
LIVES ?  IN THE ABC MEETING ROOM WHERE PEOPLE WORKING IN A VARIETY
OF FIELDS, THERE SHOULD BE FRESH FINDINGS THAT MAKE YOUR HEART BEAT.
  YOU WHO NEVER UTILIZED THIS MEETING ROOM OR HAVE NOT USED IT FOR
A LONG TIME ARE WELCOMED TO MAKE USE OF THIS PARTICULAR MOMENT.
ITS URL IS GIVEN BELOW:
http://www.ABC.com/Scripts/mail/mk.asp?=745383
```

MAIL B1 (COPY: EXCITEMENTS)

FIG. 7C

```
=ANNOUNCEMENT=================================================
  A PLACE OF INTERCHANGES AMONG STRANGERS:THE ABC MEETING ROOM HAS
BEEN REMODELED INTO A COMPLETELY CONVENIENT MEETING PLACE.
===============================================================
  DO YOU SOMETIMES THINK OF WHAT OTHERS HAVE IN THEIR MINDS ?  OR,
DO YOU SOMETIMES WANT TO EXPRESS YOUR THOUGHTS TO OTHERS ?
  THE ABC MEETING ROOM IS A PLACE FOR COLLABORATIONS AMONG PEOPLE
WHO SHARE SIMILAR HOBBIES OR EXPERIENCE THE SAMEGRIEVANCES. THE ABC
MEETING ROOM SERVES AS A HAPPY PLACE OF MEETINGS FOR PEOPLE THROUGH
A NETWORK.
  YOU WHO NEVER UTILIZED THIS MEETING ROOM OR HAVE NOT USED IT FOR
A LONG TIME ARE WELCOMED TO MAKE USE OF THIS PARTICULAR MOMENT.
ITS URL IS GIVEN BELOW:
http://www.ABC.com/Scripts/mail/mk.asp?=745383
```

MAIL C1 (COPY: TOUCHING HEARTS OF EACH OTHER)

FIG. 8A

```
=ANNOUNCEMENT=================================================
  THE ABC MEETING ROOM FILLED UP WITH STYLISH HEARTS HAS BEEN
REMODELED INTO A COMPLETELY CONVENIENT MEETING PLACE.
==============================================================
  YOU MAY HAVE BEEN ASKED A QUESTION AS TO HOW YOU MAKE USE OF
THE INTERNET. YOU WHO WANT TO BE IN THE HEIGHT OF FASHION SHOULD
BE DISSATISFIED WITH ONLY ELECTRONIC MAILS AND WEB HOME PAGES.
THE ABC MEETING ROOM IS A FASHIONABLE COMMUNICATION TOOL THROUGH
A NETWORK.
  YOU WHO NEVER UTILIZED THIS MEETING ROOM OR HAVE NOT USED IT FOR
A LONG TIME ARE WELCOMED TO MAKE USE OF THIS PARTICULAR MOMENT.
ITS URL IS GIVEN BELOW:
http://www.ABC.com/Scripts/mail/mk.asp?=745383
```

MAIL D1(COPY:STYLISH)

FIG. 8B

```
=ANNOUNCEMENT=================================================
  THE ABC MEETING CHARGING NO RENTAL FEE HAS BEEN REMODELED INTO
A COMPLETELY CONVENIENT MEETING PLACE.
==============================================================
  NO WASTEFUL EXPENSE IS INCURRED WHATSOEVER.
  NEVERTHELESS, YOU CANNOT GET USEFUL INFORMATION YOU DESIRE BY
DOING NOTHING. IN THE ABC MEETING ROOM, YOU MAY BE ABLE TO GET
USEFUL INFORMATION THROUGH EXCHAGES OF INFORMATION WITH PEOPLE
LIVING IN JAPAN.
  YOU WHO NEVER UTILIZED THIS MEETING ROOM OR HAVE NOT USED IT FOR
A LONG TIME ARE WELCOMED TO MAKE USE OF THIS PARTICULAR MOMENT.
ITS URL IS GIVEN BELOW:
http://www.ABC.com/Scripts/mail/mk.asp?=745383
```

MAIL E1 (COPY:MAKING PROFITS)

FIG. 9A

[ TEST2 : MOVIE WEB RENEWAL ]

```
================================================================
  DIDN'T YOU OVERLOOK MOVIES BECOMING TOPICS OF CONVERSATIONS IN
THIS SUMMER??  THE ABC CINEMA-INFORMATION HOME PAGE HAS BEEN
RENEWED.
================================================================
  IN THE MIDST OF THIS SUMMER VACATION, HAVE YOU CHECKED NEWEST
MOVIES INTRODUCED AND BECOMING TOPICS OF CONVERSATIONS IN THIS
SUMMER? YOU WHO HAVE NOT CHECKED SUCH MOVIES, OPEN THE HOME PAGE
FOR MOVIE INFORMATION NOW!  GET INFORMATION ON MOST RECENT
MOVIES INCLUDING "BEST 10" OF HIT MOVIES! THE ABC CINEMA-
INFORMATION HOME PAGE NOW HAS MORE AREAS SERVING AS OBJECTS OF
PUBLICATIONS: 53 AREAS THROUGHOUT THE COUNTRY.
  INFORMATION ON MOVIE THEATERS IN YOUR CITY SHOULD BE INCLUDED.
CLICK THE FOLLOWING URL NOW!:
http://www.ABC.com/cinema
```

<u>MAIL A2(COPY:FASHIONS)</u>

FIG. 9B

```
================================================================
  MOVIE FANS INTERESTED IN VERY REAL THINGS MUST BE SATISFIED!:
THE ABC CINEMA-INFORMATION HOME PAGE HAS BEEN RENEWED.
================================================================
  WHAT DO YOU USE AS A BASE FOR SELECTING A MOVIE YOU WANT? THE
DERECTOR, FILM STARS OR THE SCENARIO?
  THE CINEMA-INFORMATION HOME PAGE IS FILLED UP WITH INFOLMATION
SATISFYING YOUR DESIRE, FROM INFORMAATION KEPT IN HOLLYWOOD TO
INFORMATION ON MINI THEATERS SHOWING MOVIES BECOMING TOPICS OF
CONVERSATIONS!
IN THIS SUMMER, THE NUMBER OF AREAS SERVING AS OBJECTS OF PUBLI-
CATIONS IN THE ABC CINEMA-INFORMATION HAS BEEN INCREASED TO 53
THROUGHOUT THE COUNTRY!
INFORMATION ON MOVIE THEATERS IN YOUR CITY SHOULD BE INCLUDED.
CLICK THE FOLLOWING URL NOW!:
http://www.ABC.com/cinema
```

<u>MAIL B2 (COPY:REAL THINGS)</u>

FIG. 9C

```
================================================================
  INFORMATION ON MOVIES CAN BE OBTAINED IMMEDIATELY AND EASILY!!:
THE ABC CINEMA-INFORMATION HOME PAGE HAS BEEN RENEWED.
================================================================
  WHEN YOU DESIRE TO WATCH A MOVIE, YOU MAY HAVE A PROBLEM THAT
YOU DO NOT KNOW WHAT MOVIES ARE NOW SHOWN IN MOVIE THEATERS AND
WHERE THE MOVIE THEATERS ARE LOCATED.
  AT THAT TIME, THE CINEMA-INFORMATION HOME PAGE PROVIDES YOU
WITH A SOLUTION IMMEDIATELY.
  IN THIS SUMMER, THE NUMBER OF AREAS SERVING AS OBJECTS OF
PUBLICATIONS IN THE ABC CINEMA-INFORMATION HAS BEEN INCREASED
TO 53 THROUGHOUT THE COUNTRY!
  INFORMATION ON MOVIE THEATERS IN YOUR CITY SHOULD BE INCLUDED.
CLICK THE FOLLOWING URL NOW!:
http://www.ABC.com/cinema
```

MAIL C2(COPY:CONVENIENCE)

FIG. 10A

```
================================================================
  WHY DON'T YOU FEEL AT LEISURE BY WATCHING MOVIES IN THIS SUMMER
VACATION??:
  THE ABC CINEMA-INFORMATION HOME PAGE HAS BEEN RENEWED.
================================================================
  PEOPLE IN GENERAL ARE ENJOYING THE SUMMER VACATION OR THE
LANTERN-FESTIVAL HOLIDAYS. HOWEVER, YOU MAY HAVE TO STUDY OR WORK
HARD EVERYDAY SO THAT YOU CANNOT HAVE THE VACATION OR THE
HOLIDAYS. IN THIS CASE, WHY DON'T YOU FEEL AT LEISURE BY WATCHING
MOVIES SOMETIMES ?  YOU CAN SEARCH THE CINEMA-INFORMATION HOME
PAGE FOR A MOVIE THEATER CLOSE TO WHERE YOU LIVE, A MOVIE THAT
YOU ARE NOT FAMILIAR WITH EVEN THOUGH SERVES AS A TOPIC OF
CONVERSATIONS, OR A MOVIE YOU EXACTLY DESIRE TO WATCH!
  IN THIS SUMMER, THE NUMBER OF AREAS SERVING AS OBJECTS OF
PUBLICATIONS IN THE ABC CINEMA-INFORMATION HAS BEEN INCREASED TO
53 THROUGHOUT THE COUNTRY.
  INFORMATION ON MOVIE THEATERS IN YOUR CITY SHOULD BE INCLUDED.
CLICK THE FOLLOWING URL NOW!:
  http://www.ABC.com/cinema
```

MAIL D2 (COPY:PEACE OF MIND)

FIG. 10B

```
================================================================
  GET INFORMATION ON SUSPENSE MOVIES, MOVIES CAUSING HEARTS TO
BEAT OR EXCITING MOVIES!  THE ABC CINEMA-INFORMATION HOME PAGE
HAS BEEN RENEWED.
================================================================
  RADICAL ACTIONS AND BARGAIN FOR PASSIONATE LOVE!
  YOU WHO FEEL THAT EXCITEMENTS ARE SOMEWHAT INSUFFICIENT RECENTLY
ARE SUGGESTED TO GO TO A MOVIE THEATER FOR REFRESHING YOUR BODY
AND MIND.  THE CINEMA-INFORMATION HOME PAGE CERTAINLY PROVIDES
YOU WITH INFORMATION ON SUSPENSE MOVIES AND MOVIES CAUSING
HEARTS TO BEAT.
  INTHIS SUMMER, THE NUMBER OF AREAS SERVING AS OBJECTS OF
PUBLICATIONS IN THE ABC CINEMA-INFORMATION HAS BEEN INCREASED TO
53 THROUGHOUT THE COUNTRY!
  INFORMATION ON MOVIE THEATERS IN YOUR CITY SHOULD BE INCLUDED.
CLICK THE FOLLOWING URL NOW!:
  http://www.ABC.com/cinema
```

MAIL E2 (COP:EXCITEMENTS)

FIG. 11A

[ TEST3:MAGAZINE INFORMATION WEB RENEWAL ]

```
================================================================
 LET US ENJOY HUNG ADVERTISEMENTS PLACED IN THE NETWORK!!:
 THE MAGAZINE-INFORMATION HOME PAGE HAS BEEN RENEWED TOTALLY.
================================================================
  THE ABC MAGAZINE-INFORMATION HOME PAGE IS EXACTLY A HUNG
 ADVERTISMENT IN THE NETWORK. IT IS A REFRESHING MEDICINE SUITABLE
 FOR PEOPLE SUFFERING FROM WORK AND STUDY FATIGUES. WHY DON'T YOU
 TAKE A DOSE OF SUCH MEDICINE BY LOOKING AT THE MAGAZINE-
 INFORMATION HOME PAGE INCLUDING SPECIAL ARTICLES OF ABOUT 100
 MAGAZINES AND INFORMATION RECOMMENDED BY ABC STAFFS.
   ITS URL IS GIVEN BELLOW:
  http://www.ABC.com/Magazine
```

MAIL A3 (COPY:PEACE OF MIND)

FIG. 11B

```
================================================================
  INTENTIONS OF INFORMATION WRITTEN IN 100 MAGAZINES ARE EXPRESSED
 AS THEY ARE!: THE MAGAZINE-INFORMATION HOME PAGE HAS BEEN TOTALLY
 RENEWED.
================================================================
  THE AMOUNT OF INFORMATION INCLUDED IN THE MAGAZINE-INFORMATION
 HOME PAGE HAS BEEN INCREASED! YOU CAN SEARCH SPECIAL ARTICLES
 PRESENTED BY ABOUT 100 MAGAZINES FOR ONE YOU DESIRE AS YOU PLEASE.
 THE HOME PAGE PRESENTS MULTIPLE-ATTRACTION MAGAZINE INFORMATION
 INCLUDING ARTICLES PROVIDED OR RECOMMENDED BY ABC STAFFS. WHY
 DON'T YOU PLAY SURFING!! HERE IS THE ENTRANCE:
  http://www.ABC.com/Magazine
```

MAIL B3 (COPY:HANDLE)

FIG. 11C

```
================================================================
  DON'T OVERLOOK ARTICLES WEIGHING ON YOUR MIND! GET THOSE
 ARTICLES: THE MAGAZINE-INFORMATION HOME PAGE HAS BEEN TOTALLY
 RENEWED.
================================================================
  DID YOU EXPERIENCE A TROUBLE, SAYING: "HANG IT, I FORGOT TO BUY
 THAT MAGAZINE!!" IF YOU MAKE USE OF THE ABC MAGAZINE-INFORMATION
 HOME PAGE, YOU WILL BE ABLE TO GET RID OF SUCH A FAILURE.
  BE SENSITIVE TO FASHION BY LOOKING AT THE MAGAZINE-INFORMATION
 HOME PAGE INCLUDING SPECIAL ARTICLES OF ABOUT 100 MAGAZINES AND
 INFORMATION RECOMMENDED BY ABC STAFFS!!
   ITS URL IS GIVEN BELOW:
  http://www.ABC.com/Magazine
```

MAIL C3 (COPY:FASHION)

FIG. 12

| COPY | TRANSMISSION COUNT | RESPONSE COUNT | RESPONSE RATE |
|---|---|---|---|
| A:PEACE OF MIND | 20547 | 156 | 0.76% |
| B:EXCITEMENTS | 20467 | 210 | 1.03% |
| C:TOUCHING HEARTS OF EACH OTHER | 20503 | 266 | 1.30% |
| D:STYLISH | 20488 | 182 | 0.89% |
| E:MAKING PROFITS | 20558 | 210 | 1.02% |
| TOTAL | 102563 | 1024 | 1.00% |

RESPONSE RESULTS OF TEST TRANSMISSION 1

FIG. 13

| COPY | TRANSMISSION COUNT | RESPONSE COUNT | RESPONSE RATE |
|---|---|---|---|
| A:FASHION | 15337 | 105 | 0.68% |
| B:REAL THINGS | 15387 | 108 | 0.70% |
| C:CONVENIENCE | 15335 | 236 | 1.54% |
| D:PEACE OF MIND | 15270 | 117 | 0.77% |
| E:EXCITEMENTS | 15315 | 94 | 0.61% |
| TOTAL | 76644 | 660 | 0.86% |

RESPONSE RESULTS OF TEST TRANSMISSION 2

FIG. 14

| COPY | TRANSMISSION COUNT | RESPONSE COUNT | RESPONSE RATE |
|---|---|---|---|
| A:PEACE OF MIND | 20547 | 101 | 0.49% |
| B:HANDLE | 20467 | 145 | 0.71% |
| C:BE PROVIDED | 20503 | 143 | 0.70% |
| TOTAL | 61517 | 389 | 0.63% |

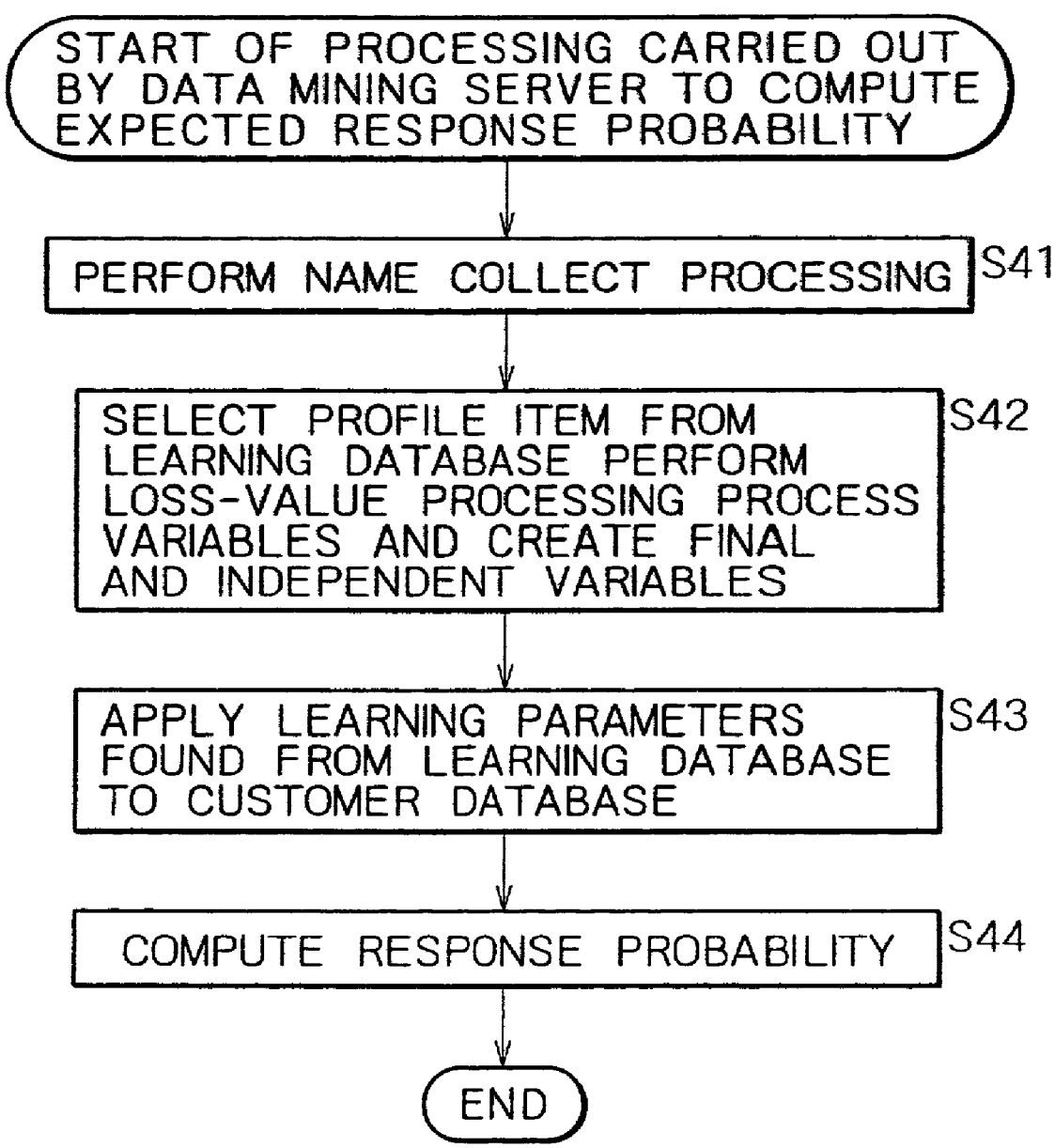

FIG. 18

| CUSTOMER | CUSTOMER PROFILE | EXPECTED RESPONSE PROBABILITY OF CONTENT A | EXPECTED RESPONSE PROBABILITY OF CONTENT B | EXPECTED RESPONSE PROBABILITY OF CONTENT C |
|---|---|---|---|---|
| X | ... | 3.5% | 7.5% | 2.8% |
| Y | ... | 4.5% | 1.2% | 0.5% |
| Z | ... | 0.3% | 0.8% | 1.3% |
| ... | ... | ... | ... | ... |

FIG. 19A

| COPY | TRANSMISSION COUNT |
|---|---|
| A: PEACE OF MIND | 8114 |
| B: EXCITEMENTS | 10402 |
| C: TOUCHING HEARTS OF EACH OTHER | 27573 |
| D: STYLISH | 9046 |
| E: MAKING PROFITS | 16350 |

ACTUAL TRANSMISSION 1

FIG. 19B

| COPY | TRANSMISSION COUNT |
|---|---|
| A: FASHION | 4895 |
| B: REAL THINGS | 5917 |
| C: CONVENIENCE | 56649 |
| D: PEACE OF MIND | 2633 |
| E: EXCITEMENTS | 1726 |

ACTUAL TRANSMISSION 2

FIG. 19C

| COPY | TRANSMISSION COUNT |
|---|---|
| A: PEACE OF MIND | 11898 |
| B: HANDLE | 47234 |
| C: BE PROVIDED | 22622 |

ACTUAL TRANSMISSION 3

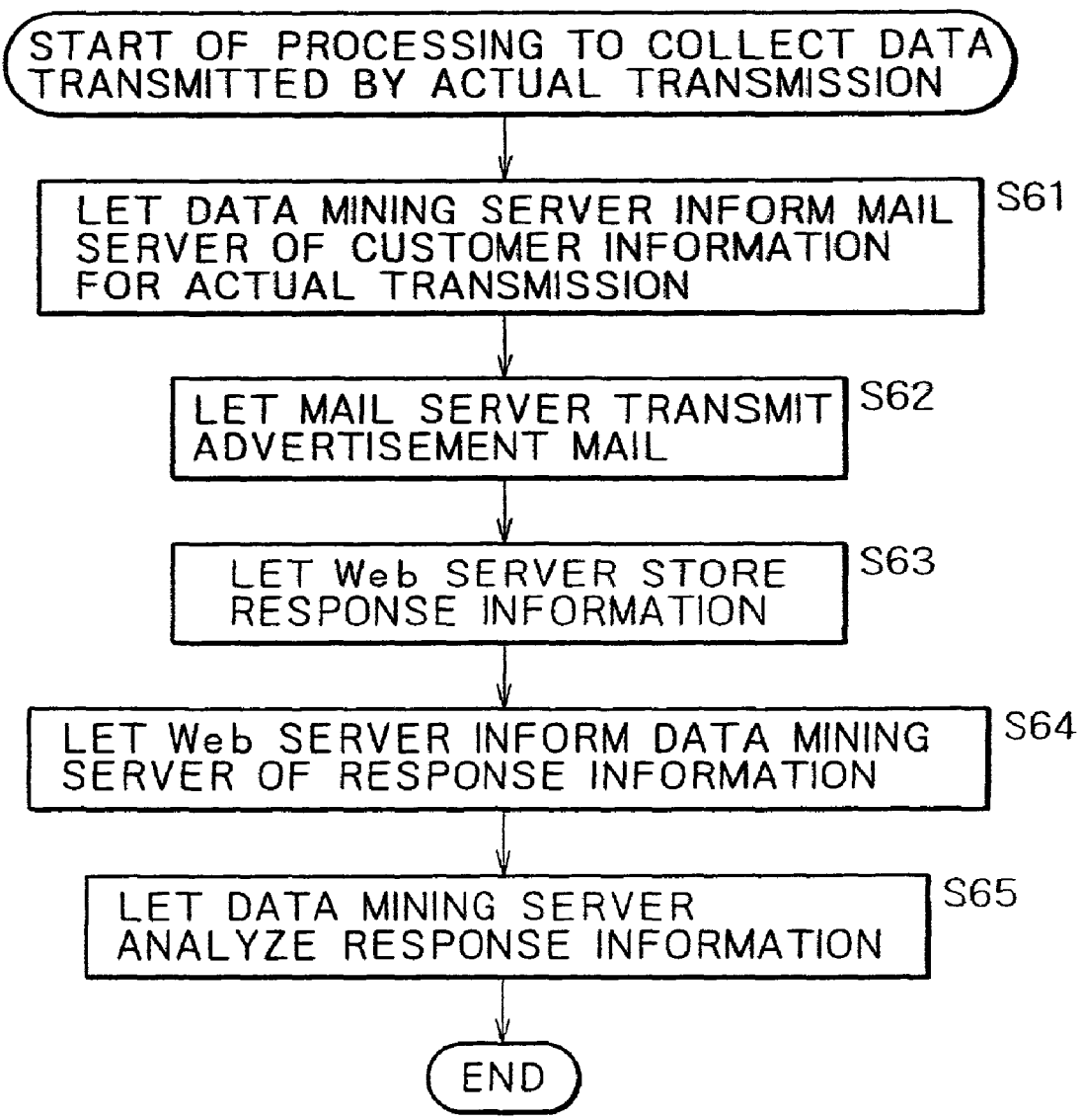

FIG. 21

| COPY | TEST TRANSMISSION 1 | RESPONSE COUNT | RESPONSE RATE | ACTUAL TRANSMISSION A1 | RESPONSE COUNT | RESPONSE RATE | ACTUAL TRANSMISSION B1 | RESPONSE COUNT | RESPONSE RATE |
|---|---|---|---|---|---|---|---|---|---|
| A:PEACE OF MIND | 20547 | 156 | 0.76% | 1141 | 24 | 2.10% | 6973 | 17 | 0.24% |
| B:EXCITEMENTS | 20467 | 210 | 1.03% | 1892 | 98 | 5.18% | 8510 | 52 | 0.61% |
| C:TOUCHING HEARTS OF EACH OTHER | 20503 | 266 | 1.30% | 3648 | 128 | 3.51% | 23925 | 194 | 0.81% |
| D:STYLISH | 20488 | 182 | 0.89% | 2953 | 78 | 2.64% | 6090 | 27 | 0.44% |
| E:MAKING PROFITS | 20558 | 210 | 1.02% | 3795 | 76 | 2.00% | 12555 | 46 | 0.37% |
| TOTAL | 102563 | 1024 | 1.00% | 13429 | 404 | 3.01% | 58053 | 336 | 0.58% |

| COPY | TOTAL ACTUAL TRANSMISSIONS | RESPONSE COUNT | TOTAL |
|---|---|---|---|
| A:PEACE OF MIND | 8114 | 41 | 0.51% |
| B:EXCITEMENTS | 10402 | 150 | 1.44% |
| C:TOUCHING HEARTS OF EACH OTHER | 27573 | 322 | 1.17% |
| D:STYLISH | 9043 | 105 | 1.16% |
| E:MAKING PROFITS | 16350 | 122 | 0.75% |
| TOTAL | 71482 | 740 | 1.04% |

FIG. 22

| COPY | TEST TRANSMISSION 2 | RESPONSE COUNT | RESPONSE RATE | ACTUAL TRANSMISSION 2 | RESPONSE COUNT | RESPONSE RATE | RANDOM | RESPONSE COUNT | RESPONSE RATE |
|---|---|---|---|---|---|---|---|---|---|
| A:FASHION | 15337 | 105 | 0.68% | 4895 | 67 | 1.37% | 5065 | 41 | 0.81% |
| B:REAL THINGS | 15387 | 108 | 0.70% | 5917 | 78 | 1.32% | 5100 | 42 | 0.82% |
| C:CONVENIENCE | 15335 | 236 | 1.54% | 56649 | 754 | 1.33% | 5124 | 81 | 1.58% |
| D:PEACE OF MIND | 15270 | 117 | 0.77% | 2633 | 52 | 1.97% | 5171 | 50 | 0.97% |
| E:EXCITEMENTS | 15315 | 94 | 0.61% | 1726 | 18 | 1.04% | 5121 | 36 | 0.70% |
| TOTAL | 76644 | 660 | 0.86% | 71820 | 969 | 1.35% | 25581 | 250 | 0.98% |

FIG. 23

| COPY | TEST TRANSMISSION 3 | RESPONSE COUNT | RESPONSE RATE | ACTUAL TRANSMISSION A3 | RESPONSE COUNT | RESPONSE RATE | ACTUAL TRANSMISSION B3 | RESPONSE COUNT | RESPONSE RATE |
|---|---|---|---|---|---|---|---|---|---|
| A:PEACE OF MIND | 20547 | 101 | 0.49% | 2820 | 68 | 2.41% | 9078 | 58 | 0.64% |
| B:HANDLE | 20467 | 145 | 0.71% | 14032 | 223 | 1.59% | 33202 | 179 | 0.54% |
| C:BE PROVIDED | 20503 | 143 | 0.70% | 9516 | 170 | 1.79% | 13106 | 71 | 0.54% |
| TOTAL | 61517 | 389 | 0.63% | 26368 | 461 | 1.75% | 55386 | 308 | 0.56% |

| COPY | RANDOM | RESPONSE COUNT | RESPONSE PROBABILITY | TOTAL ACTUAL TRANSMISSIONS 3 | RESPONSE COUNT | TOTAL |
|---|---|---|---|---|---|---|
| A:PEACE OF MIND | 10238 | 67 | 0.65% | 11898 | 126 | 1.06% |
| B:HANDLE | 10250 | 95 | 0.93% | 47234 | 402 | 0.85% |
| C:BE PROVIDED | 10286 | 87 | 0.85% | 22622 | 241 | 1.07% |
| TOTAL | 30774 | 249 | 0.81% | 81754 | 769 | 0.94% |

FIG. 24

| | PEACE OF MIND (COPY A) | EXCITEMENTS (COPY B) | TOUCHING HEARTS OF EACH OTHER (COPY C) | FASHION (COPY D) | MAKING PROFITS (COPY E) |
|---|---|---|---|---|---|
| TOTAL | 0.80 | 1.00 | 1.30 | 0.90 | 1.00 |
| MALES IN THEIR TEENS | 0.00 | 0.61 | 0.28 | 0.58 | 0.54 |
| MALES IN THEIR TWENTIETHS | 0.49 | 0.67 | 1.40 | 0.57 | 0.62 |
| MALES IN THEIR THIRTIES | 0.57 | 0.73 | 0.89 | 0.60 | 1.12 |
| MALES IN THEIR FORTIES | 1.15 | 1.13 | 1.06 | 1.18 | 1.16 |
| MALES IN THEIR FIFTIES | 0.64 | 1.80 | 1.61 | 1.67 | 1.29 |
| MALES IN THEIR SIXTIES | 0.00 | 2.73 | 1.64 | 2.68 | 0.93 |
| FEMALES IN THEIR TEENS | 2.70 | 2.53 | 2.20 | 2.59 | 2.65 |
| FEMALES IN THEIR TWENTIETHS | 1.04 | 1.69 | 1.85 | 1.28 | 1.27 |
| FEMALES IN THEIR THIRTIES | 1.74 | 1.76 | 2.23 | 1.77 | 2.04 |
| FEMALES IN THEIR FORTIES | 1.19 | 1.76 | 3.60 | 2.13 | 1.73 |
| FEMALES IN THEIR FIFTIES | 1.85 | 7.14 | 6.06 | 0.00 | 2.33 |
| FEMALES IN THEIR SIXTIES | 0.00 | 0.00 | 0.00 | 0.00 | 11.11 |

FIG. 25

| | PEACE OF MIND (COPY A) | EXCITEMENTS (COPY B) | TOUCHING HEARTS OF EACH OTHER (COPY C) | FASHION (COPY D) | MAKING PROFITS (COPY E) |
|---|---|---|---|---|---|
| TOTAL | 0.80 | 1.00 | 1.30 | 0.90 | 1.00 |
| ENGINEERS | 0.74 | 1.10 | 1.53 | 0.76 | 1.10 |
| SALES REPRESENTATIVES | 1.08 | 1.56 | 1.98 | 1.50 | 1.32 |
| STUDENTS | 0.65 | 0.59 | 1.24 | 0.85 | 0.55 |
| MANAGERS | 1.32 | 1.71 | 1.43 | 1.18 | 1.50 |
| COMPANY EMPLOYEES | 0.39 | 0.52 | 0.52 | 0.38 | 0.66 |
| PUBLIC SERVANTS | 1.19 | 1.16 | 1.45 | 0.68 | 1.64 |
| SELF-EMPLOED PERSONS | 0.38 | 1.35 | 1.37 | 0.63 | 1.74 |
| HOUSEWIVES | 0.88 | 1.55 | 2.51 | 1.74 | 1.28 |

FIG. 26

| | PEACE OF MIND (COPY A) | EXCITEMENTS (COPY B) | TOUCHING HEARTS OF EACH OTHER (COPY C) | FASHION (COPY D) | MAKING PROFITS (COPY E) |
|---|---|---|---|---|---|
| TOTAL | 0.80 | 1.00 | 1.30 | 0.90 | 1.00 |
| UP TO 5 MILLIONS | 0.56 | 0.90 | 1.26 | 0.50 | 0.62 |
| UP TO 7 MILLIONS | 0.52 | 0.79 | 0.97 | 0.46 | 0.96 |
| UP TO 10 MILLIONS | 0.83 | 0.82 | 1.18 | 0.70 | 0.68 |
| MORE THAN 10 MILLIONS | 0.22 | 1.31 | 0.63 | 0.34 | 0.55 |

FIG. 27

| | PEACE OF MIND (COPY A) | EXCITEMENTS (COPY B) | TOUCHING HEARTS OF EACH OTHER (COPY C) | FASHION (COPY D) | MAKING PROFITS (COPY E) |
|---|---|---|---|---|---|
| TOTAL | 0.80 | 1.00 | 1.30 | 0.90 | 1.00 |
| .ac.jp | 1.26 | 1.04 | 1.24 | 1.22 | 0.80 |
| .co.jp | 1.12 | 1.79 | 1.84 | 1.28 | 1.57 |
| .com | 0.40 | 0.69 | 1.13 | 0.64 | 1.14 |
| .go.jp | 1.22 | 0.80 | 2.08 | 1.56 | 3.57 |
| .ne.jp | 0.68 | 0.32 | 1.22 | 0.77 | 0.88 |
| .net | 0.31 | 1.04 | 1.00 | 1.32 | 0.00 |
| .or.jp | 0.63 | 1.35 | 0.98 | 0.81 | 0.85 |

FIG. 28

| | PEACE OF MIND (COPY A) | EXCITEMENTS (COPY B) | TOUCHING HEARTS OF EACH OTHER (COPY C) | FASHION (COPY D) | MAKING PROFITS (COPY E) |
|---|---|---|---|---|---|
| TOTAL | 0.80 | 1.00 | 1.30 | 0.90 | 1.00 |
| CAR | 0.41 | 0.90 | 1.01 | 0.73 | 0.74 |
| COOK | 0.89 | 1.13 | 1.52 | 1.13 | 1.23 |
| JPOP | 0.82 | 1.08 | 1.42 | 0.99 | 1.13 |
| CLASSIC | 0.81 | 1.14 | 1.01 | 0.82 | 0.87 |
| JAZZ | 0.73 | 1.08 | 1.01 | 1.18 | 1.17 |
| ART | 1.25 | 1.49 | 1.51 | 0.98 | 1.18 |
| BASEBALL | 0.59 | 0.93 | 0.97 | 0.80 | 0.76 |
| FOREIGN | 0.82 | 1.24 | 1.46 | 1.10 | 1.18 |
| HEALTH | 0.85 | 1.40 | 1.35 | 0.99 | 1.19 |
| GARDEN | 1.11 | 1.41 | 2.03 | 1.28 | 1.18 |
| MAKEFA | 1.11 | 1.75 | 2.00 | 1.52 | 1.54 |

FIG. 29

| | PEACE OF MIND (COPY A) | EXCITEMENTS (COPY B) | TOUCHING HEARTS OF EACH OTHER (COPY C) | STYLISH (COPY D) | MAKING PROFITS (COPY E) |
|---|---|---|---|---|---|
| TOTAL | 0.80 | 1.00 | 1.30 | 0.90 | 1.00 |
| INC12746 | 1.94 | 2.15 | 3.43 | 1.58 | 2.27 |
| INA15450 | 5.17 | 7.34 | 7.19 | 5.90 | 5.76 |
| INA14152 | 1.33 | 3.54 | 2.62 | 1.67 | 3.54 |
| INA12711 | 1.21 | 1.52 | 1.59 | 1.75 | 1.94 |
| INA16244 | 3.36 | 5.31 | 4.61 | 4.16 | 3.46 |
| INA14683 | 1.74 | 2.54 | 4.42 | 2.15 | 1.92 |
| INC12874 | 1.51 | 1.87 | 3.53 | 1.85 | 2.97 |

INC12746: THE TIME TABLE IS NO LONGER TURNED OVER...

INA15450: NO DICTIONARY AVAILABLE WHEN THE MEANING OF A WORD IS UNKNOWN. IN THIS CASE, RESORT TO SONET...

INA14152: A COUPON CAN BE PRINTED OUT...

INA12711: DOCOMO PHSES AND 64K SERVICE MONITORS OF 5,000 USERS...

INA16244: FREE SERVICES OF PROVIDING INFORMATION INCLUDING MAPS MAKING DRIVES ENJOYABLE...

INA14683: INVITATION TO A 4- NIGHT AND 6- DAY TRIP TO HAWAII BY DAIEI AND COCA COLA...

INC12874: A BUNCH OF 113 CHRISTMAS SONGS RECORDED IN STORAGE MEDIA...

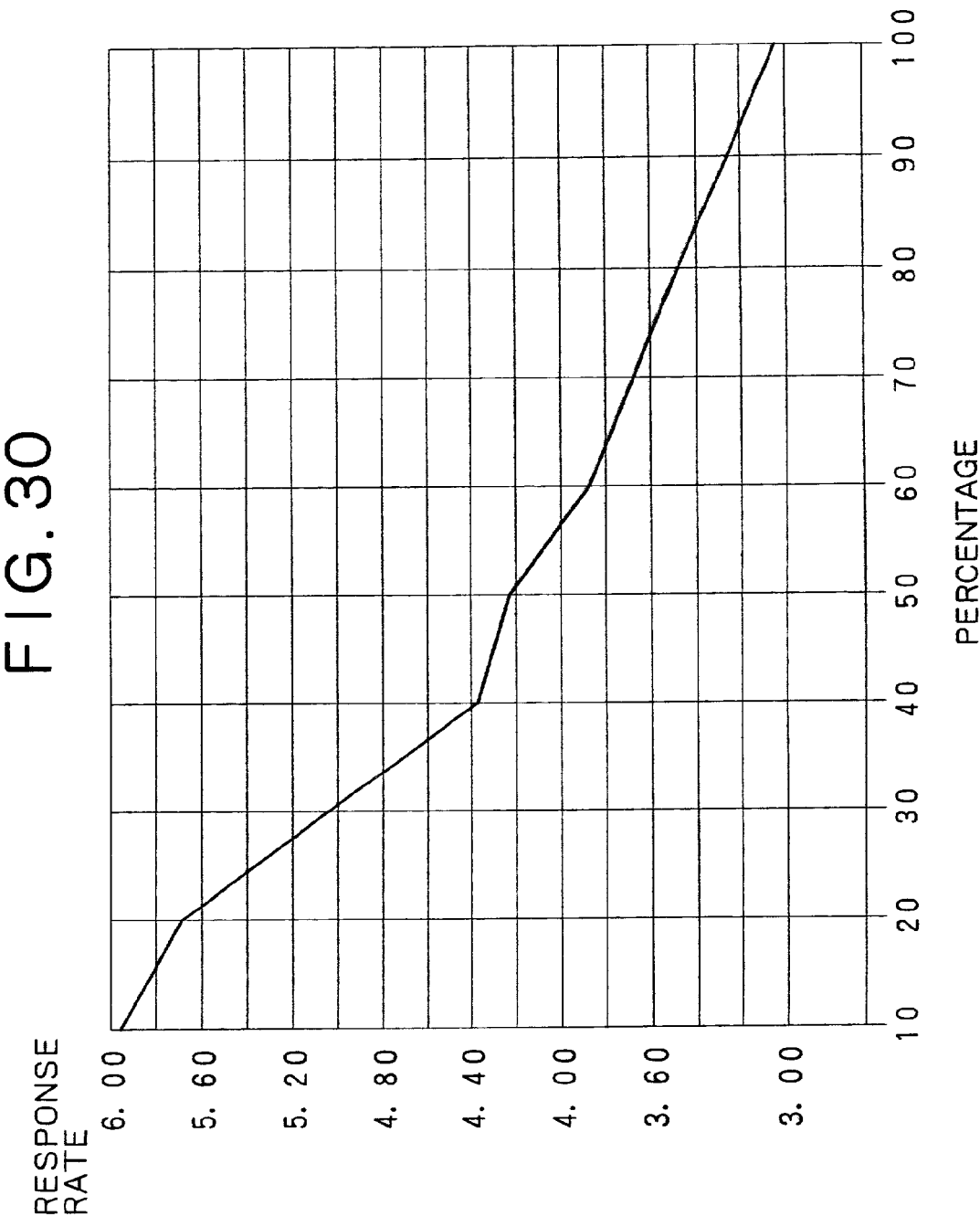

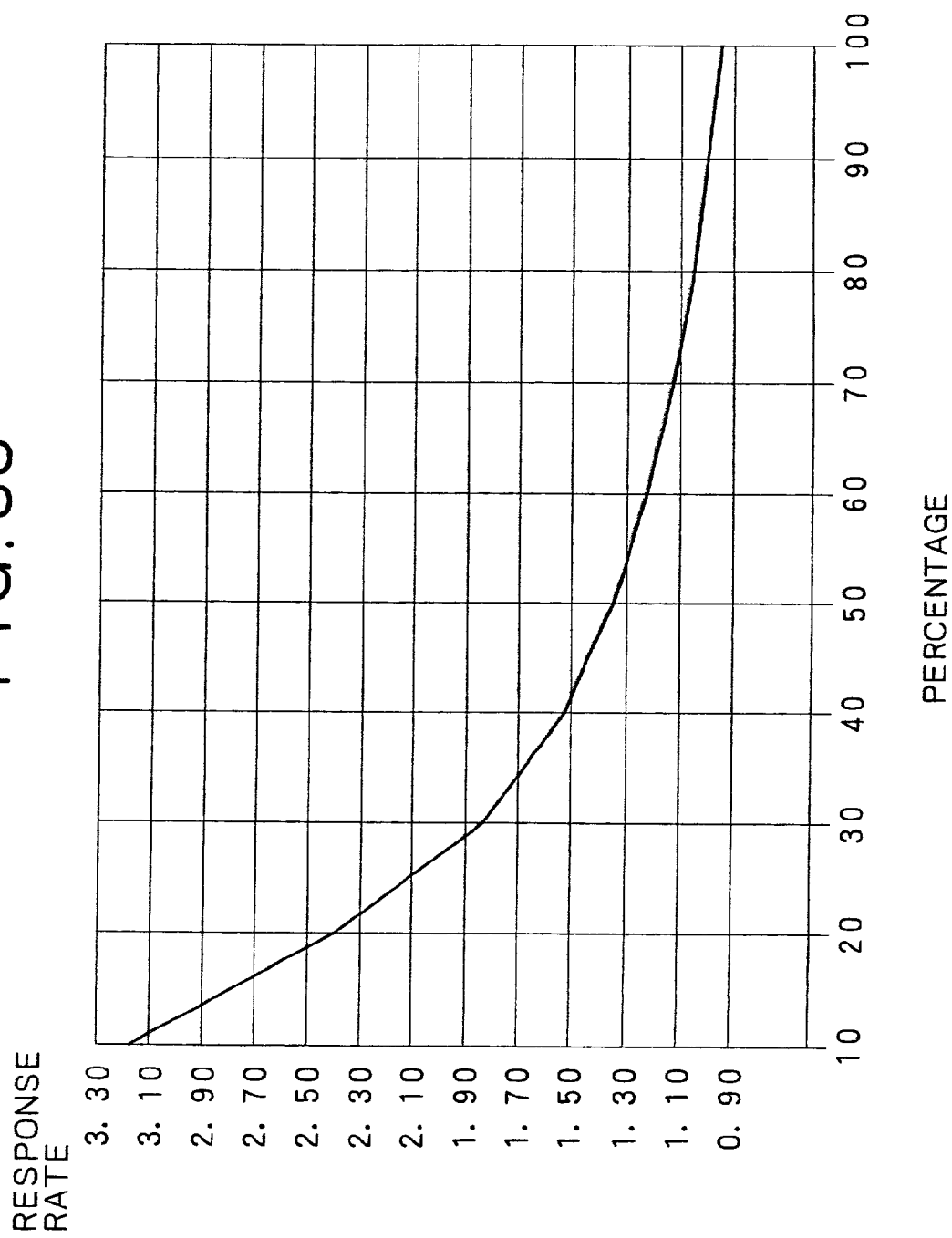

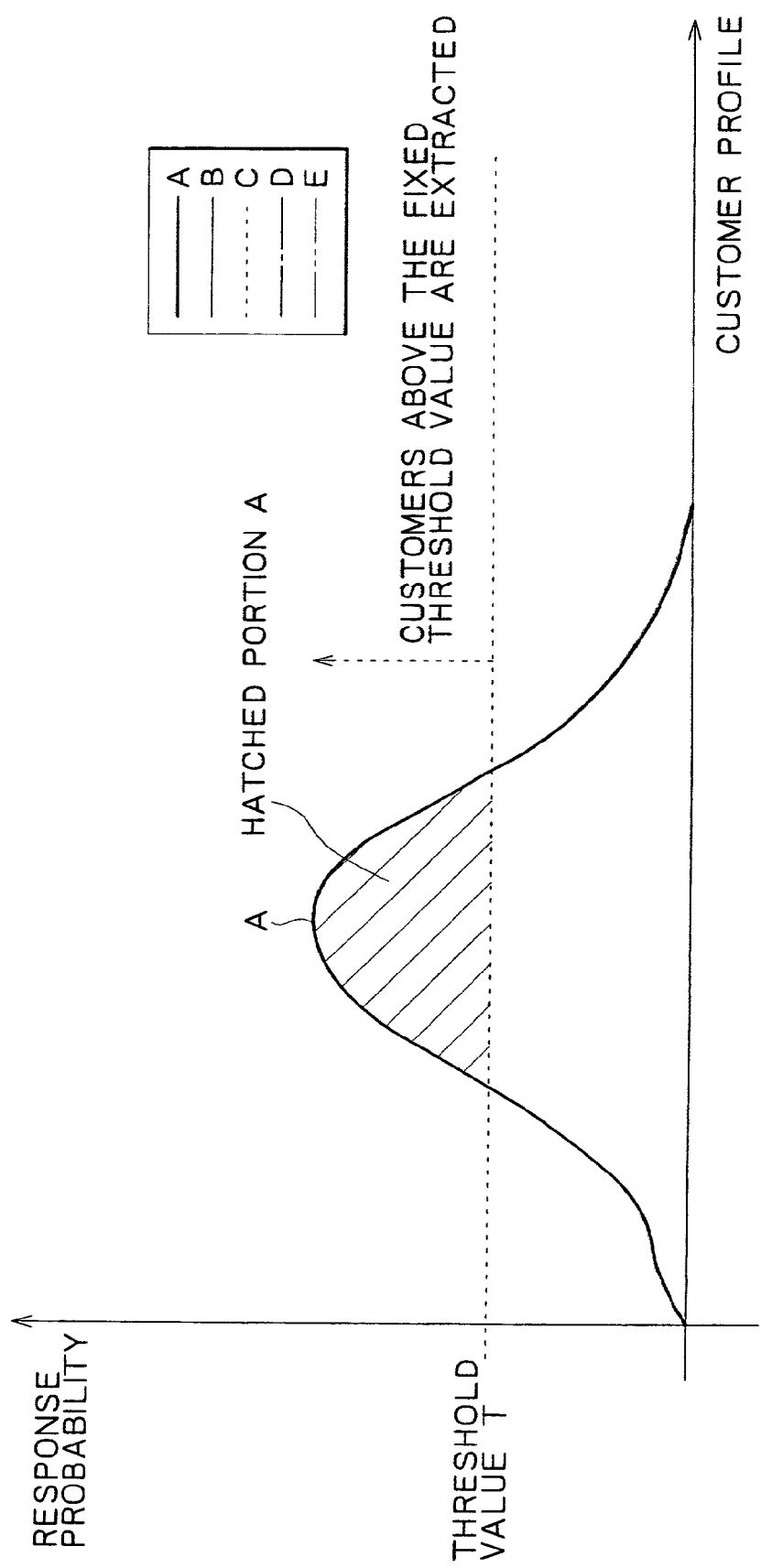

INFORMATION-PROCESSING APPARATUS, INFORMATION-PROCESSING METHOD AND STORAGE MEDIUM

BACKGROUND OF THE INVENTION

The present invention relates to an information-processing apparatus, an information-processing method and a computer program. More particularly, the present invention relates to an information-processing apparatus and an information-processing method that are capable of increasing an advertising effect of distibution of advertisement contents to customers through a two-direction network, and relates to a computer program prescribing the information-processing method.

In recent years, there has been established a variety of services to distribute advertisement mails to registered customers. Such services to distribute advertisement mails each adopt an analysis method based on a data mining technique adopted in direct mailing by post.

The data mining technique is an advanced technique to search a large amount of data for a hidden cause-effect relation or a pattern, an advanced modeling technique or a decision-support technique which allows complex relations to be established among pieces of data and draws much attention for the past several years in fields such as artificial intelligence and data engineering.

It should be noted that there are various fields of the data mining technique. Examples of the data mining technique are a technique to determine what a customer will buy next by consideration of a past purchase record, a technique to predict when false credit cards will be used, a technique to determine a reason why a customer switches to a competitor, a technique to find a way to have such a customer give up the competitor and return to itself, an optimum technique to focus on potential customers in accordance with purchasing patterns and an aid to find solutions to these problems.

By the way, in a process to focus on customers, to whom advertisement mails are to be sent, by using the data mining technique, a rate of responses received from the customers can be estimated by creation of a graph called an assessment chart.

In addition, in order to increase the response rate, there is adopted a method whereby only most likely responding customers are selected on the basis of computed expected response probabilities and an advertisement mail is sent to only the selected customers. With this method, however, the number of sent advertisement mails decreases, raising a problem of a reduced response rate relative to all customers.

The following methods are adopted by an enterprise or the like making a request for distribution of an advertisement mail to determine an advertisement fee to be paid to an enterprise rendering a service to distribute advertisement mails:

(1) An exposure determination method based on the number of sent advertisement mails or the number of users inspecting a web page displaying the banner advertisement.

(2) A response-count determination method based on the number of accesses to a web page (an advertisement page) which are made by actually clicking a URL (Uniform Resource Locator) included in the advertisement mail or the number of accesses to a banner advertisement of a web page which are made by actual clicking operations.

Since the exposure determination method does not consider the number of users who actually click the URL to make accesses to the web page, however, a relation between the effect of the advertisement and the expense is not clear.

Since the response-count determination method is based on an actual result indicated by the number of actual responses, on the other hand, there are raised problems that the advertisement cost cannot be determined in advance or, if the advertisement fee is set by making a contract based on a predetermined number of responses, the response count specified in the contract cannot be achieved or it takes a long time to achieve the response count.

When an advertisement mail is distributed after estimating a response rate by adoption of the conventional technique to create an assessment chart, however, there is raised a problem that a high actual response rate is not necessarily obtained.

In addition, the conventional technique to create an assessment chart is provided as a method to be used when a single content is distributed. There is also a problem that this conventional technique is not capable of creating an assessment chart, which is used for estimating a response rate with a high degree of accuracy when an optimum content is selected for each customer from a plurality of contents to be sent to the customer.

SUMMARY OF THE INVENTION

It is an object of the present invention addressing the problems described above to increase the accuracy of estimation of a response rate.

To achieve the above object, according to a first aspect of the present invention, there is provided an information-processing apparatus including:

computation means for computing an expected value of a response transmitted by each of information-processing terminals in response to each of a plurality of contents transmitted to the information-processing terminals; and select means for selecting some of a plurality of contents to be transmitted to each of the information-processing terminals on the basis of the expected value computed by the computation means for each of the contents.

In accordance to a second aspect of the present invention, there is provided an information-processing method including the steps of:

computing an expected value of a response transmitted by each of information-processing terminals in response to each of a plurality of contents transmitted to the information-processing terminals; and selecting some of a plurality of contents to be transmitted to each of the information-processing terminals on the basis of the expected value computed for each of the contents.

In accordance to a third aspect of the present invention, there is provided a program to be executed by a computer to carry out the steps of:

computing an expected value of a response transmitted by each of information-processing terminals in response to each of a plurality of contents transmitted to the information-processing terminals; and selecting some of a plurality of contents to be transmitted to each of the information-processing terminals on the basis of the expected value computed for each of the contents.

In accordance to a fourth aspect of the present invention, there is provided an information-processing apparatus including:

transmission means for transmitting a content to information-processing terminals;

response-rate-computing means for computing a response rate of responses transmitted by the information-processing terminals in response to the content transmitted by the transmission means;

storage means for storing a fee of transmitting the content for each response rate; and acquirement means for acquiring a fee of transmitting the content for a response rate computed by the response-rate-computing means from the storage means.

In accordance to a fifth aspect of the present invention, there is provided an information-processing method including the steps of:

transmitting a content to information-processing terminals;

computing a response rate of responses transmitted by the information-processing terminals in response to the content; and storing a fee of transmitting a content for each response rate in advance;

acquiring a stored fee of transmitting the content for the computed response rate.

In accordance to a sixth aspect of the present invention, there is provided a program to be executed by a computer to carry out the steps of:

transmitting a content to information-processing terminals;

computing a response rate of responses transmitted by the information-processing terminals in response to the content; and storing a fee of transmitting a content for each response rate in advance;

acquiring a stored fee of transmitting the content for the computed response rate.

In accordance to a seventh aspect of the present invention, there is provided an information-processing apparatus including:

computation means for computing an expected value of a response transmitted by each of information-processing terminals in response to a content transmitted to the information-processing terminals;

setting means for setting a predetermined threshold value for the expected values computed by the computation means;

storage means for storing a fee of transmitting the content for each expected value; and acquirement means for acquiring a fee of transmitting the content for the threshold value set by the setting means from the storage means.

In accordance to a eighth aspect of the present invention, there is provided an information-processing method including the steps of:

computing an expected value of a response transmitted by each of information-processing terminals in response to a content transmitted to the information-processing terminals;

setting a predetermined threshold value for the computed expected values; and storing a fee of transmitting a content in advance for each expected value;

acquiring a stored fee of transmitting the content for the predetermined threshold value.

In accordance to a ninth aspect of the present invention, there is provided a program to be executed by a computer to carry out the steps of:

computing an expected value of a response transmitted by each of information-processing terminals in response to a content transmitted to the information-processing terminals;

setting a predetermined threshold value for the computed expected values; and storing a fee of transmitting a content in advance for each expected value;

acquiring a stored fee of transmitting the content for the predetermined threshold value.

In accordance to a tenth aspect of the present invention, there is provided an information-processing apparatus including:

computation means for computing an expected value of a response transmitted by each of information-processing terminals in response to each of a plurality of contents transmitted to the information-processing terminals;

first producing means for producing assessment information including largest expected values computed by the computation means for the responses transmitted by the information-processing terminals in response to the contents on the basis of the expected values which are each computed by the computation means for one of the contents; and second producing means for producing an assessment function of the expected values computed for all the contents by synthesizing pieces of the assessment information which are each produced by the first producing means for one of the contents.

In accordance to a eleventh aspect of the present invention, there is provided an information-processing method including the steps of:

computing an expected value of a response transmitted by each of information-processing terminals in response to each of a plurality of contents transmitted to the information-processing terminals;

producing assessment information including largest ones of the expected values for the responses transmitted by the information-processing terminals in response to the contents on the basis of the expected values each computed for one of the contents; and producing an assessment function of the expected values for all the contents by synthesizing pieces of the assessment information each produced for one of the contents.

In accordance to a twelfth aspect of the present invention, there is provided a program to be executed by a computer to carry out the steps of:

computing an expected value of a response transmitted by each of information-processing terminals in response to each of a plurality of contents transmitted to the information-processing terminals;

producing assessment information including largest ones of the expected values for the responses transmitted by the information-processing terminals in response to the contents on the basis of the expected values each computed for one of the contents; and producing an assessment function of the expected values for all the contents by synthesizing pieces of the assessment information each produced for one of the contents.

BRIEF DESCRIPTION OF THE DRAWINGS

FIG. 2 is a diagram showing a typical configuration of the customer-information database employed in the advertisement-mail-distributing system shown in FIG. 1;

FIG. 5 is a block diagram showing a typical configuration of a personal computer employed in the advertisement-mail-distributing system shown in FIG. 1;

FIG. 6 is a flowchart representing processing to collect data obtained from a test transmission;

FIGS. 7A to 7C show typical advertisement mails used in a test transmission 1;

FIGS. 8A to 8B show another typical advertisement mails used in the test transmission 1;

FIGS. 9A to 9C show typical advertisement mails used in a test transmission 2;

FIGS. 10A and 10B show another typical advertisement mails used in the test transmission 2;

FIGS. 11A to 11C show typical advertisement mails used in a test transmission 3;

FIG. 12 is an explanatory diagram used for describing results of responses to advertisement mails sent in the test transmission 1;

FIG. 13 is an explanatory diagram used for describing results of responses to advertisement mails sent in the test transmission 2;

FIG. 14 is an explanatory diagram used for describing results of responses to advertisement mails sent in the test transmission 3;

FIG. 17 is a flowchart representing other processing carried out by the data mining server;

FIG. 18 is an explanatory diagram used for describing an expected response probability;

FIGS. 19A to 19C are explanatory diagrams used for describing the number of customers each serving as a recipient for every advertisement mail and for every actual transmission;

FIG. 20 is a flowchart representing processing to collect data obtained from an actual transmission;

FIG. 21 is an explanatory diagram used for describing results of responses to advertisement mails sent in a test transmission 1;

FIG. 22 is an explanatory diagram used for describing results of responses to advertisement mails sent in a test transmission 2;

FIG. 23 is an explanatory diagram used for describing results of responses to advertisement mails sent in a test transmission 3;

FIG. 24 is an explanatory table showing a response rate for each customer profile and each of advertisement mails;

FIG. 25 is an explanatory table showing a response rate for each of other customer profiles and each of the advertisement mails;

FIG. 26 is an explanatory table showing a response rate for each of still other customer profiles and each of the advertisement mails;

FIG. 27 is an explanatory table showing a response rate for each of further customer profile s and each of the advertisement mails;

FIG. 28 is an explanatory table showing a response rate for each of still further customer profiles and each of the advertisement mails;

FIG. 29 is an explanatory table showing a response rate for each of still further customer profiles and each of the advertisement mails;

FIG. 30 is a diagram showing an assessment chart based on results of actual transmission A1;

FIG. 33 is a diagram showing an assessment chart based on results of actual transmission 3;

FIG. 35 is a diagram showing a response pattern;

PREFERRED EMBODIMENTS OF THE INVENTION

Figure 1:
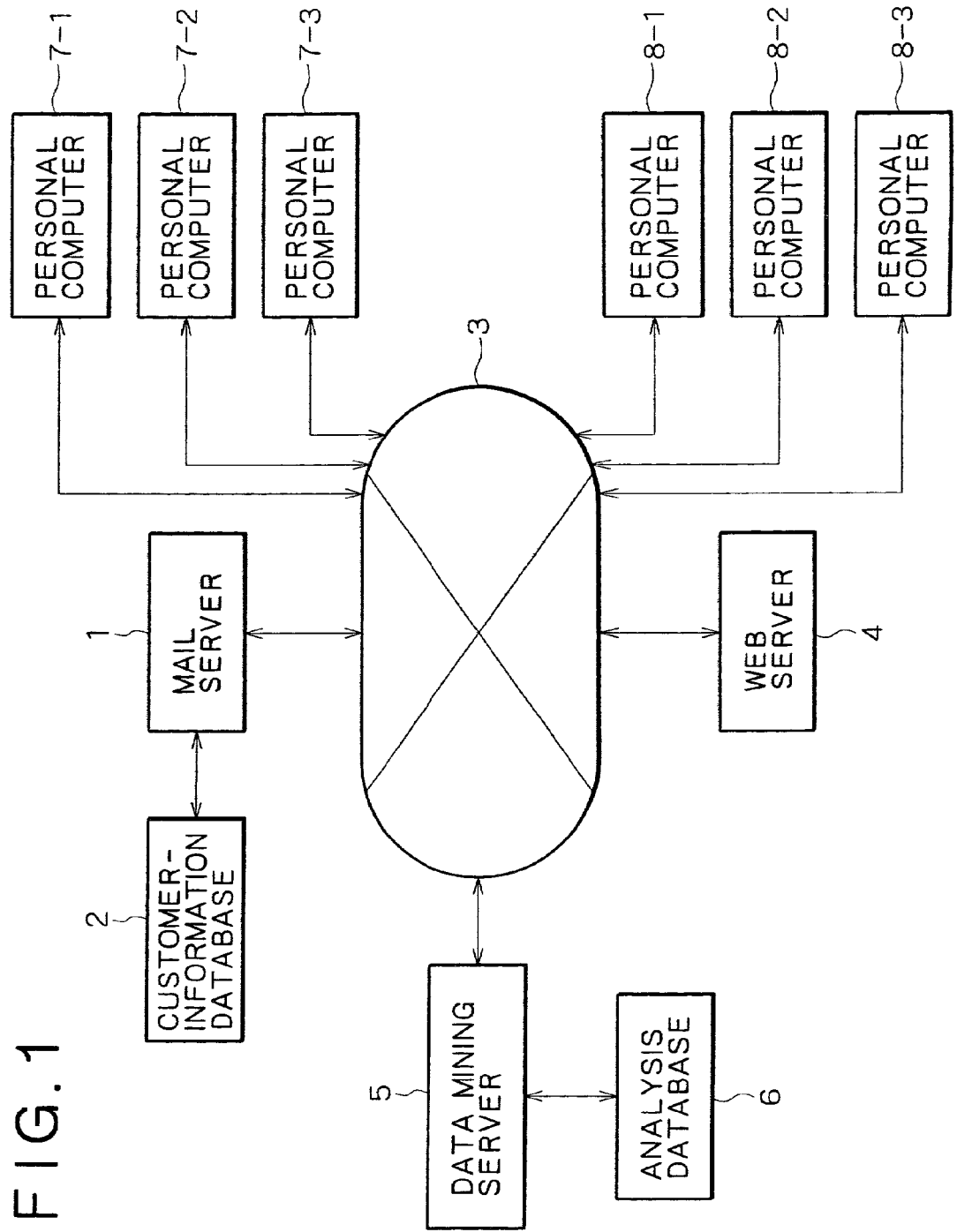
FIG. 1 is a block diagram showing a typical configuration of an advertisement-mail-distributing system provided by the present invention.

FIG. 1 is a block diagram showing a typical configuration of an advertisement-mail-distributing system provided by the present invention. In the advertisement-mail-distributing system, a mail server 1 transmits an advertisement mail to personal computers 7-1 to 7-3 and 8-1 to 8-3 owned by registered customers by way of a network 3 represented by the Internet. A customer-information database 2 is used for storing information on customers to whom an advertisement mail is to be distributed.

FIG. 2 is a diagram showing a typical configuration of the customer-information database 2. The typical customer-information database 2 is used for storing profile items for each customer identified by a customer ID. The profile items include demographic information, a product/service-purchase & utilization history and personal characteristic data.

The demographic information stored in the typical database shown in FIG. 2 includes a name, a phone number, a gender, an age, a family code and an income code. Some of the pieces of demographic information are coded. It should be noted that the demographic information is information on basic attributes as well as information usable as the so-called personal information.

The product/service-purchase & utilization history is a behavioral history including a purchase data and product codes. The product codes are each a coded item.

The personal-characteristic data is information on the customer's personality. The personal-characteristic data comprises answers to predetermined questions 1, 2, 3 and so on.

An advertisement mail transmitted by a mail server 1 includes a URL (Uniform Resource Locator) as additional information. A customer receiving an advertisement mail is capable of making an access to a web page stored in a web server 4 as indicated by a URL included in the advertisement mail. As an alternative, an advertisement mail may include the web server 4 as a destination to which a response to the advertisement can be sent by the customer. The web server 4 stores information on an access made by a customer in response to an advertisement mail received by the customer, and notifies a data mining server 5 of the response (the access).

The data mining server 5 controls an analysis database 6 on the basis of response information received from the web server 4, carrying out regular-extraction processing by adoption of a data mining technique. To put it concretely, the data mining server 5 is capable of picking up potential customers for a specific product or a specific service from a customer database with a structure similar to the structure of the database shown in FIG. 2. The customer's degree of potentiality is explained as follows.

A customer's degree of potentiality is an indicator or an predicted value representing the customer's interest in a specific product or a specific service or the customer's need for the specific product or the specific service. A degree of potentiality can be found typically by regular extraction based on a formula or the like.

A typical simple formula for computing a potentiality degree F is a linear associative expression of an equation like Eq. (1) including an expression of a sum of terms which are each a product of numerical data and a coefficient.

$$F = a \times Q1 + b \times Q2 + c \times Q3 + d \times Q4 + e \times Q5 + \ldots \quad (1)$$

where notations Q1, Q2, Q3, Q4, Q5 and so on each denote customer profile data whereas notations a, b, c, d, e and so on each denote a constant or a coefficient set for a specific product or a specific service.

It should be noted that equations for computing a potentiality degree F are not limited to such a linear associative equation but may also be expressed as a variety of nonlinear computation formulas. For example, a formula for computing a potentiality degree F can be a neural network model using a sigmoid function.

In addition, a degree of potentiality can be derived from a rule form of a condition such as an IF statement as follows.

IF (Q1>a AND Q2>b AND Q3>c AND Q4>d AND Q5>e), THEN F=X

It should be noted that, as for a statistical technique based on a linear model, a discriminative analysis, logistic recursion/regression, a cluster analysis or the like is appropriate and suitable for responses to the query words such as 'why' and 'how'.

In addition, a tree model which is also known as an induction technique is one of nonlinear models. A tree model is a decision tree formed from data. This tree model is appropriate for a case in which important variables are selected and unnecessary predicted elements are eliminated.

On the other hand, the neural network which is a nonlinear model is capable of predicting a future result based on history data and thus suitable for a response to the query word 'what'.

The data mining server 5 adopts the data mining technique based on such formulas or the like to compute each customer's degree of potentiality with respect to a specific product or a specific service.

The data mining server 5 picks up potential customers for a specific product or a specific service on the basis of customers' degrees of potentiality which are found with respect to the product or the service. Thus, for example, marketing activities can be carried out effectively. To be more specific, an advertisement mail can be transmitted to customers desiring to purchase a specific product or a specific service.

In addition, a formula for computing a degree of potentiality can be derived by adoption of any arbitrary technique. For example, a formula for computing a customer's degree of potentiality can be derived from an existing relation among pieces of information received from the customer. In general, a variety of parameters can be obtained by application of the models described above to a data set of known variables (or target variables) for a relation between profile data of a customer and an expected interest of the customer. The data set is typically a database for a learning purpose.

Figure 3:
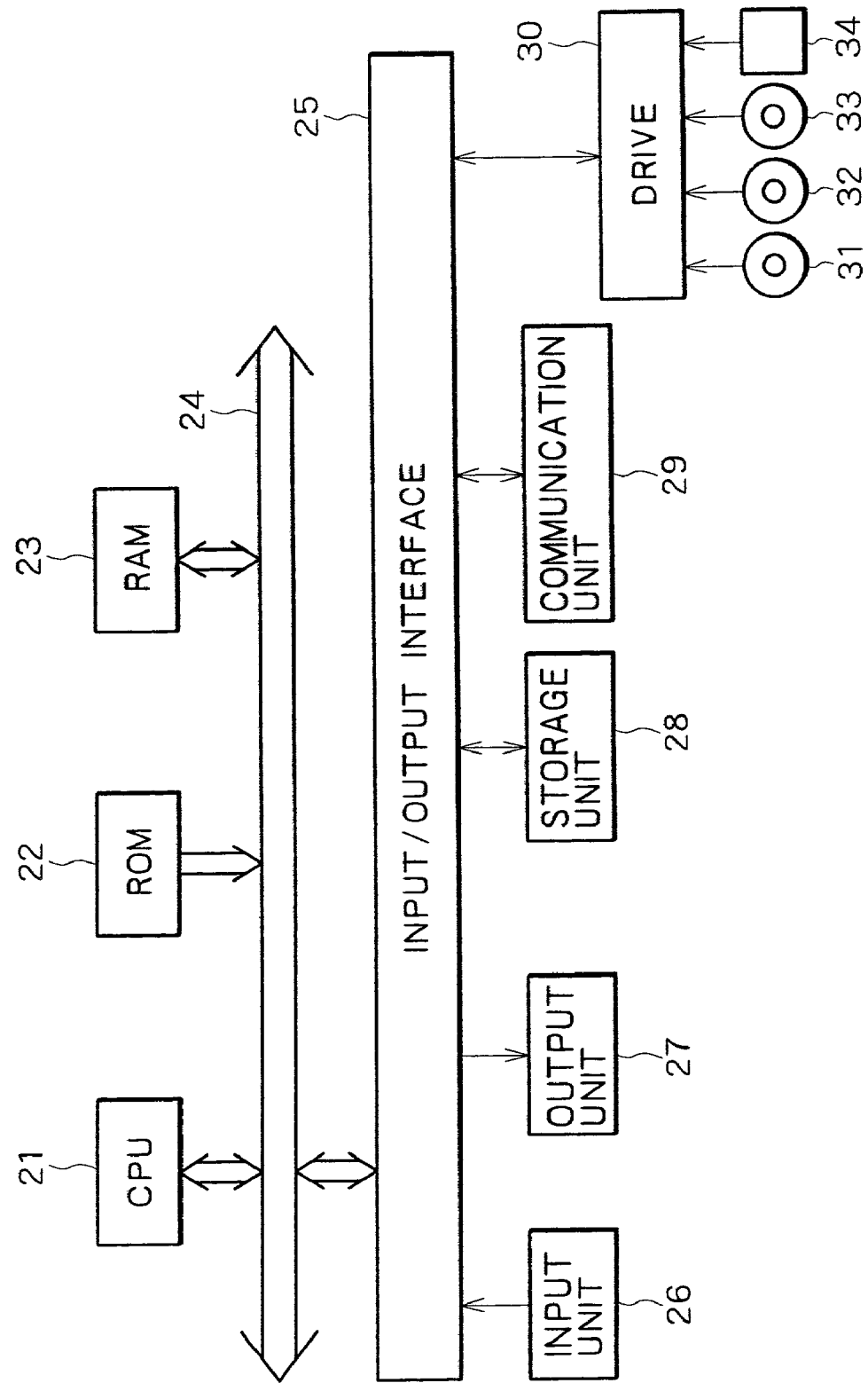
FIG. 3 is a block diagram showing a typical configuration of a mail server employed in the advertisement-mail-distributing system shown in FIG. 1.

FIG. 3 is a block diagram showing a typical configuration of the mail server 1. A CPU (Central Processing Unit) 21 employed in the mail server 1 executes programs stored in a ROM (Read Only Memory) 22 or programs loaded into a RAM (Random Access Memory) 23 from a storage unit 28 in order to carry out various kinds of processing. The RAM 23 is also used for properly storing data required by the CPU 21 in the execution of the processing.

The CPU 21, the ROM 22 and the RAM 23 are connected to each other by a bus 24. The bus 24 is also connected to an input/output interface unit 25. The input/output interface unit 25 is connected to an input unit 26, an output unit 27, the storage unit 28 and a communication unit 29. The input unit 26 includes a keyboard and a mouse. The output unit 27 comprises a speaker and a display unit, which can be a CRT or an LCD unit. The storage unit 28 is typically a hard disk.

The communication unit 29 includes a modem and a terminal adaptor. The communication unit 29 acquires customer information from the customer-information database 2 as instructed by a command issued by the CPU 21 and transmits an advertisement mail stored in the storage unit 28 to a customer indicated by the customer information by way of the network 3.

If necessary, the input/output interface unit 25 is also connected to a drive 30, on which a magnetic disk 31, an optical disk 32, a magneto-optical disk 33, a semiconductor memory 34 or another storage medium is mounted. A computer program read out from a storage medium mounted in the drive 30 is installed in the storage unit 28 if necessary.

Figure 4:
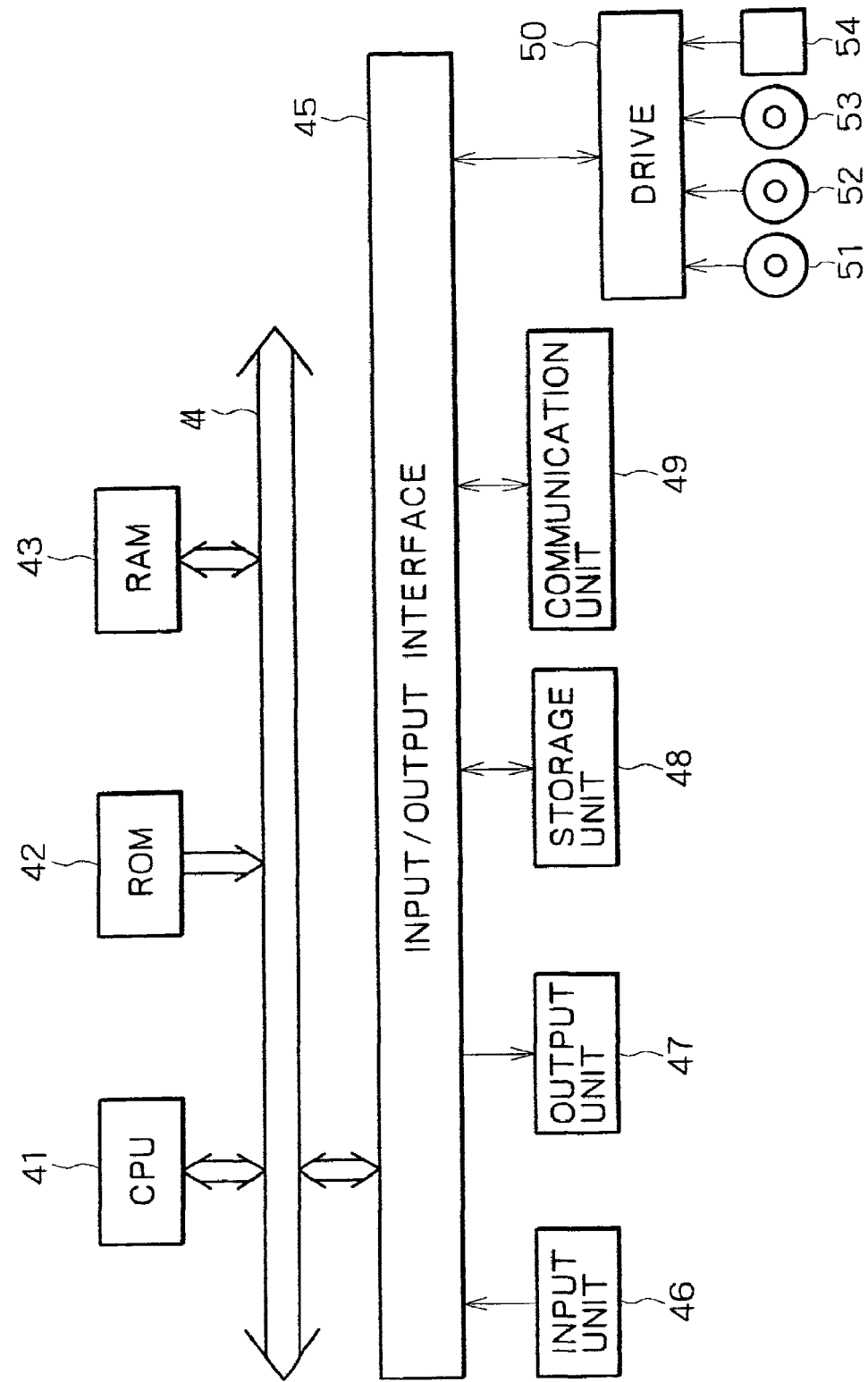
FIG. 4 is a block diagram showing a typical configuration of a data mining server employed in the advertisement-mail-distributing system shown in FIG. 1.

FIG. 4 is a block diagram showing a typical configuration of the data mining server 5. As shown in the figure, the data mining server 5 comprises components ranging from a CPU 41 to a semiconductor memory 54. This configuration is basically the same as the configuration of the mail server 1 which comprises components ranging from the CPU 21 to a semiconductor memory 34 as described above. Since block components of the data mining server 5, which have the same names as their counterparts employed in the mail server 1, have functions identical with the counterparts, their explanation is not repeated.

A storage unit 48 is used for storing a variety of programs for analysis purposes. The CPU 41 executes the programs, which are required for analyses.

A communication unit 49 receives response information from the web server 4 through the network 3, to which the communication unit 49 is connected. On the contrary, the communication unit 49 informs the mail server 1 of information on customers selected by an analysis carried out by the CPU 41. The customers are each selected as a recipient of an advertisement mail.

FIG. 5 is a block diagram showing a typical configuration of each of the personal computers 7-1 to 7-3 and 8-1 to 8-3. As shown in the figure, each of the personal computers 7-1 to 7-3 and 8-1 to 8-3 comprises components ranging from a CPU 61 to a semiconductor memory 74. This configuration is basically the same as the configuration of the mail server 1 which comprises components ranging from the CPU 21 to a semiconductor memory 34 as described above. In each of the personal computers 7-1 to 7-3 and 8-1 to 8-3, block components, which have the same names as their counterparts employed in the mail server 1, have functions identical with the counterparts. It is thus unnecessary to repeat their explanation.

By using an advertisement-mail-distributing system having the configuration described above, a rate of responses or the number of responses received from customers can be increased. In order to increase the rate of responses, the data mining server 5 selects most likely responding customers on the basis of customer information reported by the mail server 1. Then, an advertisement mail is sent only to selected customers. In this case, however, the total number of advertisement mails sent by the mail server 1 decreases. Thus, the total number of responses also decreases as well. In order to solve this problem, in the advertisement-mail-distributing system provided by the present invention, the mail server 1 composes a plurality of sentences for specific information and sends an advertisement mail to customers based on a customer analysis which is carried out by the data mining server 5 and capable of increasing the number of responses and, hence, the response rate.

The following description begins with an explanation of a test transmission for obtaining customer information to be analyzed by the data mining server 5 with reference to a flowchart shown in FIG. 6.

As shown in the figure, the flowchart begins with a step S1 at which the mail server 1 transmits customer information acquired from the customer-information database 2 to the data mining server 5 by way of the network 3.

Then, at the next step S2, the data mining server 5 randomly selects customers each to serve as a target of the test transmission on the basis of the customer information received from the mail server 1, and stores information on the selected customers in an analysis database 6. It should be noted that terminals used by customers each selected by the data mining server 5 to serve as a target of the test transmission are the personal computers 7-1 to 7-3. If it is not necessary to distinguish the personal computers 7-1 to 7-3 from each other in the following description, the personal computers 7-1 to 7-3 are denoted by a generic reference numeral of 7.

Subsequently, at the next step S3, the data mining server 5 transmits the information on the selected customers each selected in the processing carried out at the step S2 to serve as a target of the test transmission to the mail server 1 by way of the network 3. The information includes the mail addresses of the personal computers 7.

Then, at the next step S4, the communication unit 29 employed in the mail server 1 sends an advertisement mail to the customers each selected to serve as a target of the test transmission as indicated by the information received from the data mining server 5.

FIGS. 7A, 7B and 7C to 11A, 11B and 11C are diagrams each showing typical advertisement mails stored in the storage unit 28 employed in the mail server 1 to be sent in the test transmission. In data collection processing, 3 kinds of test transmission, namely, test transmissions 1, 2 and 3, are implemented. In test transmission 1, five different advertisement mails shown in FIGS. 7 and 8 are sent. In test transmission 2, five different advertisement mails shown in FIGS. 9 and 10 are sent. In test transmission 3, three different advertisement mails shown in FIGS. 11A to 11C are sent.

The five advertisement mails sent in test transmission 1 are each an advertisement mail describing renewal of a meeting room. To be more specific, an advertisement mail A1 shown in FIG. 7A has a title of 'Peace of Mind.' An advertisement mail B1 shown in FIG. 7B has a title of 'Excitements.' An advertisement mail C1 shown in FIG. 7C has a title of 'Touching Hearts of Each Other.' An advertisement mail D1 shown in FIG. 8A has a title of 'Stylish.' An advertisement mail E1 shown in FIG. 8B has a title of 'Making Profits.' The advertisement mails A1, B1, C1, D1 and E1 are each a text written as a catch copy. Each of the advertisement mails includes a URL for making an access to the renewed meeting room. By merely clicking the URL, a customer inspecting the advertisement mail displayed on a personal computer 7 is capable of making an access to the renewed meeting room's web page, which is stored in the web server 4.

In test transmission 1, each of the five different advertisement mails is sent to 20,000 customers selected at random. Thus, the five different advertisement mails are sent to a total of 100,000 customers.

The five advertisement mails sent in test transmission 2 are each an advertisement mail regarding renewal of a web page describing movie (cinema) information. To be more specific, an advertisement mail A2 shown in FIG. 9A has a title of 'Fashion.' An advertisement mail B2 shown in FIG. 9B has a title of 'Real Things.' An advertisement mail C2 shown in FIG. 9C has a title of 'Convenience.' An advertisement mail D2 shown in FIG. 10A has a title of 'Peace of Mind.' An advertisement mail E2 shown in FIG. 10B has a title of 'Excitements.' The advertisement mails A2, B2, C2, D2 and E2 are each a text written as a catch copy. Each of the advertisement mails includes a URL for making an access to the renewed web page describing movie information. By merely clicking the URL, a customer inspecting the advertisement mail displayed on a personal computer 7 is capable of making an access to the web page, which is stored in the web server 4.

In test transmission 2, each of the five different advertisement mails is sent to 15,000 customers selected at random. Thus, the five different advertisement mails are sent to a total of 75,000 customers.

The three advertisement mails sent in test transmission 3 are each an advertisement mail regarding renewal of a web page describing magazine information. To be more specific an advertisement mail A3 shown in FIG. 11A has a title of 'Peace of Mind.' An advertisement mail B3 shown in FIG. 11B has a title of 'Handle.' An advertisement mail C3 shown in FIG. 11C has a title of 'Be Provided.' The advertisement mails A3, B3 and C3 are each a text written as a catch copy. Each of the advertisement mails includes a URL for making an access to the renewed web page describing movie information. By merely clicking the URL, a customer inspecting the advertisement mail displayed on a personal computer 7 is capable of making an access to the web page, which is stored in the web server 4.

In test transmission 3, each of the three different advertisement mails is sent to 20,000 customers selected at random. Thus, the three different advertisement mails are sent to a total of 60,000 customers.

Refer back to the flowchart shown in FIG. 6. At a step S5, the web server 4 stores information on a customer using a personal computer 7 from which a response to the sent advertisement mail has been received. The information is known as response information.

Then, at the next step S6, the web server 4 transmits the response information to the data mining server 5 by way of the network 3. The response information includes a registered ID of the customer and a mail address of the personal computer 7 used by the customer.

Subsequently, at the next step S7, the data mining server 5 identifies responding customers among all those serving as targets of the test transmission on the basis of the response information received from the web server 4. The data mining server 5 then analyzes information on each of the responding customers, that is, the profile of each of the responding customers. The customer-profile analysis carried out by the data mining server 5 will be described later.

FIGS. 12 to 14 are tables showing typical response results for test transmissions 1 to 3 respectively. Each of the tables shown in FIGS. 12 to 14 includes the number of customers each serving as a target of the advertisement-mail transmission, the number of customers serving as targets of the advertisement-mail transmission and making accesses to the web page and a response rate. The number of customers serving as targets of the advertisement-mail transmission and making accesses to the web page is referred to hereafter as the number of responses or a response count. The response rate is defined as a ratio of the response count to the number of customers each serving as a target of the advertisement-mail transmission.

As shown in FIG. 12, the response results for test transmission 1 indicate that the total number of customers each serving as a target of the advertisement-mail transmission is 102,563 and the number of responses is 1,024. Thus, the response rate is 1.00%.

As shown in FIG. 13, the response results for test transmission 2 indicate that the total number of customers each serving as a target of the advertisement-mail transmission is 76,644 and the number of responses is 660. Thus, the response rate is 0.86%.

As shown in FIG. 14, the response results for test transmission 3 indicate that the total number of customers each serving as a target of the advertisement-mail transmission is 61,517 and the number of responses is 389. Thus, the response rate is 0.63%.

The following description explains processing carried out by the data mining server 5 to analyze customer profiles. The data mining server 5 stores information on responses, which is received from the web server 4, and information on customers each selected as a target of a test transmission, with each of the responses associated with one of the selected customers, as learning data in the analysis database 6. Then, the data mining server 5 analyzes the profile of each customer giving a response by adopting a variety of data mining techniques for every catch copy. A customer giving a response is also referred to as a responding customer. Finally, the data mining server 5 determines which catch copy is a most suitable catch copy to be transmitted to customers not receiving the advertisement mails on the basis of analysis results in order to increase the response rate most. In the advertisement-mail-distributing system shown in FIG. 1, the customers not receiving the advertisement mails are represented by customers using the personal computers 8-1 to 8-3. If it is not necessary to distinguish the personal computers 8-1 to 8-3 from each other in the following description, the personal computers 8-1 to 8-3 are denoted by a generic reference numeral of 8.

Figure 15:
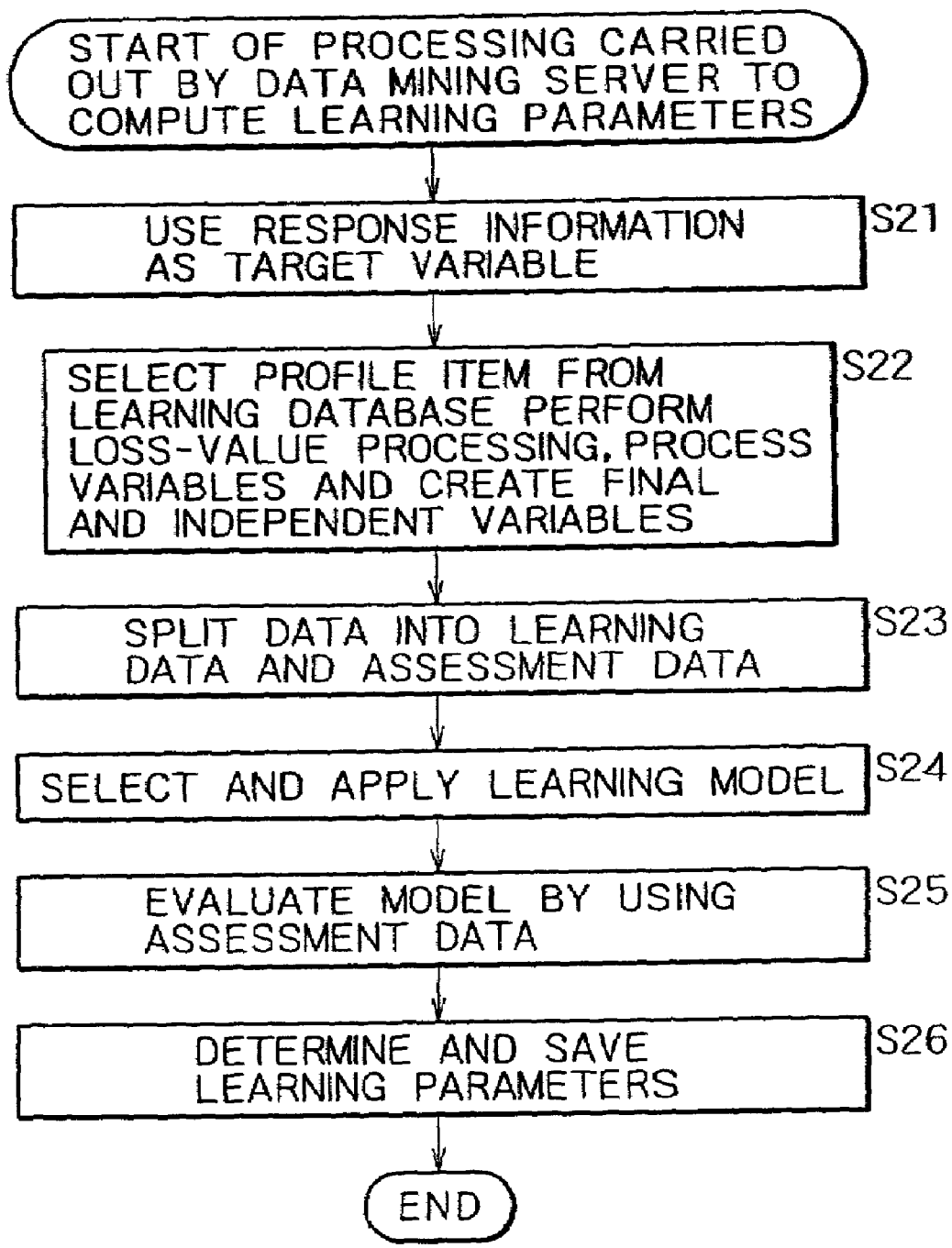
FIG. 15 is a flowchart representing processing carried out by the data mining server.

The following description explains processing carried out by the data mining server 5 to compute learning parameters by referring to a flowchart shown in FIG. 15.

As shown in the figure, the flowchart begins with a step S21 at which the CPU 41 selects pieces of data at random from the customer database and uses the selected pieces of data as learning data. The CPU 41 stores the learning data in a learning database with response information used as a target variable serving as a dependent variable.

Then, at the next step S22, the CPU 41 creates an independent variable serving as a variable for predicting a characteristic of a customer. For example, the CPU 41 extracts a profile item to be used as an independent variable from items common to the learning database and the customer database. Then, the CPU 41 carries out deficiency processing to compensate for lost data, an abnormal value and the like. In addition, the CPU 41 carries out variable formation such as editing and syntheses on the profile item to create a final independent variable.

Subsequently, at the next step S23, the CPU 41 splits the learning database into rule discovery data and assessment data for assessment of a rule.

Then, at the next step S24, the CPU 41 selects a learning model and applies the model to the learning data.

Figure 16A:
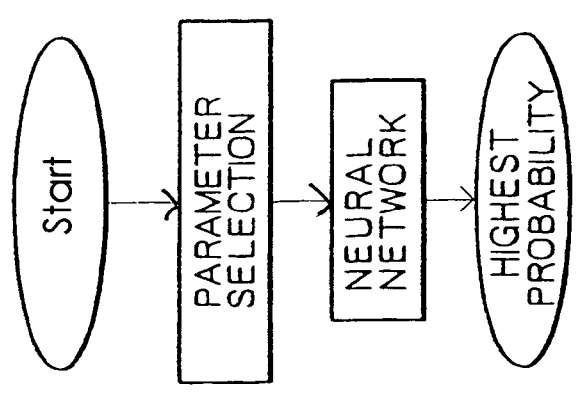
FIGS. 16A to 16C are diagrams showing typical learning models.
Figure 16B:
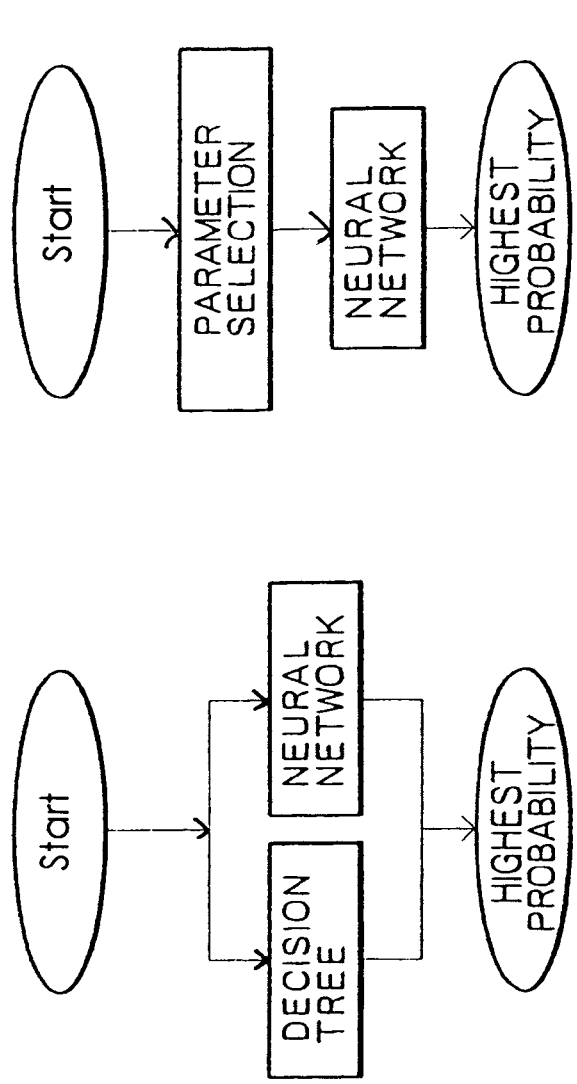
Figure 16C:
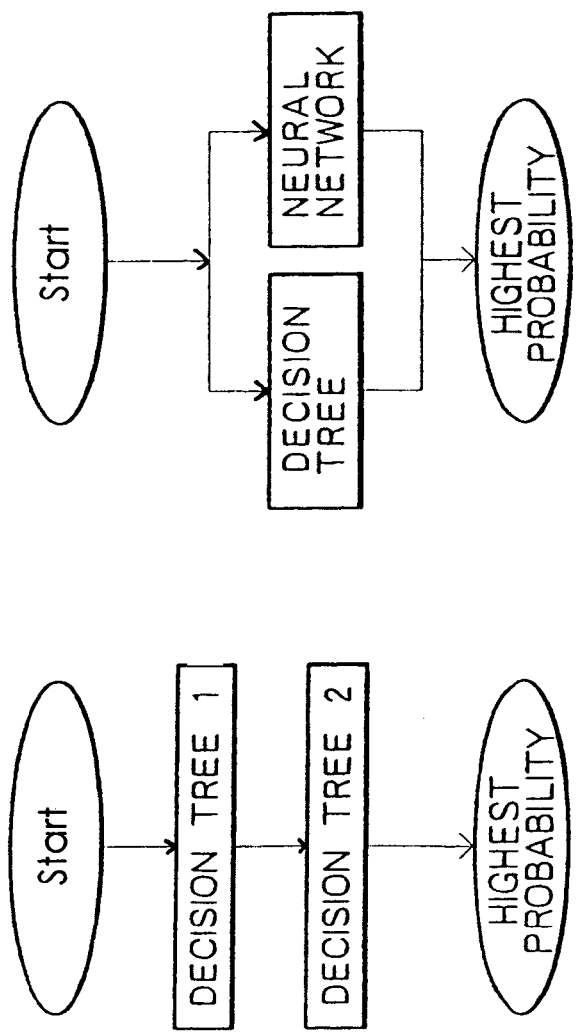

FIGS. 16A to 16C are diagrams showing a typical learning model applied by the CPU 41 to learning data in the processing carried out at the step S24.

Learning model 1 shown in FIG. 16A is a learning model applied by the CPU 41 to learning data for each advertisement mail used in test transmission 1. As shown in the figure, this learning model comprises decision trees linked to each other in a cascade connection. In this learning model, the cascade connection of the decision trees comprises 2 stages for first and second decision trees respectively. The CPU 41 carries out a learning process by adopting 2 types of analysis method. In an analysis based on the first decision tree, a response rate for each advertisement mail is predicted. In an analysis based on the second decision tree, a response rate is again predicted with respect to customers who less likely respond to the advertisement mail. In this way, it is possible to improve the precision of prediction of a response rate predicted with respect to customers who less likely respond to the advertisement mail.

Learning model 2 shown in FIG. 16B is a learning model applied by the CPU 41 to learning data for each advertisement mail used in test transmission 2. As shown in the figure, this learning model comprises a decision tree and a neural network arranged in an ensemble form. The CPU 41 adds a predicted response rate obtained from an analytical technique based on the decision tree to a predicted response rate obtained from another analytical technique based on the neural network in accordance with a weighted expression with both weights set at 1. In this way, one of the analytical techniques can compensate the prediction precision provided by the other analytical technique for its deficiency and vice versa.

Learning model 3 shown in FIG. 16C is a learning model applied by the CPU 41 to learning data for each advertisement mail used in test transmission 3. As shown in the figure, this learning model comprises an additional contrivance as selection of variables at the beginning and an analytical method based on a neural network for the selected variables.

Refer back to the flowchart shown in FIG. 15. At a step S25, the CPU 41 applies learning models (learning parameters) to assessment data. From results of the application of the learning models to the assessment data, a most effective learning model (most effective learning parameters) is selected. It should be noted that, from the results of the application of the learning models to the assessment data, an assessment chart of the assessment data can be created.

Then, at the next step S26, the CPU 41 determines and stores learning parameters based on results of assessment in the processing carried out at the step S25. The pieces of processing described above are carried out on all advertisement mails.

With reference to a flowchart shown in FIG. 17, the following description explains processing carried out by the data mining server 5 to compute an expected response probability by using learning parameters selected in the processing represented by the flowchart shown in FIG. 15. The data mining server 5 applies learning parameters extracted from a learning database to a customer database of customers each used as a target of the transmission. Then, the data mining server 5 computes an expected response probability for each customer and for every advertisement mail in case the mail is transmitted to the customer. Finally, in order to increase a response rate, the data mining server 5 determines which advertisement mail is to be transmitted to give a most effective result on the basis of the computed response probabilities.

As shown in FIG. 17, the flowchart begins with a step S41 at which the CPU 41 carries out name collect processing on demographic information. To be more specific, names of customers are put in order so that each customer is not treated as if the same customer were different customers and, if necessary, the customers are grouped into families so that different customers of a family can be put in the same group for the family.

Then, at the next step S42, the CPU 41 creates an independent variable in the same way as the processing carried out on the learning database. To put it in detail, the CPU 41 extracts a profile item from the customer database. Then, the CPU 41 carries out deficiency processing and variable formation to create the same independent variable as the independent variable created for the learning database.

Subsequently, at the next step S43, the CPU 41 applies the learning parameters saved in the processing carried out at the step S26 of the flowchart shown in FIG. 15 to the customer database.

Then, at the next step S44, the CPU 41 computes an expected response probability for every customer and for each advertisement mail in case the mail is transmitted to the customer. An advertisement mail indicating a highest calculated response rate is stored in the storage unit 48.

FIG. 18 is a table showing typical expected response probabilities computed by the data mining server 5 in the processing carried out at the step S44 of the flowchart shown in FIG. 17. To be more specific, the table shown in FIG. 18 shows expected response probabilities which are computed for contents (or advertisement mails) A, B and C in case contents A, B and C are transmitted to customers X, Y and Z.

If content A is transmitted to customer X, the expected response probability is calculated to be 3.5%. If content B is transmitted to customer X, the expected response probability is calculated to be 5.7%. If content C is transmitted to customer X, the expected response probability is calculated to be 2.8%. In this case, the data mining server 5 selects content B for customer X since customer X's expected probability of giving a response to content B is highest among contents A, B and C.

If content A is transmitted to customer Y, the expected response probability is calculated to be 4.5%. If content B is transmitted to customer Y, the expected response probability is calculated to be 1.2%. If content C is transmitted to customer Y, the expected response probability is calculated to be 0.5%. In this case, the data mining server 5 selects content A for customer Y since customer Y's expected probability of giving a response to content A is highest among contents A, B and C.

If content A is transmitted to customer Z, the expected response probability is calculated to be 0.3%. If content B is transmitted to customer Z, the expected response probability is calculated to be 0.8%. If content C is transmitted to customer Z, the expected response probability is calculated to be 1.3%. In this case, the data mining server 5 selects content C for customer Z since customer Z's expected probability of giving a response to content C is highest among contents A, B and C.

By adoption of the same method, the data mining server 5 selects an advertisement mail for each of customers using personal computers 8-1 to 8-3 which serve as targets of transmission. The data mining server 5 sends a customer an advertisement mail, to which the customer's expected probability of giving a response is highest among all contents.

FIGS. 19A to 19C each show a typical number of customers to receive an advertisement mail to be sent in an actual transmission. Each of the tables shows such a typical number of such customers, which is computed for every advertisement mail. The computation of each number of such customers is based on results of an analysis carried out by the data mining server 5 on results of a test transmission for the actual transmission.

To be more specific, the table of FIG. 19A shows the number of such customers, which is computed for each advertisement mail to be sent in actual transmission 1. It should be noted that actual transmission 1 is split into actual transmissions A1 and B1 as follows. In actual transmission A1, advertisement mails are sent by the mail server 1 to customers, from whom high response probabilities are expected. Selection of such customers is based on results of the decision tree at the first stage shown in FIG. 16A. In actual transmission B1, on the other hand, advertisement mails are sent by the mail server 1 to customers, from whom low response probabilities are expected. Selection of such customers is based on results of the decision tree at the second stage shown in FIG. 16A.

The table of FIG. 19B shows the number of such customers, which is computed for each advertisement mail to be sent in actual transmission 2. It should be noted that actual transmission 2 is split into selective actual transmission A2 and random actual transmission B2. In selective actual transmission A2, advertisement mails are sent by the mail server 1 to customers, from whom highest response probabilities are expected. In random actual transmission B2, on the other hand, advertisement mails are sent by the mail server 1 to customers selected at random in comparison with selective actual transmission A2.

The table of FIG. 19C shows the number of such customers, which is computed for each advertisement mail to be sent in actual transmission 3. It should be noted that actual transmission 3 is split into selective actual transmission A3, selective actual transmission B3 and random actual transmission C3. In main selective transmission A3, advertisement mails are sent by the mail server 1 to customers, from whom high response probabilities are expected. In selective actual transmission B3, advertisement mails are sent by the mail server 1 to customers, from whom low response probabilities are expected. In random actual transmission C3, on the other hand, advertisement mails are sent by the mail server 1 to customers selected at random in comparison with selective actual transmissions A3 and B3.

A process of collecting data obtained as a result of an actual transmission is explained by referring to a flowchart shown in FIG. 20 as follows.

As shown in the figure, the flowchart begins with a step S61 at which the data mining server 5 transmits information on customers each serving as a target of an actual transmission to the mail server 1 by way of the network 3. The information on each of the customers, which is transmitted by the data mining server 5, includes data indicating an advertisement mail, to which the customer's expected probability of giving a response is highest among all advertisement mails.

Then, at the next step S62, the mail server 1 transmits the advertisement mail to a personal computer 8 used by a customer. The customer's expected probability of giving a response to the transmitted advertisement mail indicated by the data included in the customer information received from the data mining server 5 is highest among all advertisement mails. If the customer receiving the advertisement mail wants to inspect a web page indicated by a URL included in the mail, the customer is capable of making an access to the web server 4 by merely clicking the URL.

Subsequently, at the next step S63, the web server 4 stores response information (or access information) received from the personal computer 8.

Then, at the next step S64, the web server 4 transmits the response information to the data mining server 5 by way of the network 3.

Subsequently, at the next step S65, the data mining server 5 analyzes the response information received from the web server 4 to find out a procedure for producing a higher response rate. The analysis carried out by the data mining server 5 will be described later.

FIGS. 21 to 23 are tables each showing results of a test transmission and actual transmissions of various advertisement mails as analyzed by the data mining server 5 for every advertisement mail.

To be more specific, the table of FIG. 21 shows the number of customers to whom each advertisement mail is transmitted, the number of responses received from the customers and a response rate for test transmission 1. In addition, the table also includes the number of customers to whom each advertisement mail is transmitted, the number of responses received from the customers and a response rate for actual transmission A1. Each customer serving as a target of actual transmission A1 is selected by adoption of the technique of the decision tree at the first stage described earlier. The table also includes the number of customers to whom each advertisement mail is transmitted, the number of responses received from the customers and a response rate for actual transmission B1. Each customer serving as a target of actual transmission B1 is selected by adoption of the decision tree at the second stage described earlier. The table further shows a sum of the number of customers to each serving as a target of actual transmission A1 and the number of customers each serving as a target of actual transmission B1, a sum of the number of responses from the customers each serving as a target of actual transmission A1 and the number of responses from the customers each serving as a target of actual transmission B1 and a combined response rate for actual transmissions A1 and B1.

To put it in detail, as shown in the table of FIG. 21, the total number of customers to whom all advertisement mails are sent in test transmission 1 is 102,563, the total number of responses from the customers each serving as a target of test transmission 1 is 1,024 and, hence, the response rate for all the advertisement mails in test transmission 1 is 1.00%. The total number of customers to whom all advertisement mails are sent in actual transmission A1 is 13,429, the total number of responses from the customers each serving as a target of actual transmission A1 is 404 and, hence, the response rate for all the advertisement mails in actual transmission A1 is 3.01%. The expected probability that a customer serving as a target of actual transmission A1 gives a response to the advertisement mail is high. The total number of customers to whom all the advertisement mails are sent in actual transmission B1 is 58,053, the total number of responses from the customers each serving as a target of actual transmission B1 is 336 and, hence, the response rate for all the advertisement mails in actual transmission B1 is 0.58%. The expected probability that a customer serving as a target of actual transmission B1 gives a response to the advertisement mail is low. The sum of the total number of customers to each serving as a target of actual transmission A1 and the total number of customers each serving as a target of actual transmission B1 is 71,482, the sum of the total number of responses from the customers each serving as a target of actual transmission A1 and the total number of responses from the customers each serving as a target of actual transmission B1 is 740 and, hence, the combined response rate for actual transmissions A1 and B1 is 1.04%.

Similarly, the table of FIG. 22 shows the number of customers to whom each advertisement mail is transmitted, the number of responses received from the customers and a response rate for test transmission 2. In addition, the table also includes the number of customers to whom each advertisement mail is transmitted, the number of responses received from the customers and a response rate for actual transmission 2. The table further shows the number of randomly selected customers to whom each advertisement mail is transmitted, the number of responses received from such customers and a response rate for the random transmission 2.

To put it in detail, as shown in the table of FIG. 22, the total number of customers to whom all the advertisement mails are sent in test transmission 2 is 76,644, the total number of responses from the customers each serving as a target of test transmission 2 is 660 and, hence, the response rate for all the advertisement mails in test transmission 2 is 0.86%. The total number of customers to whom all the advertisement mails are sent in actual transmission 2 is 71,820, the total number of responses from the customers each serving as a target of actual transmission 2 is 969 and, hence, the response rate for all the advertisement mails in actual transmission 2 is 1.35%. The total number of customers to whom all the advertisement mails are sent in random transmission is 25,581, the total number of responses from the customers each serving as a target of random transmission is 250 and, hence, the response rate for all the advertisement mails in random transmission 2 is 0.98%.

Likewise, the table of FIG. 23 shows the number of customers to whom each advertisement mail is transmitted, the number of responses received from the customers and a response rate for test transmission 3. In addition, the table also includes the number of customers to whom each advertisement mail is transmitted, the number of responses received from the customers and a response rate for actual transmission A3. The expected probability that a customer serving as a target of actual transmission A3 gives a response to the advertisement mail is high. The table also includes the number of customers to whom each advertisement mail is transmitted, the number of responses received from the customers and a response rate for actual transmission B3. The expected probability that a customer serving as a target of actual transmission B3 gives a response to the advertisement mail is low. The table further shows the number of randomly selected customers to whom each advertisement mail is transmitted, the number of responses received from such customers and a response rate for the random transmission 3. The table still further shows a sum of the number of customers to each serving as a target of actual transmission A3 and the number of customers each serving as a target of actual transmission B3, a sum of the number of responses from the customers each serving as a target of actual transmission A3 and the number of responses from the customers each serving as a target of actual transmission B3 and a combined response rate for actual transmissions A3 and B3.

To put it in detail, as shown in the table of FIG. 23, the total number of customers to whom all advertisement mails are sent in test transmission 3 is 61,517, the total number of responses from the customers each serving as a target of test transmission 3 is 389 and, hence, the response rate for all the advertisement mails in test transmission 1 is 0.63%. The total number of customers to whom all the advertisement mails are sent in actual transmission A3 is 26,368, the total number of responses from the customers each serving as a target of actual transmission A3 is 461 and, hence, the response rate for all the advertisement mails in actual transmission A3 is 1.75%. The expected probability that a customer serving as a target of actual transmission A3 gives a response to the advertisement mail is high. The total number of customers to whom all the advertisement mails are sent in actual transmission B3 is 55,386, the total number of responses from the customers each serving as a target of actual transmission B3 is 308 and, hence, the response rate for all the advertisement mails in actual transmission B3 is 0.56%. The expected probability that a customer serving as a target of actual transmission B3 gives a response to the advertisement mail is low. The total number of customers to whom all the advertisement mails are sent in random transmission is 30,774, the total number of responses from the customers each serving as a target of random transmission is 249 and, hence, the response rate for all the advertisement mails in random transmission 3 is 0.81%. The sum of the total number of customers to whom all the advertisement mails are sent in actual transmission A3 and the total number of customers to whom all the advertisement mails are sent in actual transmission B3 is 81,754, the sum of the total number of responses from the customers each serving as a target of actual transmission A3 and the total number of responses from the customers each serving as a target of actual transmission B3 is 769 and, hence, the combined response rate for actual transmissions A3 and B3 is 0.94%.

It is possible to create an assessment chart based on the response results shown in FIGS. 21 to 23 and expected response probabilities computed in advance.

Variations in response rate among advertisement mails in the response results shown in FIGS. 21 to 23 can be expressed as a ratio of a maximum response rate to a minimum response rate. In the case of test transmission 1 shown in FIG. 21, for example, the catch copy with a title of "Touching Hearts of Each Other" gets a maximum response rate of 1.30% and the catch copy with a title of "Peace of Mind" gets a minimum response rate of 0.76%. Thus, the response ratio is:

$$1.30 \div 0.76 = 1.71$$

In the case of test transmission 2 shown in FIG. 22, the catch copy with a title of "Convenience" gets a maximum response rate of 1.54% and the catch copy with a title of "Excitements" gets a minimum response rate of 0.61%. Thus, the response ratio is:

$$1.54 \div 0.61 = 2.56$$

In the case of test transmission 3 shown in FIG. 23, for example, the catch copy with a title of "Handle" gets a maximum response rate of 0.71% and the catch copy with a title of "Peace of Mind" gets a minimum response rate of 0.49%. Thus, the response ratio is:

$$0.71 \div 0.49 = 1.42$$

As is obvious from the above results, the response rate varies in dependence on the catch copy of the advertisement mail sent to customers.

If catch copies are arranged in an order of decreasing response rates, the order of the catch copies of test transmission 2 shown in FIG. 22 is "Convenience," "Peace of Mind," "Real Things," "Fashion," and "Excitements" whereas the order of the catch copies of random transmission 2 shown in FIG. 22 is also "Convenience," "Peace of Mind," "Real Things," "Fashion," and "Excitements" as well. On the other hand, the order of the catch copies of test transmission 3 shown in FIG. 23 is "Handle," "Be Provided," and "Peace of Mind" whereas the order of the catch copies of random transmission 3 shown in FIG. 23 is also "Handle," "Be Provided," and "Peace of Mind" as well. It is obvious that the order of the response rates for a test transmission is the same as that of a random transmission in which customers each serving as a target of the random transmission are selected at random. Nevertheless, the response rate varies in dependence on the catch copy.

FIGS. 24 to 29 are tables each showing a response rate for each advertisement mail and each customer profile in the case of test transmission 1. In the case of the table shown in FIG. 24, customer profiles are grouped by age and gender. A response rate for every catch copy is shown for each group. In the case of the table shown in FIG. 25, customer profiles are grouped by occupation, and a response rate for every catch copy is shown for each group. In the case of the table shown in FIG. 26, customer profiles are grouped by income, and a response rate for every catch copy is shown for each group. In the case of the table shown in FIG. 27, customer profiles are grouped by domain, and a response rate for every catch copy is shown for each group. In the case of the table shown in FIG. 28, customer profiles are grouped by hobby, and a response rate for every catch copy is shown for each group. In the case of the table shown in FIG. 29, customer profiles are grouped by response making an access to information and commercial in the past, and a response rate for every catch copy is shown for each group.

Assume that the response rate varies from catch copy to catch copy all but in the same way for each customer-profile group. In this case, a catch copy that has a highest response rate for a specific customer-profile group shows a highest response rate for almost all customer-profile groups. The highest response rates of such a catch copy in all customer-profile groups are represented by a highest response rate in total data. In the case of the table shown in FIG. 24, for example, the catch copy having a title of "Touching Hearts of Each Other" has a highest response rate in total data. Thus, the catch copy having a title of "Touching Hearts of Each Other" can be regarded as a catch copy that shows a highest response rate for almost all customer-profile groups. As is obvious from the table shown in FIG. 24, however, the response rate varies from catch copy to catch copy in a way, which changes from group to group. For males in their teens, for example, catch copies are arranged in an order of decreasing response rates as follows: "Excitements," "Stylish," "Making Profits," "Touching Hearts of Each Other" and "Peace of Mind." For males in their twenties, on the other hand, catch copies are arranged in an order of decreasing response rates as follows: "Touching Hearts of Each Other," "Excitements," "Making Profits," "Stylish" and "Peace of Mind."

An expected response probability is computed in advance from results of a test transmission for each customer to serve as a target of an actual transmission. Thus, the data mining server 5 is capable of creating an assessment chart from the expected response probabilities computed in advance and response results of an actual transmission like those shown in FIGS. 21 to 23.

FIG. 30 shows an assessment chart created by the data mining server 5 on the basis of the response results shown in FIG. 21 for actual transmission A1.

Figure 31:
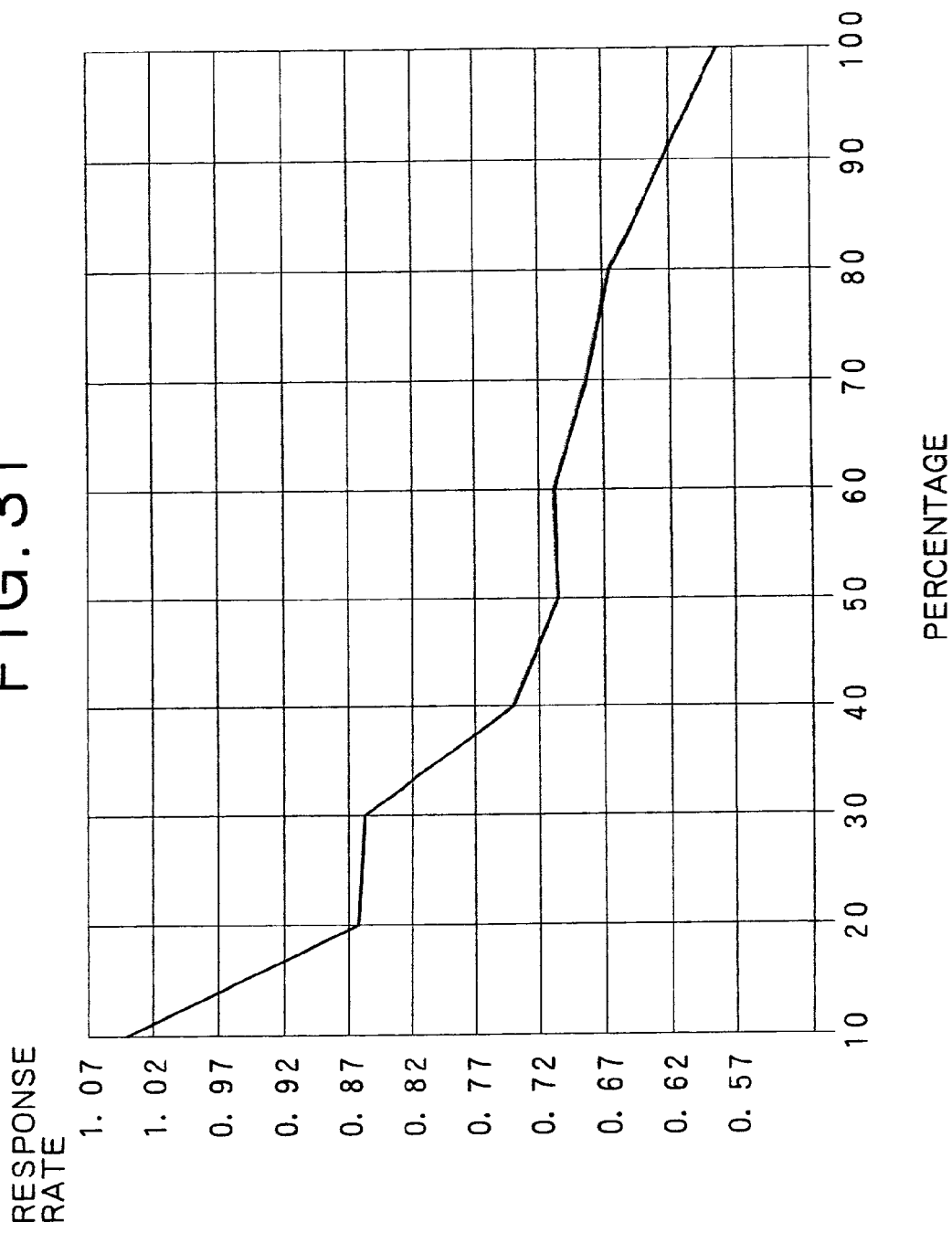
FIG. 31 is a diagram showing an assessment chart based on results of actual transmission B1.

FIG. 31 shows an assessment chart created by the data mining server 5 on the basis of the response results shown in FIG. 21 for actual transmission B1.

Figure 32:
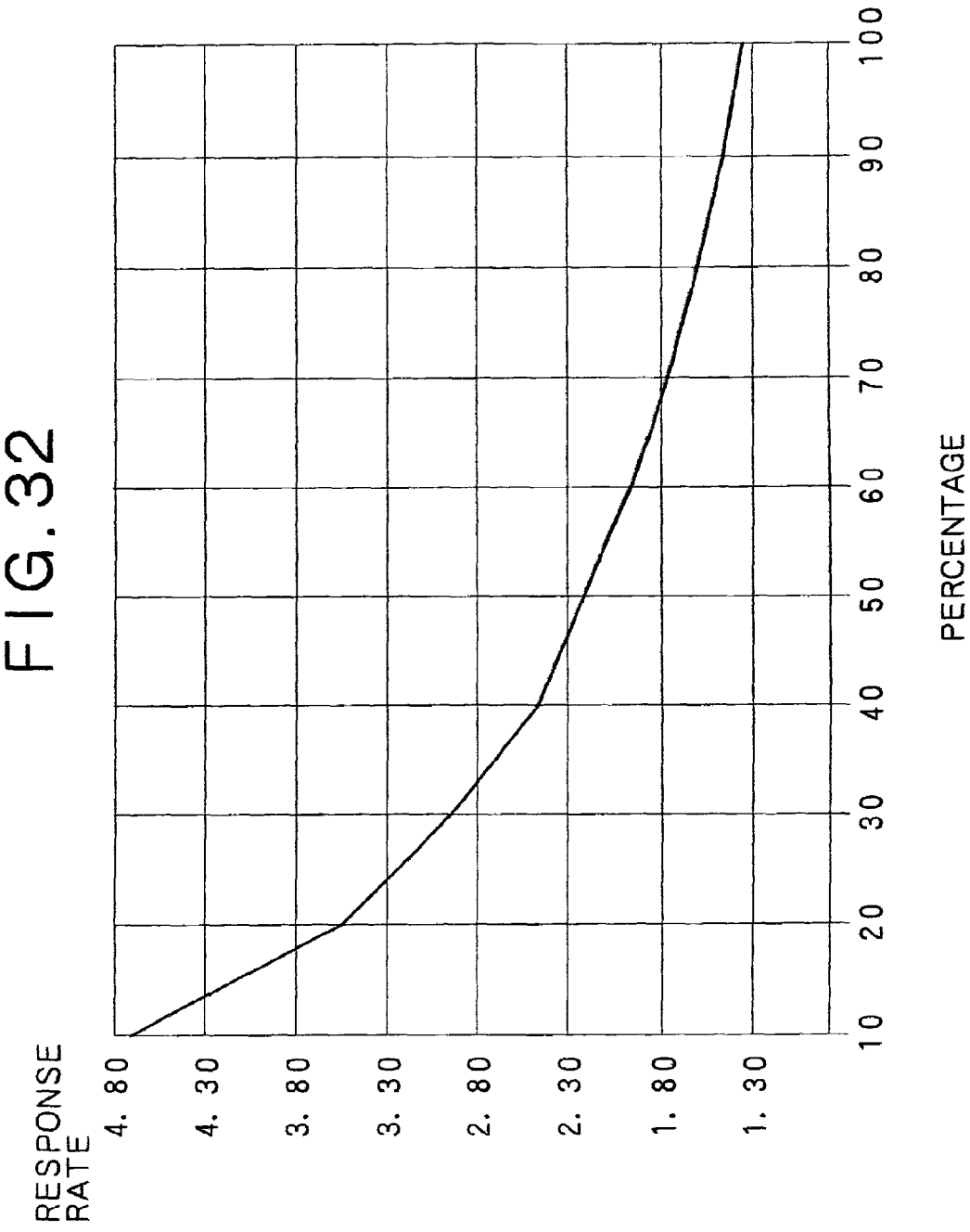
FIG. 32 is a diagram showing an assessment chart based on results of actual transmission 2.

FIG. 32 shows an assessment chart created by the data mining server 5 on the basis of the response results shown in FIG. 22 for actual transmission 2.

FIG. 33 shows an assessment chart created by the data mining server 5 on the basis of the response results shown in FIG. 23 for actual transmission 3.

In each of the figures showing the assessment charts, the vertical axis represents the actual response rate extracted from response results of an optimum transmission while the horizontal axis represents a ratio of the number of specific customers to the total number of customers each serving as a target of a transmission for which the chart is created. The ratio is expressed in terms of percents. The number of specific customers is counted starting with those having highest expected response probabilities among the customers each serving as a target of the transmission. In the optimum transmission, all advertisement mails of different contents are sent to customers selected optimally on the basis of their expected probabilities of responses to the mails as will be described later.

Figure 34A:
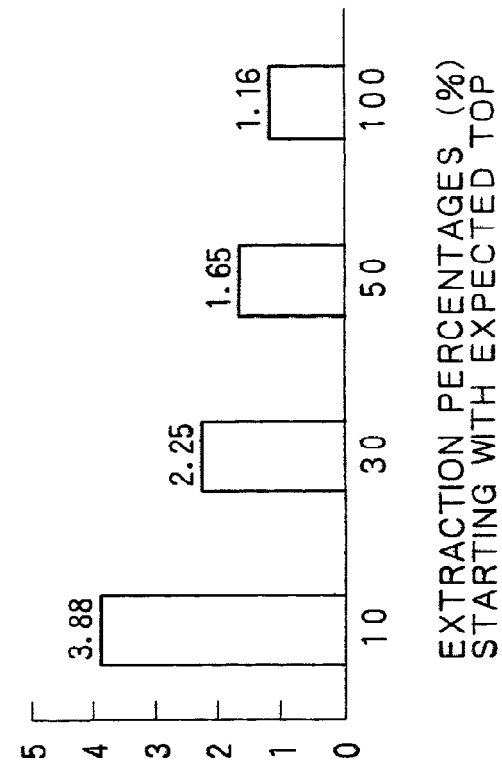
FIGS. 34A and 34B are explanatory diagrams showing histograms each representing a relative assessment chart based on results of an actual transmission.
Figure 34B:
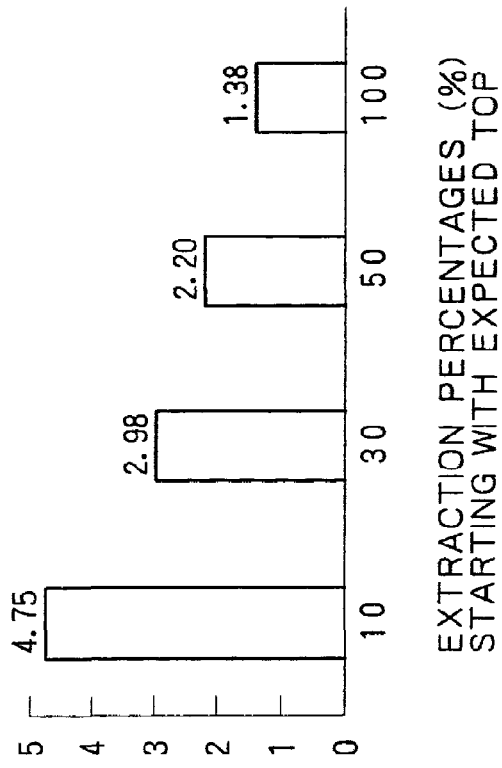

FIGS. 34A and 34B show relative histograms each replacing an assessment chart. To be more specific, FIG. 34A is a relative histogram with the average response rate of random transmission 2 of actual transmission 2 taken as a reference. The histogram shown in FIG. 34A corresponds to the assessment chart shown in FIG. 32. On the other hand, FIG. 34B is a histogram with the average response rate of random transmission 3 of actual transmission 3 taken as a reference. The histogram shown in FIG. 34B corresponds to the assessment chart shown in FIG. 33.

To put it in detail, the vertical axis of FIG. 34A represents a ratio of the response rate of an optimum transmission to the average response rate of a random transmission. In the case of actual transmission 2, the average response rate of random transmission 2 is 0.98% as shown in FIG. 22. Thus, the vertical axis represents the ratio of the response rate of the optimum transmission to 0.98. As described above, in the optimum transmission of actual transmission 2, the 5 different advertisement mails are sent to customers selected optimally on the basis of their expected probabilities of responses to the mails. The response rates of the optimum transmission are obtained from FIG. 32. Thus, the ratio represents improvements over the random transmission, which result from the optimum transmission in which customers are selected optimally. On the other hand, the horizontal axis represents a ratio of the number of specific customers to the total number of customers each serving as a target of the transmission. The ratio is expressed in terms of percents. The number of specific customers is counted starting with those having highest expected response probabilities among the customers each serving as a target of the transmission.

The histogram shown in FIG. 34B is the same as that shown in FIG. 34A except that the average response rate of random transmission 3 is 0.81% as shown in FIG. 23 and the response rates of the optimum transmission are obtained from FIG. 33.

To put it concretely, refer to the histogram shown in FIG. 34A. For the top 10% of the customers, the response rate is 4.65% as shown in FIG. 32. Thus, the response rate relative to the average response rate of 0.98% for random transmission 2 is:

$$4.65 \div 0.98 = 4.75.$$

By the same token, for the top 30% of the customers, the response rate is 2.92% as shown in FIG. 32. Thus, the response rate relative to the average response rate of random transmission 2 is:

$$2.92 \div 0.98 = 2.98.$$

In the same way, for the top 50% of the customers, the response rate is 2.16% as shown in FIG. 32. Thus, the response rate relative to the average response rate of random transmission 2 is:

$$2.16 \div 0.98 = 2.20.$$

Likewise, for the top 100% of the customers, the response rate is 1.35% as shown in FIG. 32. Thus, the response rate relative to the average response rate of random transmission 2 is:

$$1.35 \div 0.98 = 1.38.$$

Similarly, refer to the histogram shown in FIG. 34B. For the top 10% of the customers, the response rate is 3.14% as shown in FIG. 33. Thus, the response rate relative to the average response rate of 0.81% for random transmission 3 as shown in FIG. 23 is:

$$3.14 \div 0.81 = 3.88.$$

By the same token, for the top 30% of the customers, the response rate is 1.82% as shown in FIG. 33. Thus, the response rate relative to the average response rate of random transmission 3 is:

$$1.82 \div 0.81 = 2.25.$$

In the same way, for the top 50% of the customers, the response rate is 1.34% as shown in FIG. 33. Thus, the response rate relative to the average response rate of random transmission 3 is:

$$1.34 \div 0.81 = 1.65.$$

Likewise, for the top 100% of the customers, the response rate is 0.94% as shown in FIG. 33. Thus, the response rate relative to the average response rate of random transmission 3 is:

$$0.94 \div 0.81 = 1.16.$$

By sending a plurality of advertisement mails with different contents to customers selected optimally, it is possible to obtain a high response rate in comparison with a transmission of the mails to customers selected at random. Optimal customers to receive a content are selected as follows.

As shown in FIGS. 24 to 29, the response rate changes in accordance with the customer profile. Thus, the data mining server 5 is capable of finding a response pattern based on customer profiles and expected response probabilities as shown in FIG. 35. A response pattern is not a relation between the response rate and the customer profile, which are shown in FIGS. 24 to 29. Instead, the response pattern for a content is a pattern based on a principle defining a relation between the customer profile and the expected probability of a response to the content.

To put it concretely, the response pattern shown in FIG. 35 is a typical relation between the customer profile and the expected response probability for content A. An example of the customer profile is the age or the income. The data mining server 5 is thus capable of assuring a response rate greater than a desired response rate and, at the same time, limiting the number of customers to serve as recipients of advertisement mails sent by the mail server 1 by selecting only customers each having an expected response probability greater than a threshold value. Customers each having an expected response probability greater than the threshold value are represented by a hatched portion shown in FIG. 35. The threshold value is an expected response probability corresponding to the desired response rate, which can be found by computing the area of the hatched portion.

It should be noted that content A can be an advertisement mail described earlier or a banner advertisement displayed on a web page. Contents B, C, D and E described later are similar to content A.

If only 1 content is provided, only one response pattern like the one shown in FIG. 35 is obtained. By slightly modifying a content, however, a plurality of contents different from each other can be provided. For these different contents, it is possible to obtain a plurality of response patterns typically like those shown in FIG. 36.

Figure 36:
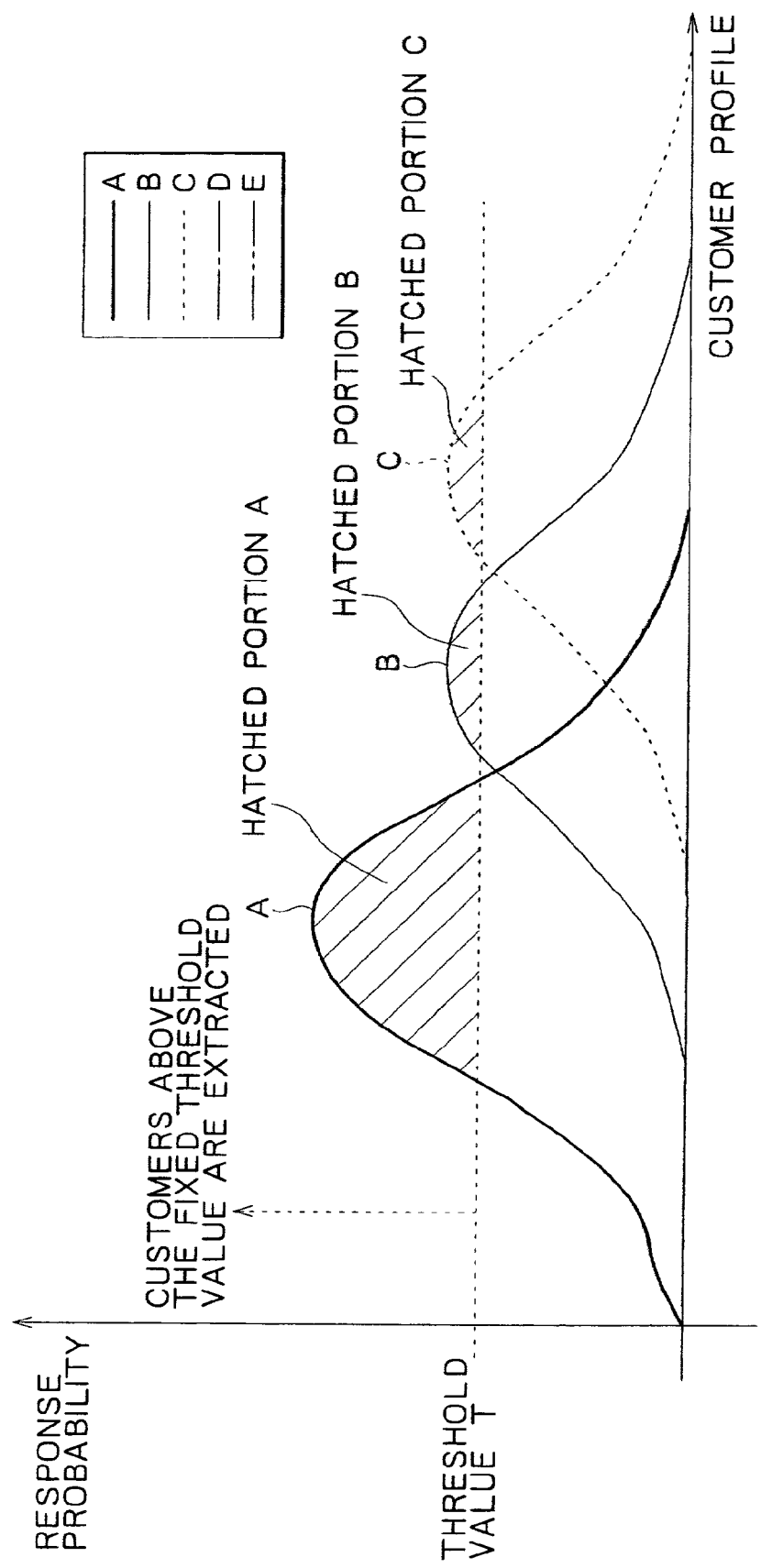
FIG. 36 is a diagram showing another response pattern.

To put it concretely, FIG. 36 shows response patterns for contents A, B and C. The data mining server 5 sets the threshold value at an expected response probability corresponding to a desired response rate, and the mail server 1 sends contents A, B and C only to their respective customers each having an expected response probability at least equal to the threshold value. In the response patterns shown in FIG. 36, the mail server 1 sends content A only to customers represented by hatched portion A. By the same token, the mail server 1 sends content B only to customers represented by hatched portion B and content C only to customers represented by hatched portion C. It is thus capable of assuring a response rate greater than a desired response rate and, at the same time, limiting the number of customers to serve as recipients of advertisement mails.

In an optimum transmission, in addition to the above selection of optimum customers, an optimum content to be sent to particular customers can also be selected among a plurality of available contents. The following description explains the processing to select a content to be sent to its customers on the basis of a threshold value set by the data mining server 5 by referring to a flowchart shown in FIG. 37. It should be noted that the data mining server 5 is assumed to have acquired results of a test transmission.

As shown in the figure, the flowchart begins with a step S81 at which the CPU 41 analyzes profiles of customers on the basis of the results of the test transmission.

Then, at the next step S82, the CPU 41 computes an expected response probability for each of the customers. The CPU 41 computes the expected response probability by typically carrying out the pieces of processing which are represented by the flowcharts shown in FIGS. 15 and 17.

Subsequently, at the next step S83, the CPU 41 creates an assessment chart typically like the one shown in FIG. 35 or 36 from the results of the analysis of customer profiles which was carried out at the step S81 and the expected response probabilities computed in the processing carried out at the step S82.

Then, at the next step S84, the CPU 41 sets the threshold value at an expected response probability corresponding a desired response rate entered by the person in charge of the data mining server 5 via the input unit 46.

Subsequently, at the next step S85, the CPU 41 selects customers each having an expected response probability at least equal to the threshold value set in the processing carried out at the step S84, and determines a content to be sent by the mail server 1 for each of the selected customers. In the case of the response pattern shown in FIG. 35, the CPU 41 determines content A to be sent by the mail server 1 to selected customers represented by hatched portion A. In the case of the response patterns shown in FIG. 36, the CPU 41 determines contents A, B and C to be sent by the mail server 1 to selected customers represented by hatched portions A, B and C respectively.

Then, at the next step S86, the CPU 41 stores information on customers in the storage unit 48. The customer information stored in the storage unit 48 includes information on a content selected for transmission to each of customers and a customer ID assigned to each of the customers.

Subsequently, at the next step S87, the CPU 41 transmits the customer information stored in the storage unit 48 in the processing carried out at the step S86 to the mail server 1 from the communication unit 49.

Figure 38:
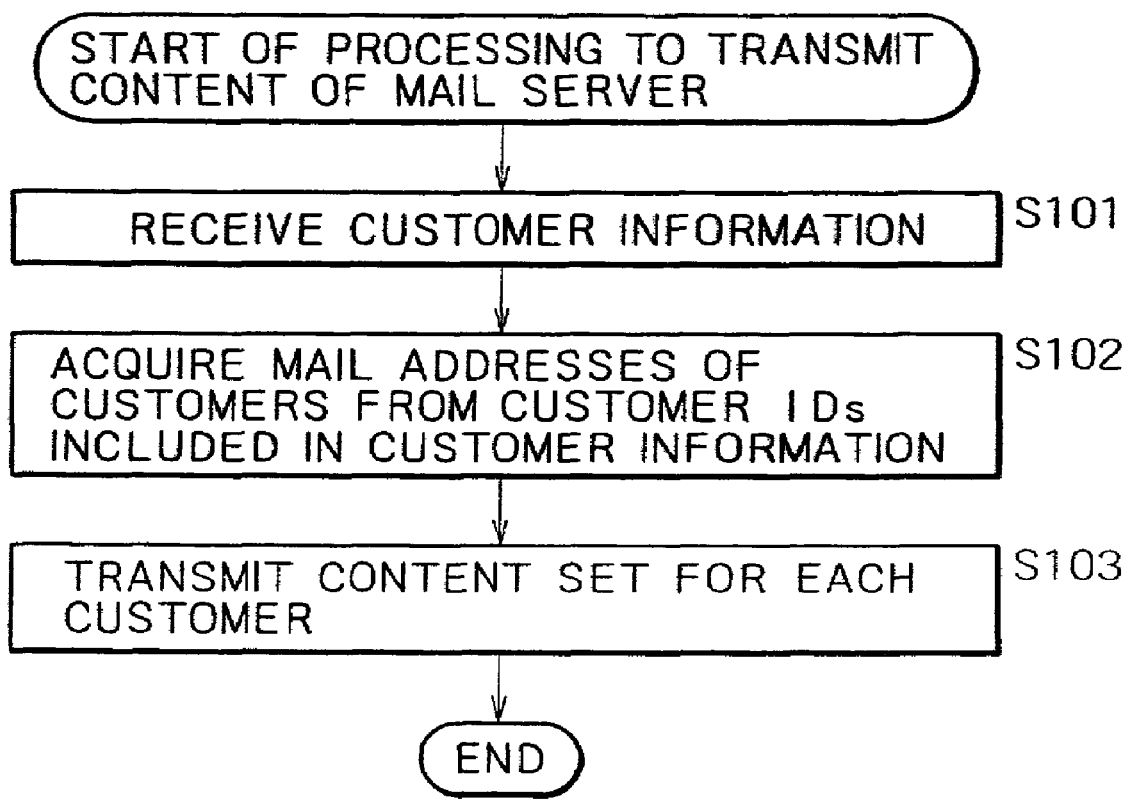
FIG. 38 is a flowchart representing processing carried out by the mail server.

The following description explains processing carried out by the mail server 1 to send a content to customers by referring to a flowchart shown in FIG. 38. The content and the customers are specified in information on customers.

As shown in the figure, the flowchart begins with a step S101 at which the CPU 21 receives information on customers from the data mining server 5 through the communication unit 29.

Subsequently, at the next step S102, the CPU 21 searches the customer-information database 2 for mail addresses of the customers identified by IDs included in the customer information received from the data mining server 5 in the processing carried out at the step S101.

Next, at the next step S103, the CPU 21 gets a content to be sent to customers specified in the information on customers, and transmits the content to the personal computers 8 used by the customers from the communication unit 29 by way of the network 3. The content also specified in the customer information received from the data mining server 5 should generate responses from the customers at least a desired rate corresponding to the threshold value.

Figure 39:
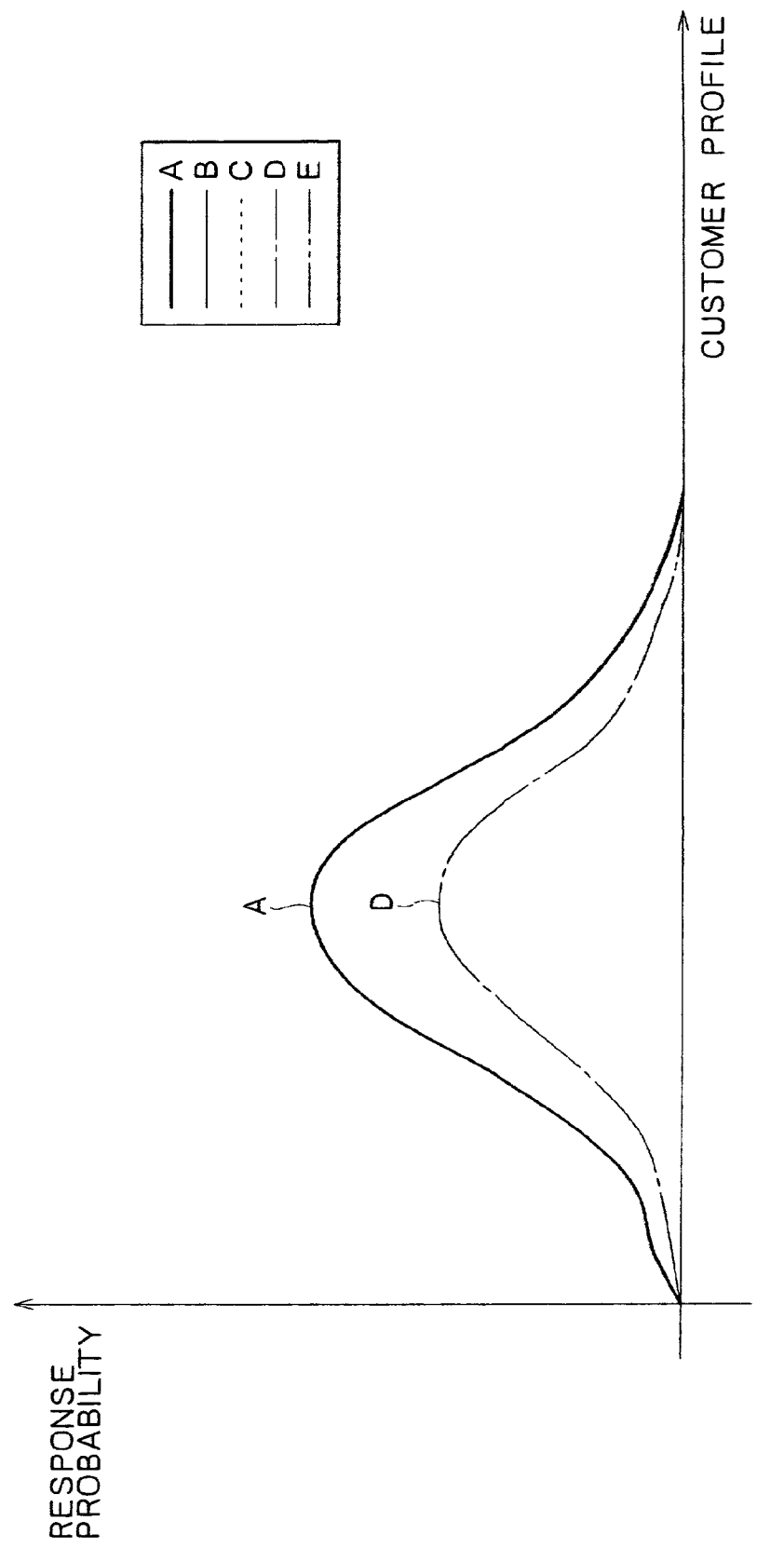
FIG. 39 is a diagram showing a still other response pattern.
Figure 40:
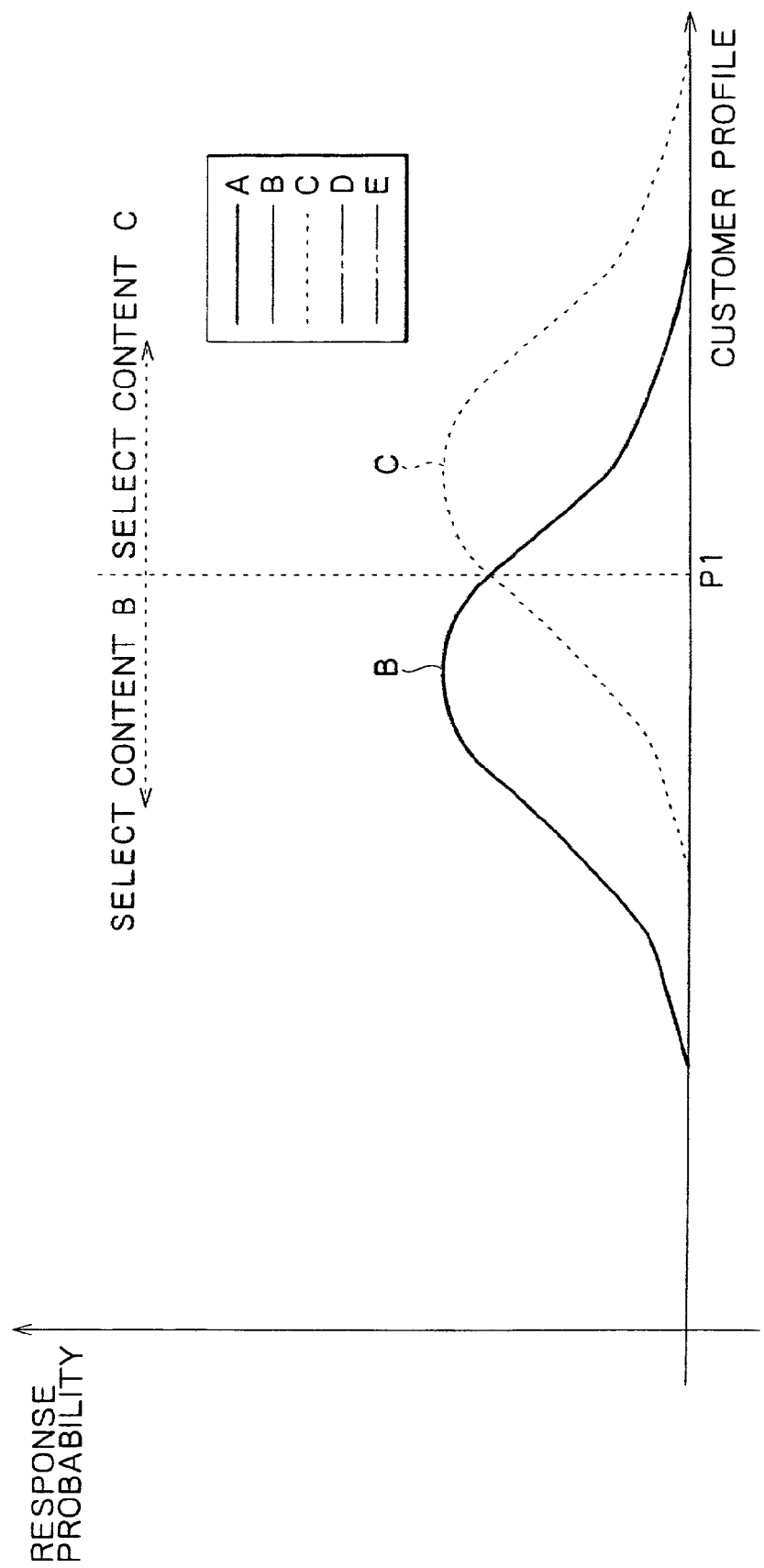
FIG. 40 is a diagram showing a further response pattern.
Figure 41:
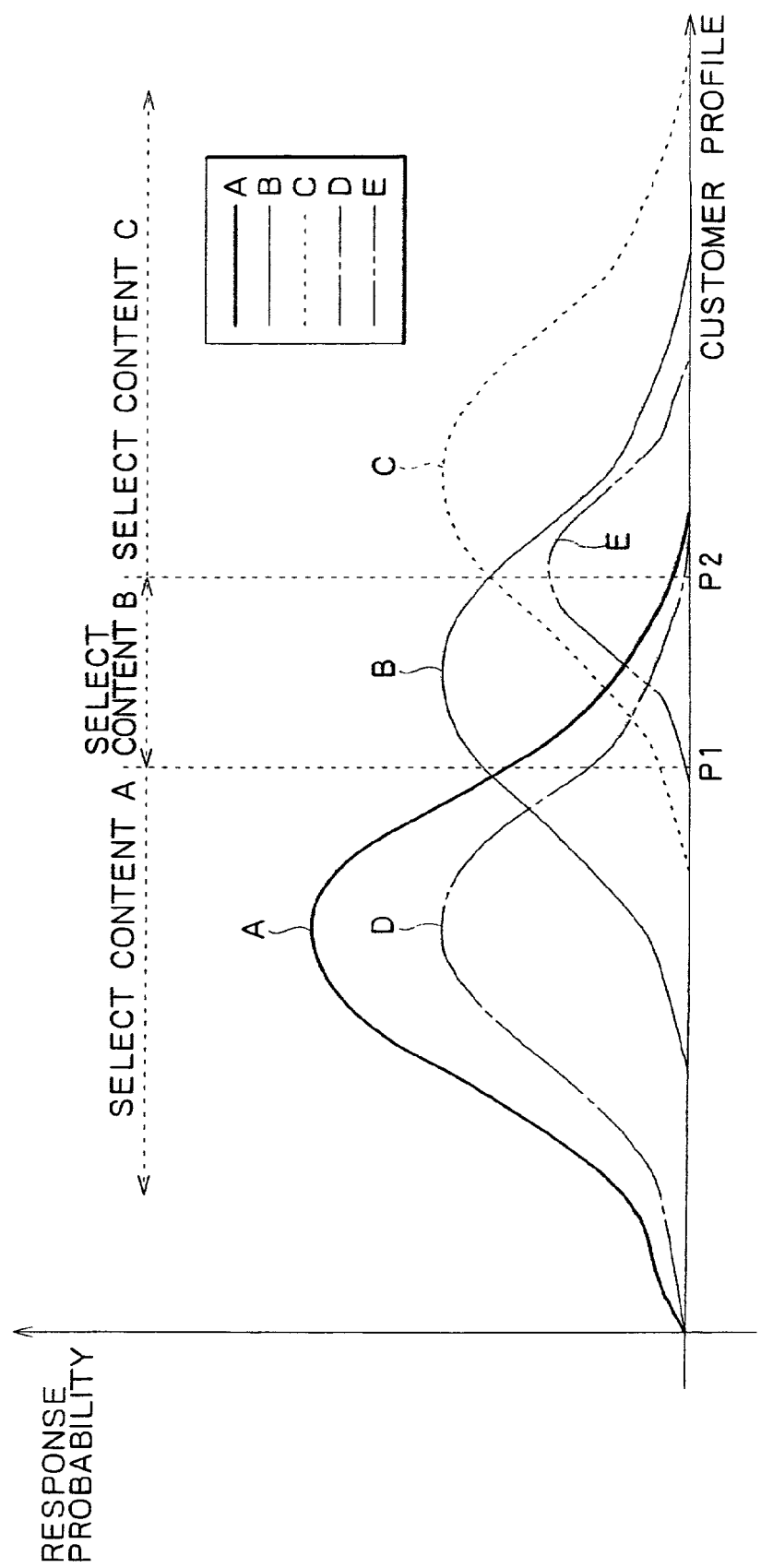
FIG. 41 is a diagram showing a still further response pattern.

The following description explains another technique adopted by the data mining server 5 to select a content that increases the number of responses from a plurality of contents, limits the number of customers by determining only specific customers to receive the selected content from the mail server 1 and hence increases a response rate by referring to FIGS. 39 to 41.

FIG. 39 is a diagram showing response patterns for contents A and D. As described earlier, a response pattern is a relation between the customer profile and the expected response probability. The response patterns shown in FIG. 39 have shapes coinciding with each other with respect to the customer profile but different maximum expected response probabilities. In this case, the data mining server 5 selects content A having expected response probabilities greater than those of content D. Thus, by having the mail server 1 send content A instead of content D, it is possible to limit the number of transmissions to customers by not sending content B to customers supposed to receive content D, increase the number of responses due to greater expected response probabilities and hence increase a response rate.

FIG. 40 is a diagram showing response patterns for contents B and C. Also in this case, a response pattern is a relation between the customer profile and the expected response probability. The response patterns shown in FIG. 40 have shapes partially overlapping each other with respect to the customer profile and all but equal maximum expected response probabilities. In this case, the data mining server 5 may select content B or C. Thus, the mail server 1 may send content B to customers having profiles on the left side of point P1, or send content C to customers having profiles on the right side of point P1, where point P1 is a customer profile at the intersection of the 2 response patterns.

FIG. 41 is a diagram showing response patterns for contents A, B, C, D and E. Also in this case, a response pattern is a relation between the customer profile and the expected response probability. In selection of contents to be sent by server 1 to customers among those shown in the figure, the data mining server 5 divides customer profiles into regions separated by points P1 and P2 where point P1 is a customer profile at the intersection of the response patterns of contents A and B whereas point P2 is a customer profile at the intersection of the response patterns of contents B and C. To put it in detail, the mail server 1 may send content A to customers having profiles in the region on the left side of point P1. This is because the response pattern of content A exhibits a largest maximum expected response probability in this region. The mail server 1 may also send content B to customers having profiles in the region between points P1 and P2. This is because the response pattern of content B exhibits a largest maximum expected response probability in this region. The mail server 1 may also send content C to customers having profiles in the region on the right side of point P2. This is because the response pattern of content C exhibits a largest maximum expected response probability in this region.

Figure 42:
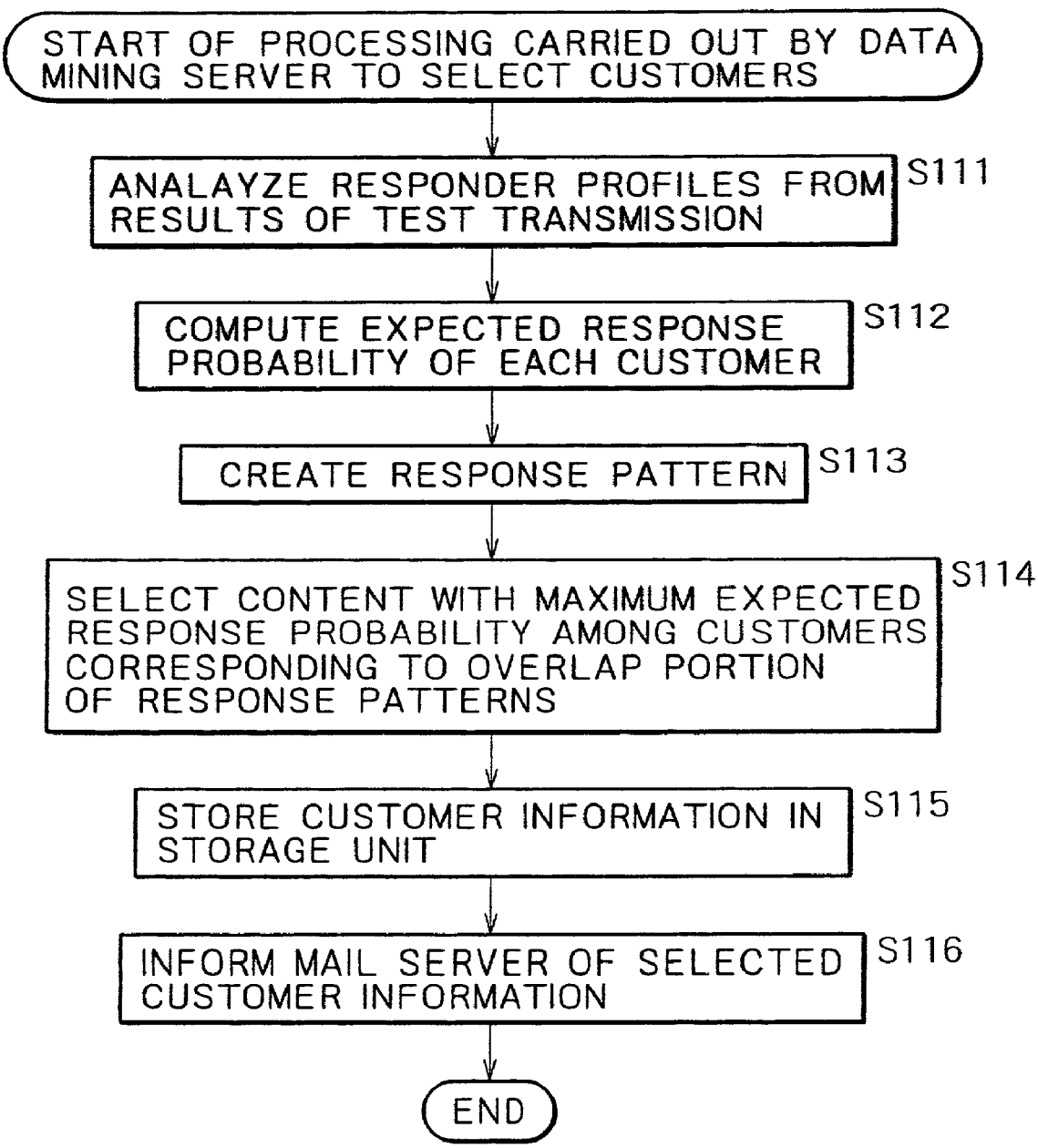
FIG. 42 is a flowchart representing further processing carried out by the data mining server.

By referring to a flowchart shown in FIG. 42, the following description explains the processing carried out by the data mining server 5 to classify positions of response patterns by customer profile and select a content to be sent to customers in accordance with the classified position of the response pattern for the content.

Figure 37:
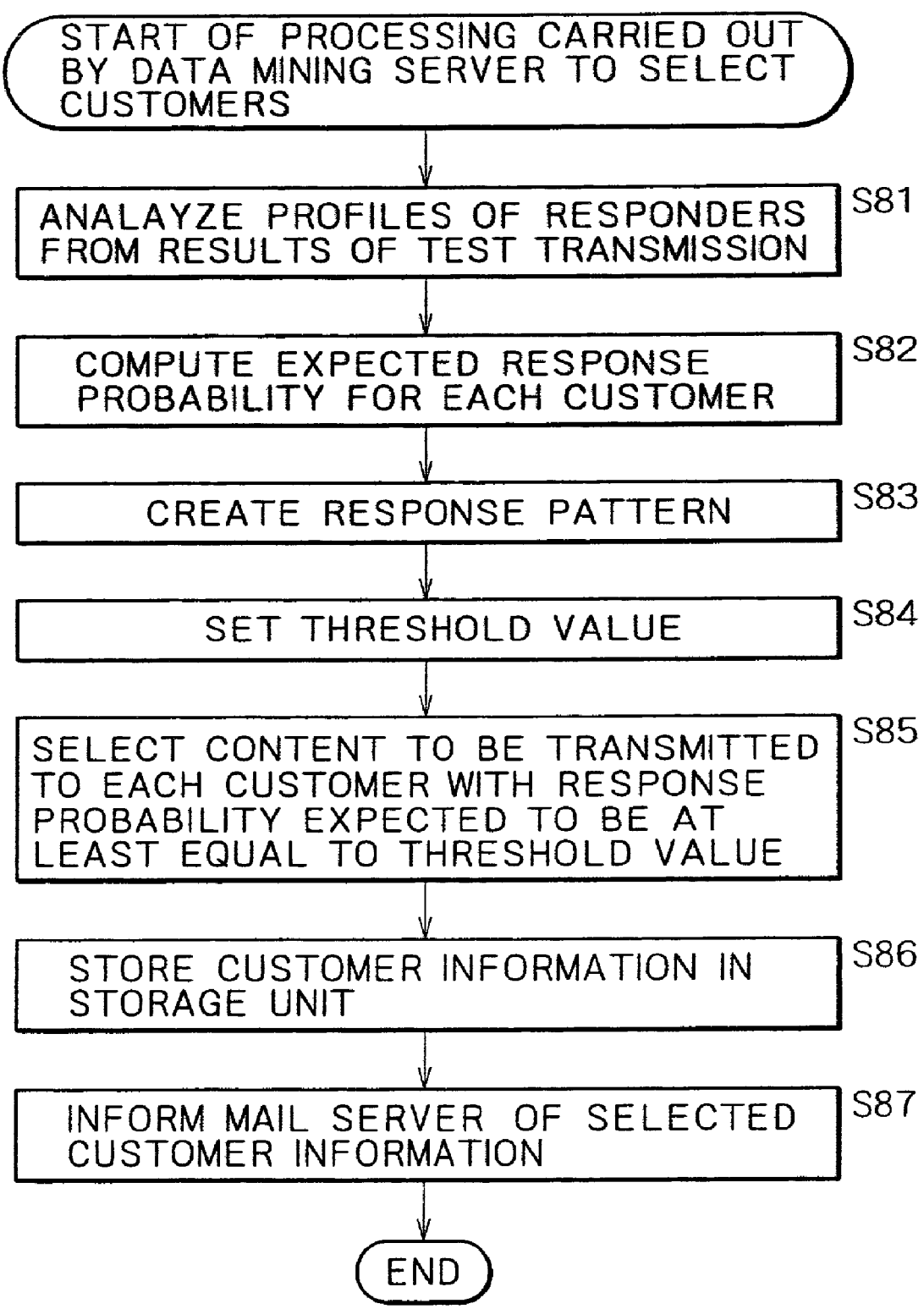
FIG. 37 is a flowchart representing still other processing carried out by the data mining server.

Since pieces of processing carried out at steps S111 to S113 of the flowchart shown in FIG. 42 are the same as those carried out at respectively the steps S81 to S83 of the flowchart shown in FIG. 37, their explanation is not repeated. In these pieces of processing, response patterns are each created from results of a test transmission.

Then, at the next step S114, for customers having customer profiles in an overlap region of the response patterns, the CPU 41 selects a content that exhibits largest expected response probabilities in the overlap region of the response patterns. In the case of the response patterns shown in FIG. 39, the data mining server 5 selects content A for customers over the entire customer-profile region. In the case of the response patterns shown in FIG. 40, the data mining server 5 selects content B for customers having profiles on the left side of point P1, or content C for customers having profiles on the right side of point P1. In the case of the response patterns shown in FIG. 41, the data mining server 5 selects content A for customers having profiles in the region on the left side of point P1 because the response pattern of content A exhibits a largest maximum expected response probability in the region on the left side of point P1, content B for customers having profiles in the region between points P1 and P2 because the response pattern of content B exhibits a largest maximum expected response probability in the region between points P1 and P2, or content C for customers having profiles in the region on the right side of point P2 because the response pattern of content C exhibits a largest maximum expected response probability in the region on the right side of point P2.

Subsequently, at the next step S115, the CPU 41 stores information on customers in the storage unit 48. The information on customers includes information on a content selected for each of the customers in the processing carried out at the step S114.

Then, at the next step S116, the CPU 41 transmits the customer information stored in the storage unit 48 in the processing carried out at the step S115 to the mail server 1 from the communication unit 49.

Receiving the information on customers from the data mining server 5, the mail server 1 carries out the processing represented by the flowchart shown in FIG. 38. Since this processing has been described earlier, it is not necessary to repeat the explanation.

Figure 43:
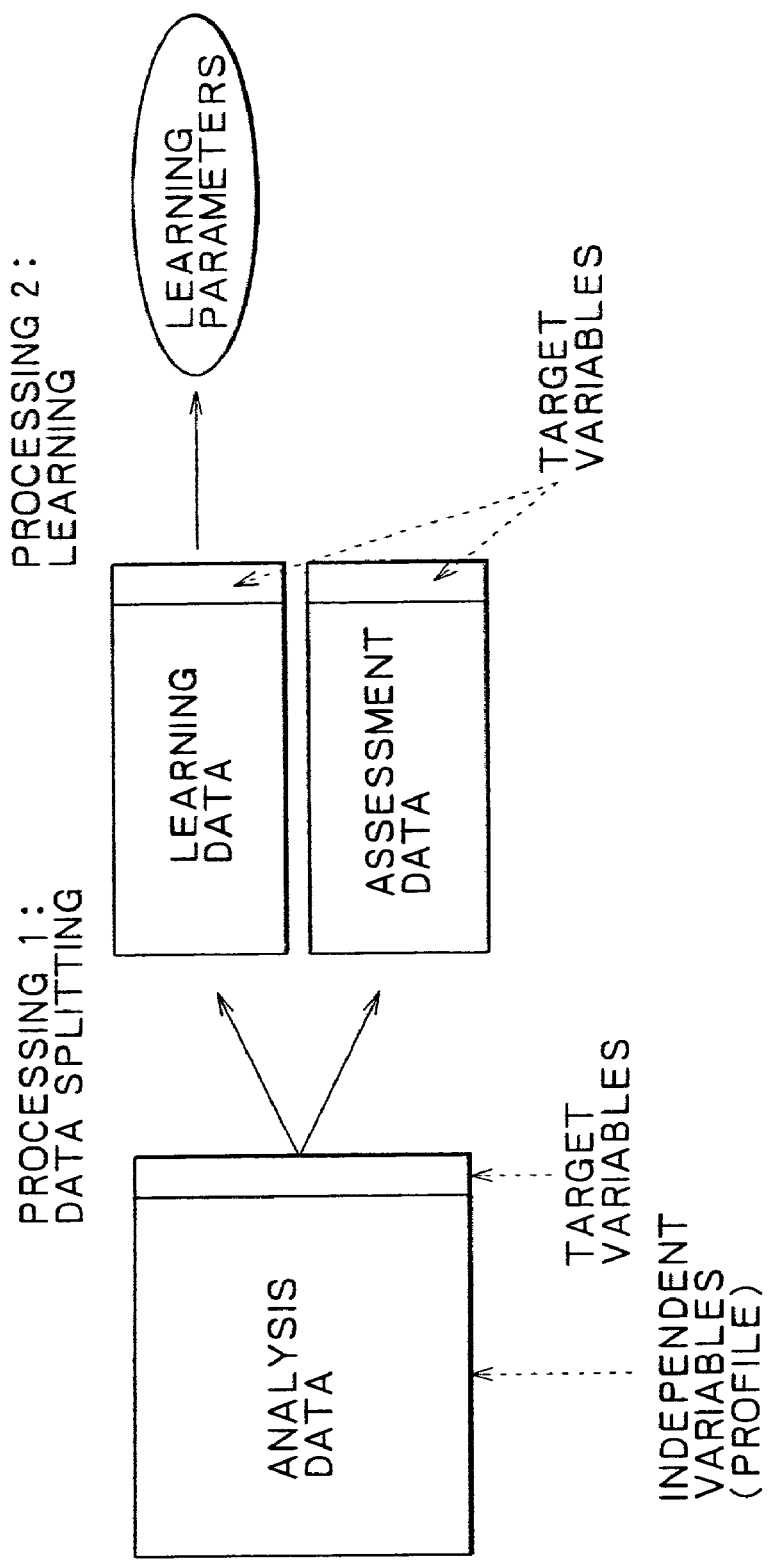
FIG. 43 is an explanatory diagram used for describing a method of creating an assessment chart.
Figure 44:
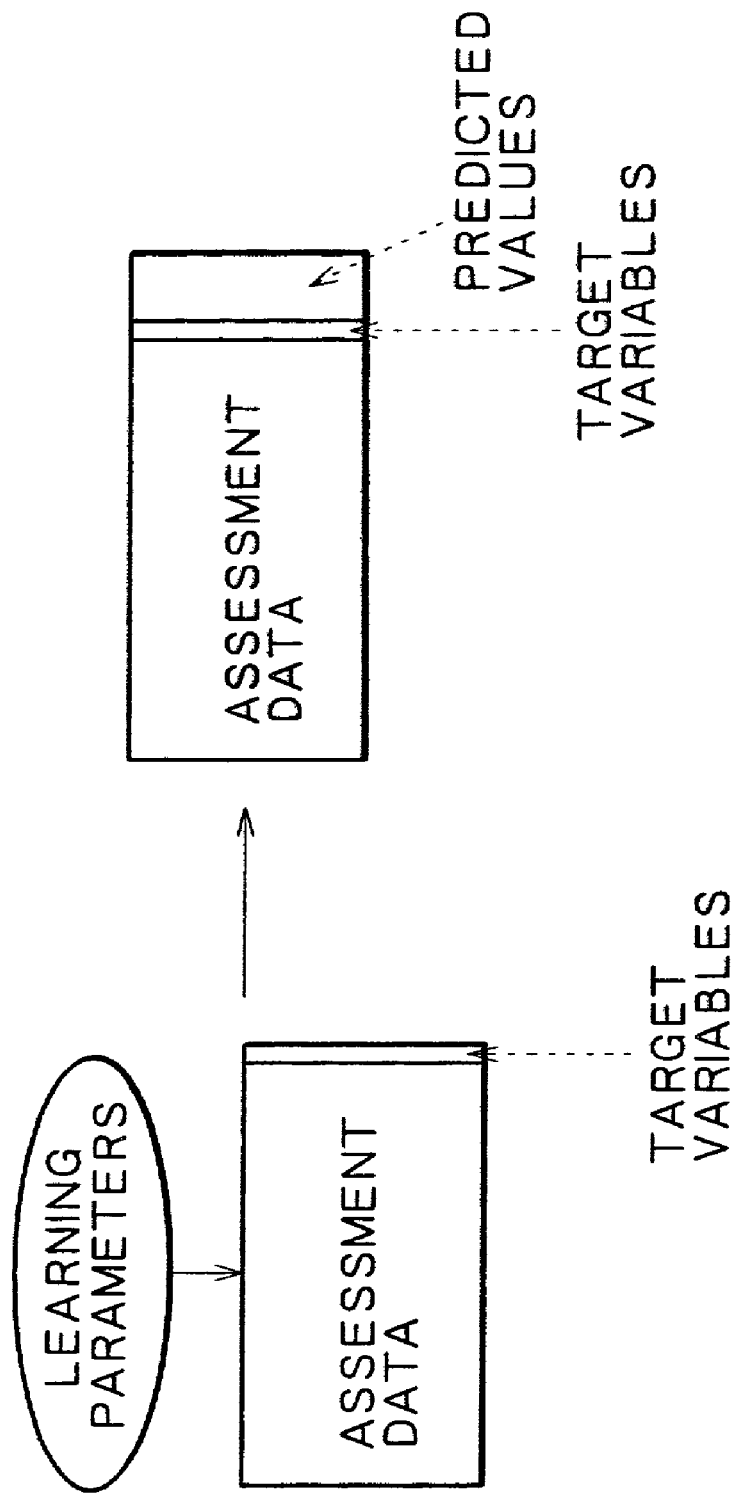
FIG. 44 is an explanatory diagram used for describing a method of creating the assessment chart as a continuation of the method shown in FIG. 43.
Figure 45:
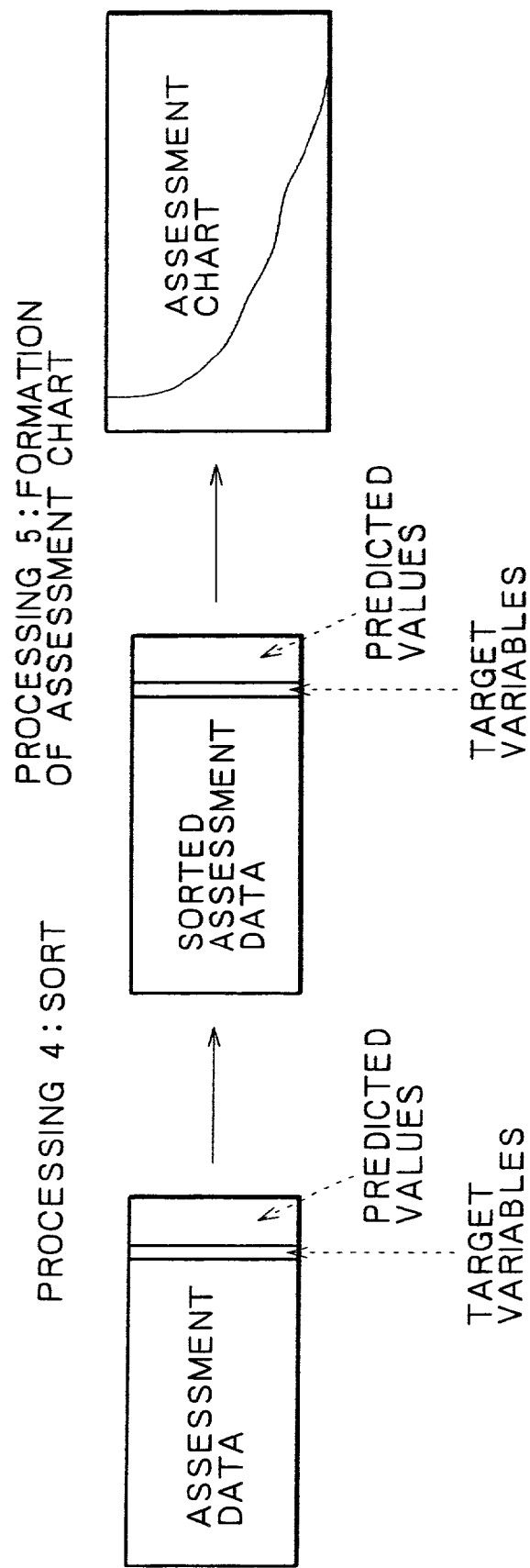
FIG. 45 is an explanatory diagram used for describing a method of creating the assessment chart as a continuation of the method shown in FIG. 44.

The following description explains a method of creating an assessment chart for one type of target variable by referring to FIGS. 43 to 45. An assessment chart is created by the data mining server 5 in a process of finding a value of a dependent variable for each value of an independent variable. The dependent variable is the target variable cited above whereas the independent variable is derived from profile data of customers. The derivation algorithm can be any one of a variety of algorithms based on a decision tree, a neural network or a regression analysis. It should be noted that the target variable is the rate of responses to a content such as an advertisement mail, and the profile data of customers is used for deriving the customers' expected response probabilities which are used as an independent variable. The response rate obtained from response results is the dependent variable represented by the vertical axis and the expected response probability is the independent variable represented by the horizontal axis as shown in the assessment charts of FIGS. 30 to 33. The profile data includes demographic information such as a gender, an age and an occupation, a hobby, a life style as well as information on responses to a variety of contents sent in the past.

FIG. 43 is an explanatory diagram used for describing processing carried out by the data mining server 5 to split analysis data into learning data and assessment data and then compute learning parameters from the learning data. The analysis data comprises customer profiles to serve as an independent variable and response results to serve as a target variable or a dependent variable.

FIG. 44 is an explanatory diagram used for describing processing carried out by the data mining server 5 to compute a predicted value or an expected response probability for each customer by applying the learning parameters to the assessment data.

FIG. 45 is an explanatory diagram used for describing processing carried out by the data mining server 5 to create an assessment chart by arranging pieces of assessment data in an order of decreasing customers' predicted values which are each computed for every customer.

Figure 46:
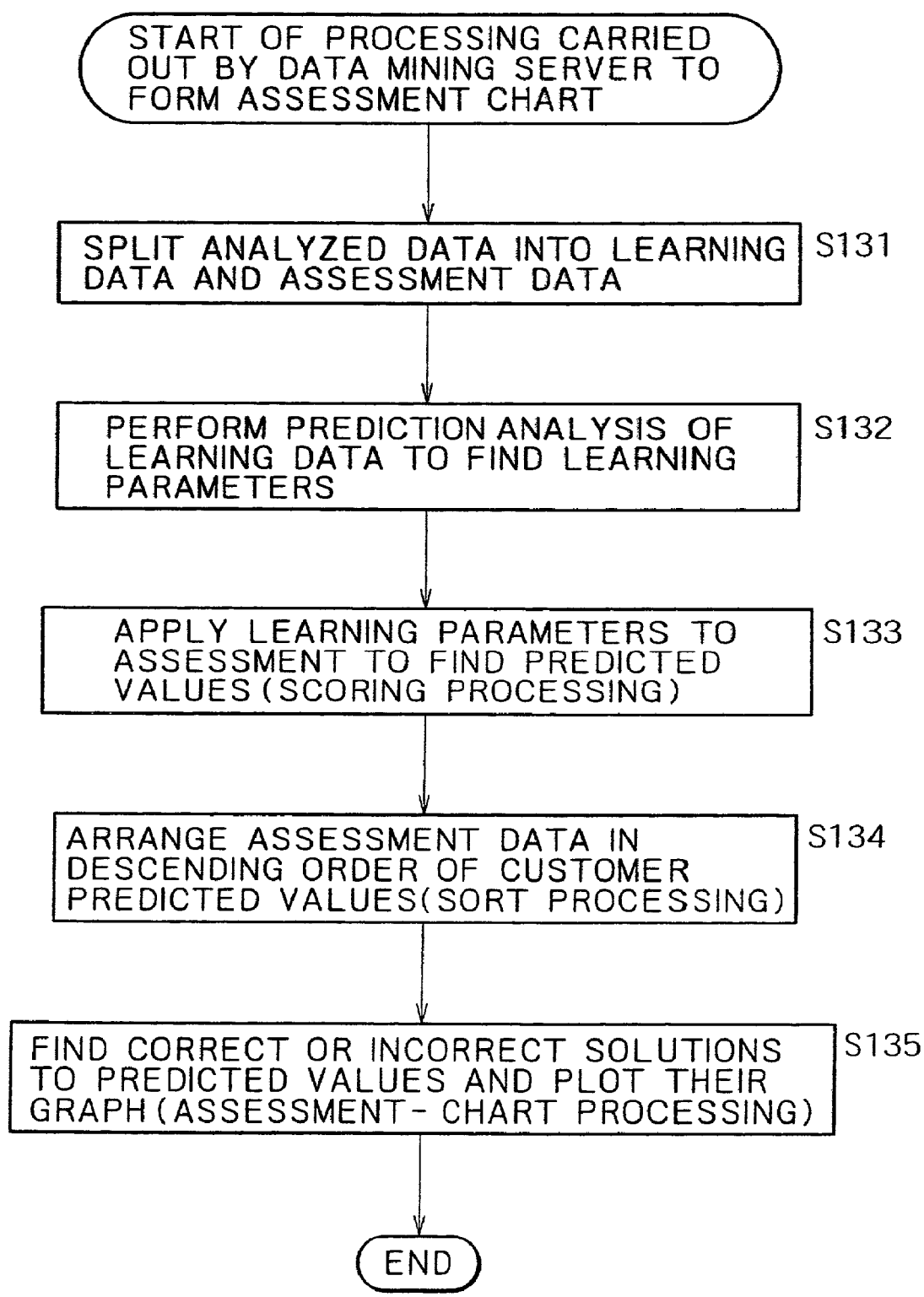
FIG. 46 is a flowchart representing still further processing carried out by the data mining server.

By referring to a flowchart shown in FIG. 46, the following description explains the pieces of processing, which are carried out by the data mining server 5 to create an assessment chart from assessment data.

As shown in the figure, the flowchart begins with a step S131 at which the CPU 41 splits analysis data into learning data and assessment data in processing 1 shown in FIG. 43.

Then, at the next step S132, the CPU 41 carries out a prediction analysis on the learning data to find learning parameters in processing 2 shown in FIG. 43. A learning model used in the prediction analysis is typically the learning model shown in FIG. 16.

Subsequently, at the next step S133, the CPU 41 computes a predicted value or an expected response probability for each customer by applying the learning parameters found at the step S132 to the assessment data in processing 3 shown in FIG. 44.

Then, at the next step S134, the CPU 41 sorts pieces of assessment data into an order of decreasing customers' predicted values in processing 4 shown in FIG. 45.

Subsequently, at the next step S135, the CPU 41 computes a correct solution or an incorrect solution to each of the predicted values, that is, the CPU 41 computes the rate of positive reactions (responses) with respect to all the expected response probabilities, and expresses the solutions by a graph to form an assessment chart in processing 5 shown in FIG. 45.

Figure 47:
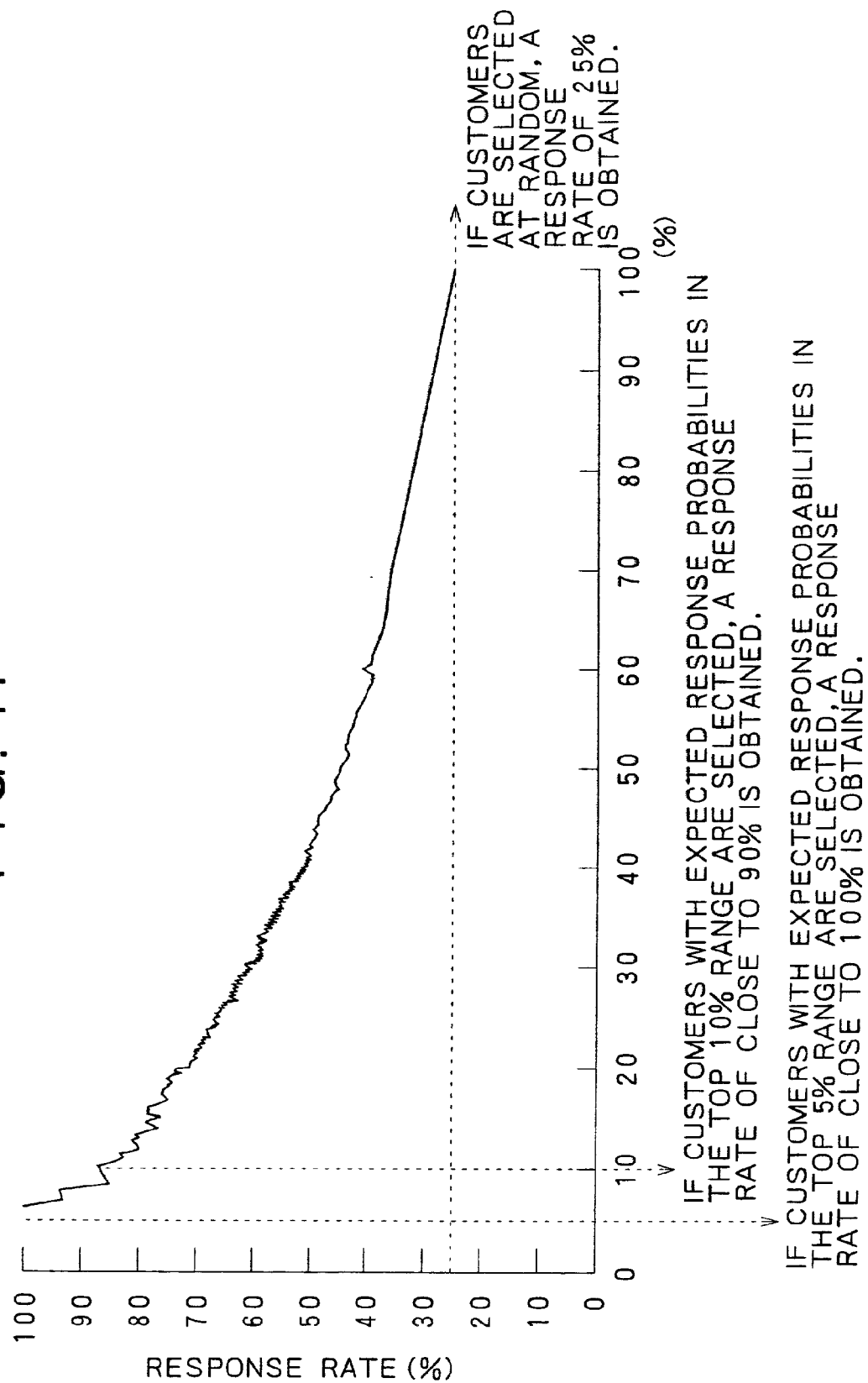
FIG. 47 is a diagram showing a typical assessment chart.

FIG. 47 is a diagram showing a typical assessment chart created by the processing described above. As described above, an assessment chart has a vertical axis representing the actual response rate extracted from response results of an optimum transmission and a horizontal axis representing a ratio of the number of specific customers to the total number of customers each serving as a target of a transmission for which the chart is created. The ratio is expressed in terms of percents. The number of specific customers is counted starting with those having highest expected response probabilities among the customers each serving as a target of the transmission. The assessment chart created by the data mining server 5 as shown in FIG. 47 indicates that, if the advertisement mail is sent to only customers in the top 5% of the expected response probabilities, a response rate of 100% will be obtained. If the advertisement mail is sent to only customers in the top 10% of the expected response probabilities, on the other hand, a response rate of 90% will be obtained. The assessment chart created by the data mining server 5 as shown in FIG. 47 also indicates that, if the advertisement mail is sent to all customers, a response rate of only 25% will be obtained.

Figure 48:
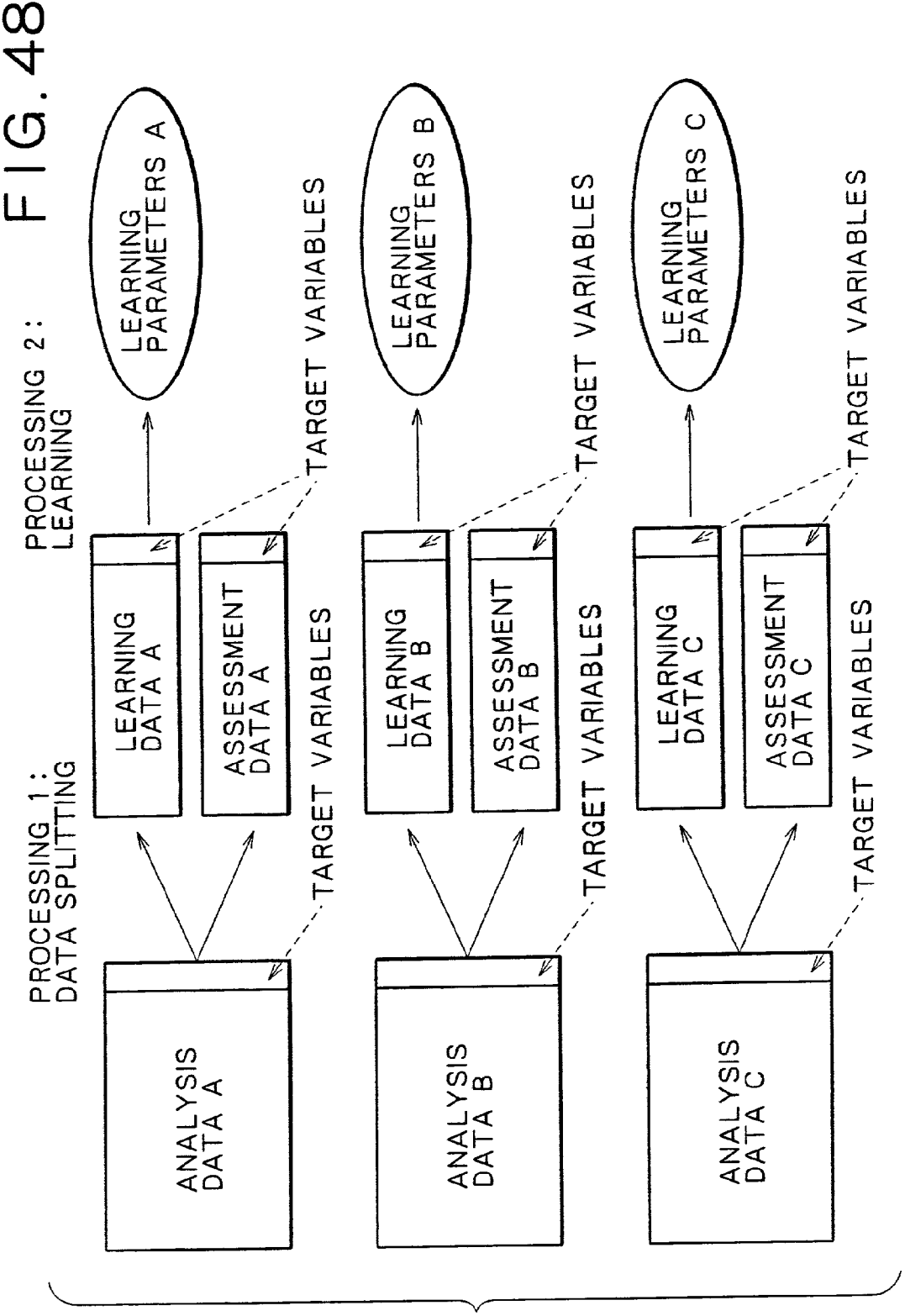
FIG. 48 is an explanatory diagram used for describing a method of creating an assessment chart.

The assessment chart described above is created for a case in which there is only 1 target variable or, to put it concretely, 1 type of analysis data as shown in FIG. 43. If there is a plurality of target variables or, to put it concretely, a plurality of analysis-data types A, B and C as shown in FIG. 48, an assessment chart is difficult to create. In the present invention, an assessment chart can also be created for a case in which there is a plurality of target variables as follows.

FIGS. 48 to 51 are each an explanatory diagram used for describing processing carried out by the data mining server 5 to create an assessment chart for a case in which there is a plurality of target variables.

To be more specific, FIG. 48 is an explanatory diagram used for describing processing carried out by the data mining server 5 to compute learning parameters A, B and C. Pieces of analysis data A, B and C each include customer profiles used for computing an independent variable and response rates to be used as a dependent variable (or a target variable). The analysis data A is split into learning data A and assessment data A. The learning parameter A is then generated from the learning data A. By the same token, the analysis data B is split into learning data B and assessment data B and, then, the learning parameter B is generated from the learning data B. In the same way, the analysis data C is split into learning data C and assessment data C and, then, the learning parameter C is generated from the learning data C.

Figure 49:
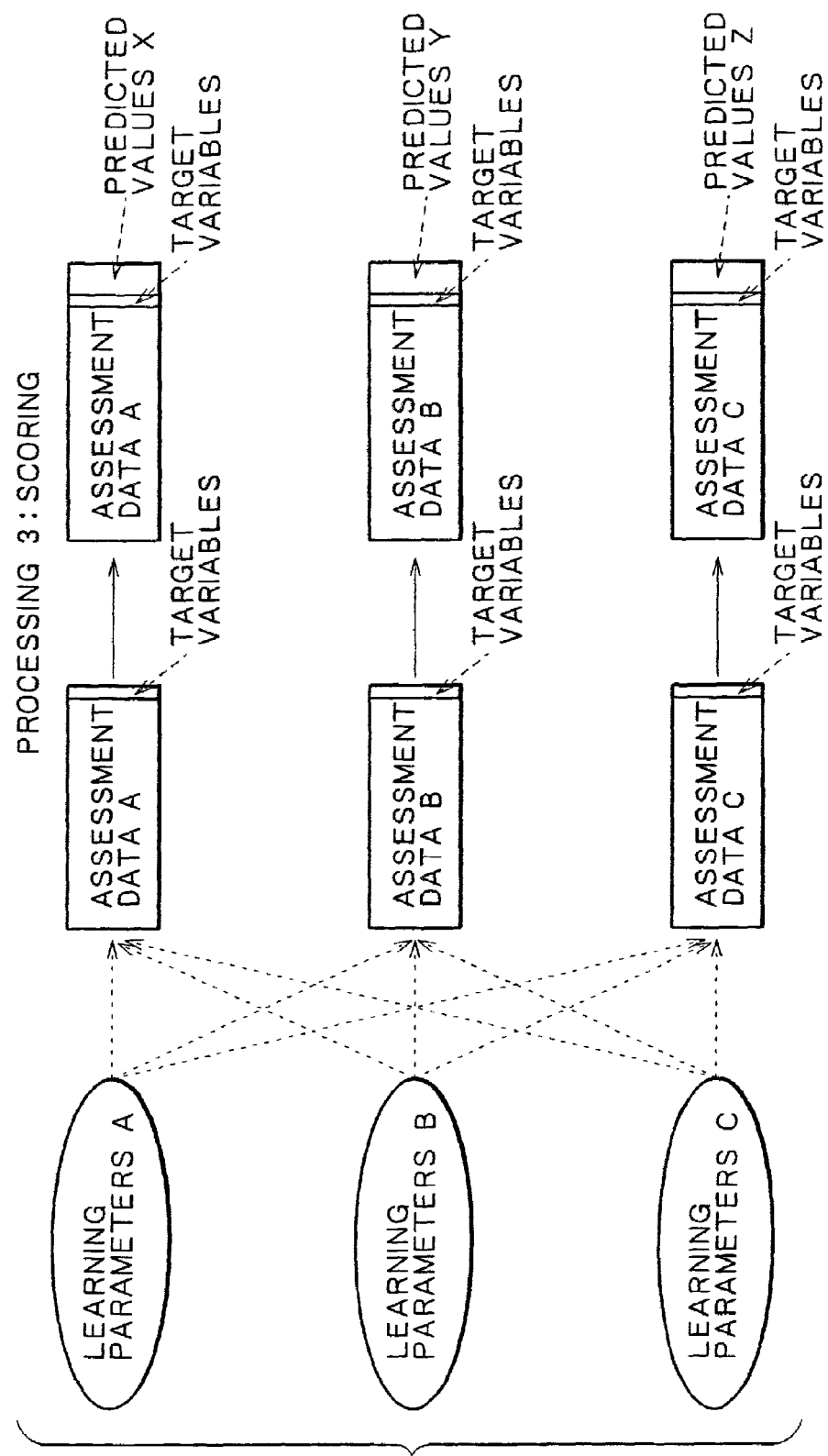
FIG. 49 is an explanatory diagram used for describing a method of creating the assessment chart as a continuation of the method shown in FIG. 48.

FIG. 49 is an explanatory diagram used for describing processing carried out by the data mining server 5 to compute predicted values (or expected response probabilities) A, B and C to serve as the independent variable. To put it in detail, the learning parameters A, B and C are applied to the assessment data A to compute a predicted value X, which includes single-target-variable predicted values (single-target-variable expected response probabilities) A, B and C, for each customer. By the same token, the learning parameters A, B and C are applied to the assessment data B to compute a predicted value Y, which includes the single-target-variable predicted values A, B and C, for each customer. In the same way, the learning parameters A, B and C are applied to the assessment data C to compute a predicted value Z, which includes the single-target-variable predicted values A, B and C, for each customer.

Figure 50:
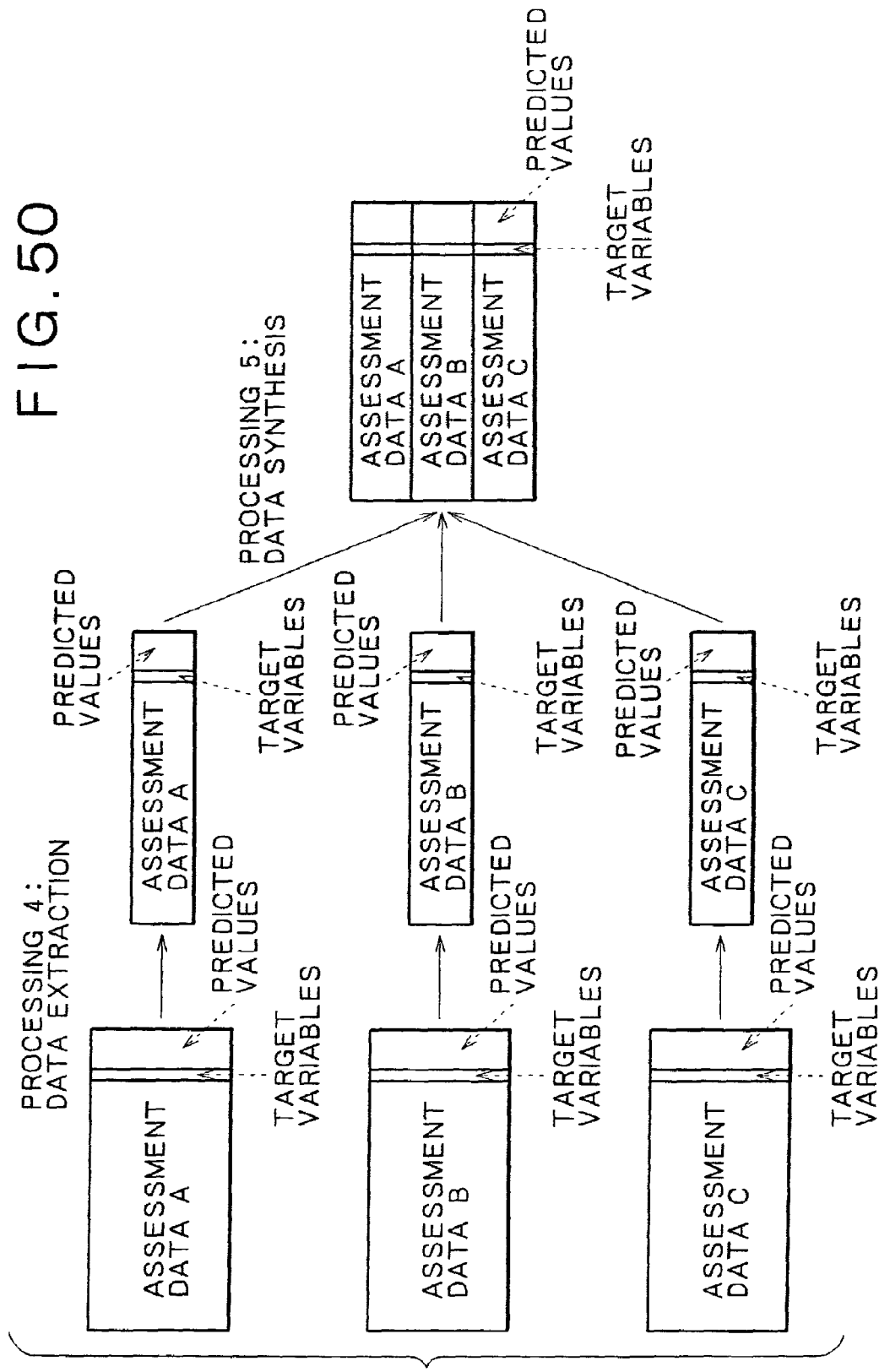
FIG. 50 is an explanatory diagram used for describing a method of creating the assessment chart as a continuation of the method shown in FIG. 49.

FIG. 50 is an explanatory diagram used for describing processing carried out by the data mining server 5 to synthesize pieces of assessment data having largest expected response probabilities. To put it in detail, assessment data is extracted from the assessment data A. The extracted assessment data has a largest single-target-variable expected response probability (single-target-variable predicted value) A included in the predicted value X computed for each customer. By the same token, assessment data is extracted from the assessment data B. The extracted assessment data has a largest single-target-variable expected response probability B included in the predicted value Y computed for each customer. In the same way, assessment data is extracted from the assessment data C. The extracted assessment data has a largest single-target-variable expected response probability C included in the predicted value Z computed for each customer. The extracted pieces of assessment data are then synthesized.

Figure 51:
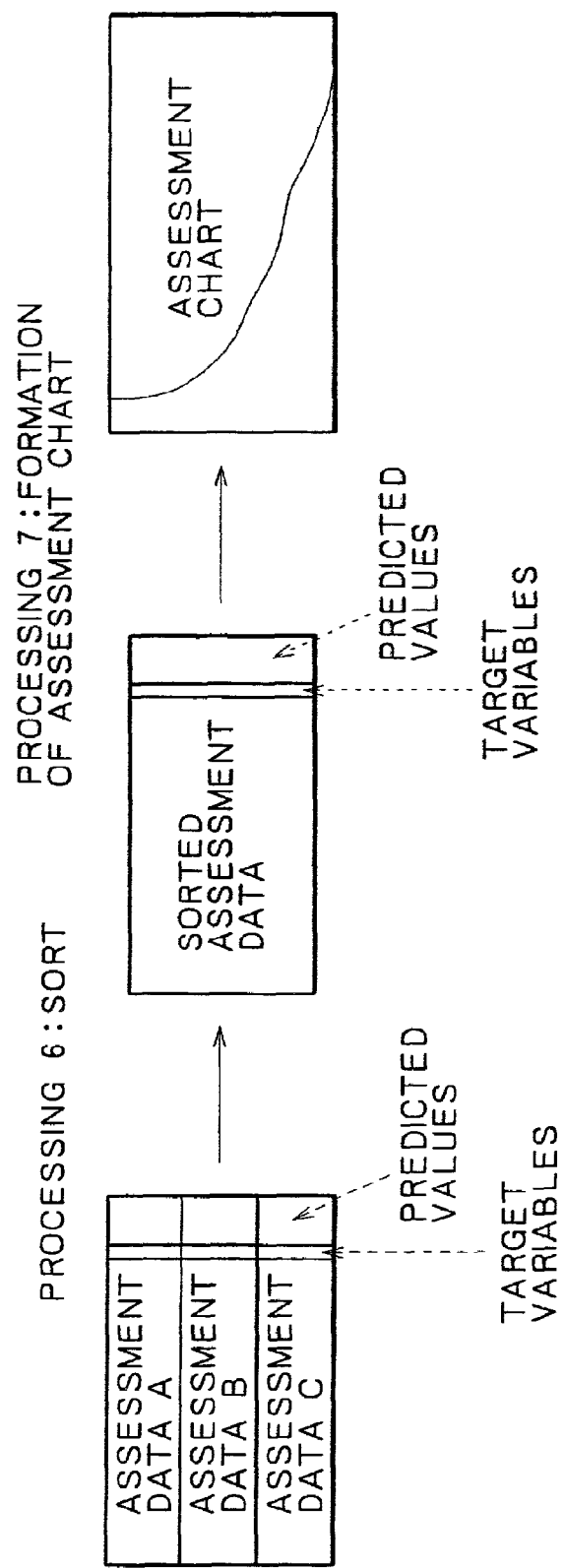
FIG. 51 is an explanatory diagram used for describing a method of creating the assessment chart as a continuation of the method shown in FIG. 50.

FIG. 51 is an explanatory diagram used for describing processing carried out by the data mining server 5 to sort the synthesized pieces of assessment data into an order of decreasing largest customer expected response probabilities included in the predicted values, compute a correct solution or an incorrect solution to each of the expected response probabilities and express the solutions by a graph to form an assessment chart.

Figure 52:
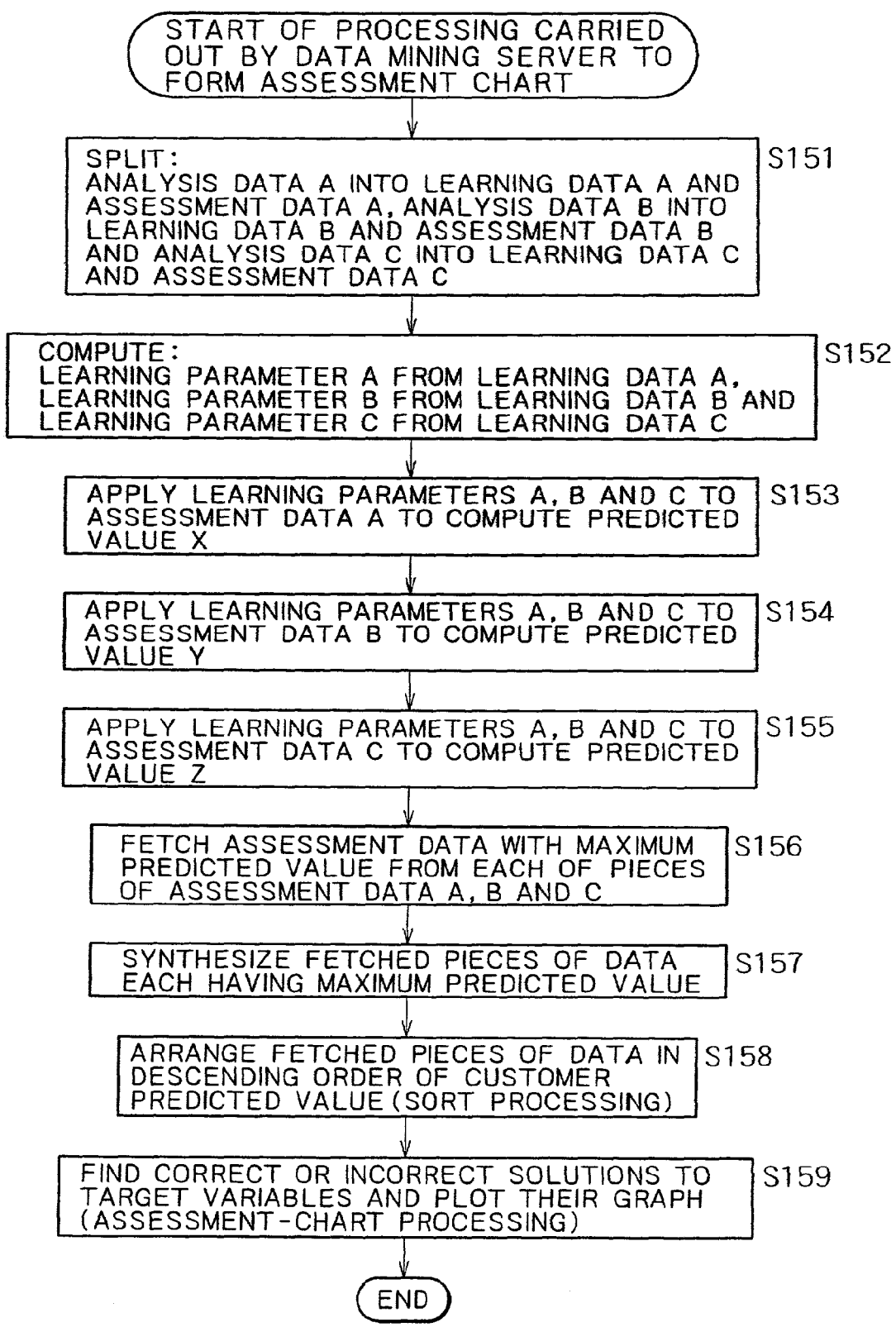
FIG. 52 is a flowchart representing still further processing carried out by the data mining server.

By referring to a flowchart shown in FIG. 52, the following description explains processing carried out by the data mining server 5 to create an assessment chart for a case in which there is a plurality of target variables. It should be noted that 3 types of target variable, that is, a target variable for analysis data A, a target variable for analysis data B and a target variable for analysis data C, are assumed to exist.

As shown in the figure, the flowchart begins with a step S151 at which the CPU 41 splits analysis data A into learning data A and assessment data A, analysis data B into learning data B and assessment data B and analysis data C into learning data C and assessment data C in processing 1 shown in FIG. 48.

Then, at the next step S152, the CPU 41 computes a learning parameter A from the learning data A, a learning parameter B from the learning data B and a learning parameter C from the learning data C in processing 2 shown in FIG. 48.

Subsequently, at the next step S153, the CPU 41 applies the learning parameters A, B and C computed at the step S152 to the assessment data A to find a predicted value X, which includes the single-target-variable expected response probabilities A, B and C, in processing 3 shown in FIG. 49.

Then, at the next step S154, the CPU 41 applies the learning parameters A, B and C computed at the step S152 to the assessment data B to find a predicted value Y, which includes the single-target-variable expected response probabilities A, B and C, in processing 3 shown in FIG. 49.

Subsequently, at the next step S155, the CPU 41 applies the learning parameters A, B and C computed at the step S152 to the assessment data C to find a predicted value Z, which includes the single-target-variable expected response probabilities A, B and C, in processing 3 shown in FIG. 49.

Then, at the next step S156, the CPU 41 extractes pieces of assessment data with largest single-target-variable expected response probabilities A, B and C included in the predicted values X, Y and Z from each of pieces of assessment data A, B and C respectively in processing 4 shown in FIG. 50. To be more specific, the CPU 41 extracts data with a largest single-target-variable expected probability A of a response to content A from the assessment data A. The largest single-target-variable expected probability A is included in the predicted value X. By the same token, the CPU 41 extracts data with a largest single-target-variable expected probability B of a response to content B from the assessment data B. The largest single-target-variable expected probability B is included in the predicted value Y. In the same way, the CPU 41 extracts data with a largest single-target-variable expected probability C of a response to content C from the assessment data C. The largest single-target-variable expected probability C is included in the predicted value Z.

For a target variable having one of two values, namely, 0 or 1, the predicted values X, Y and Z each have a value of either 0 or 1 too.

Subsequently, at the next step S157, the CPU 41 carries out processing 5 shown in FIG. 50 to synthesize the pieces of assessment data extracted in the processing carried out at the step S156.

Then, at the next step S158, the CPU 41 carries out processing 6 shown in FIG. 51 to arrange the pieces of data, which were synthesized in the processing carried out at the step S157, in an order of decreasing largest single-target-variable expected response probabilities of customers.

Subsequently, at the next step S159, the CPU 41 carries out processing 7 shown in FIG. 51 to find correct or incorrect solutions of the target variables, that is, the CPU 41 computes the rate of positive reactions (responses) with respect to all the predicted values. Then, the CPU 41 plots a graph of the solutions to create an assessment chart.

If there is a plurality of target variables, the data mining server 5 creates an assessment chart as described above. The assessment chart shows a higher response rate for each customer profile in comparison with an assessment chart created from every individual assessment data for each individual target variable as described below.

FIGS. 53 to 56 are diagrams used for comparing typical assessment charts each created for an individual target variable with a typical assessment chart created for a plurality of target variables in the processing described above.

Figure 53:
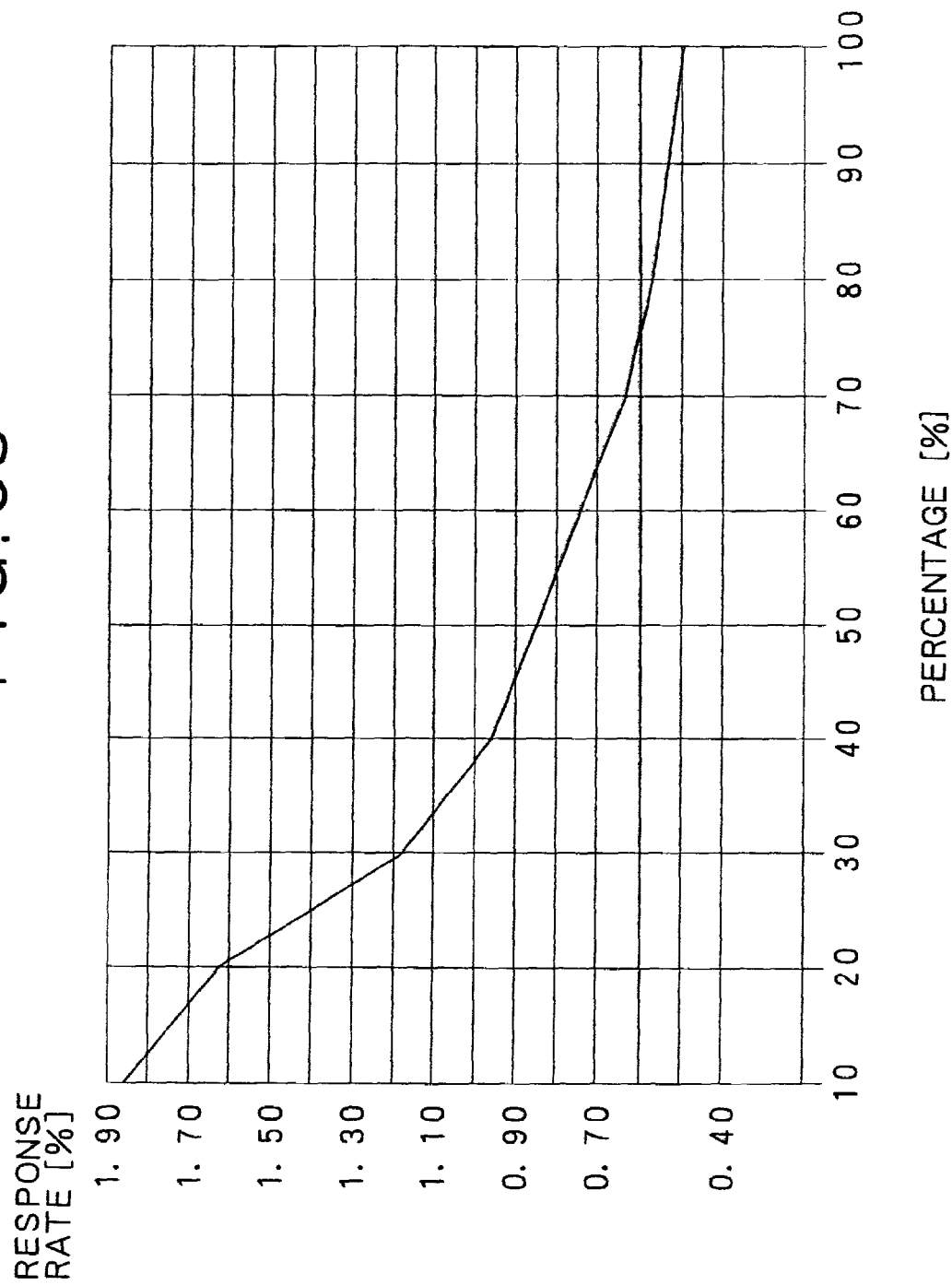
FIG. 53 is a diagram showing another typical assessment chart.

To be more specific, FIG. 53 is a diagram showing a typical assessment chart created by the data mining server 5 for responses to content A, which serve as a single target variable. As is obvious from the typical assessment chart, if content A is sent as an advertisement mail to only customers with expected response probabilities in the top 10% as selected by the data mining server 5, a response rate of about 1.85% will be obtained.

Figure 54:
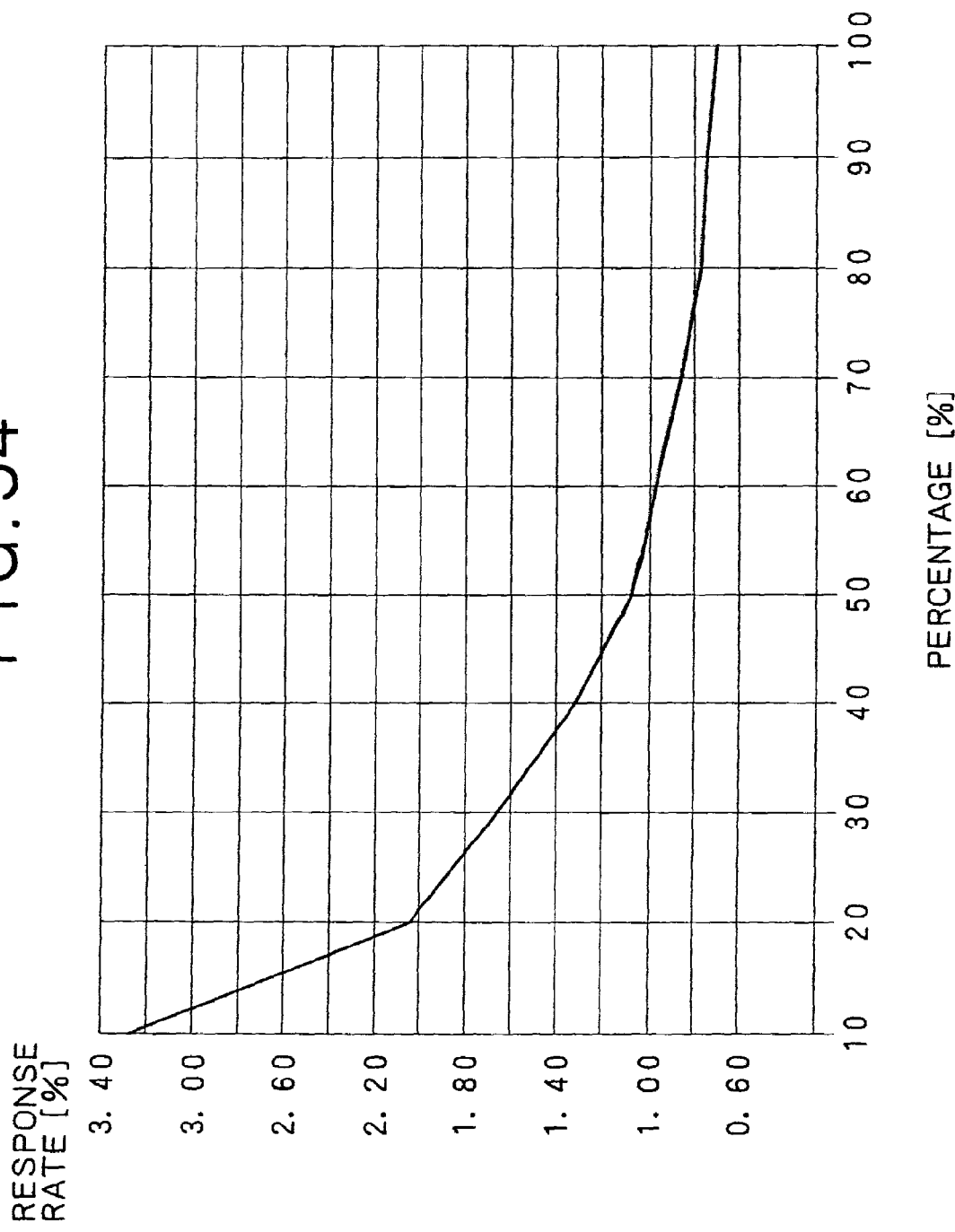
FIG. 54 is a diagram showing a still other typical assessment chart.

By the same token, FIG. 54 is a diagram showing a typical assessment chart created by the data mining server 5 for responses to content B, which serve as a single target variable. As is obvious from the typical assessment chart, if content B is sent as an advertisement mail to only customers with expected response probabilities in the top 10% as selected by the data mining server 5, a response rate of about 3.3% will be obtained.

Figure 55:
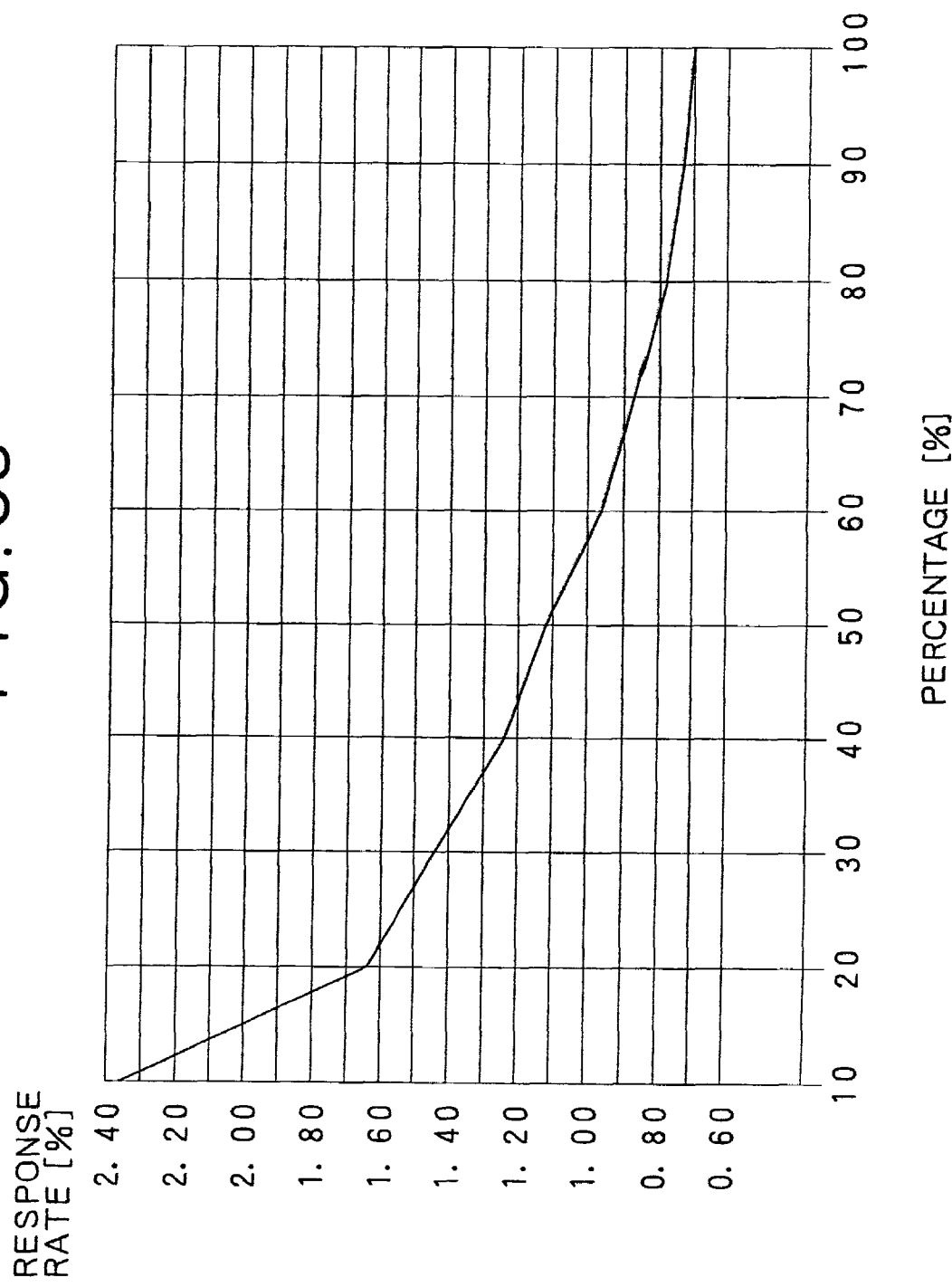
FIG. 55 is a diagram showing a further typical assessment chart.

To be more specific, FIG. 55 is a diagram showing a typical assessment chart created by the data mining server 5 for responses to content C, which serve as a single target variable. As is obvious from the typical assessment chart, if content C is sent as an advertisement mail to only customers with expected response probabilities in the top 10% as selected by the data mining server 5, a response rate of about 2.4% will be obtained.

Figure 56:
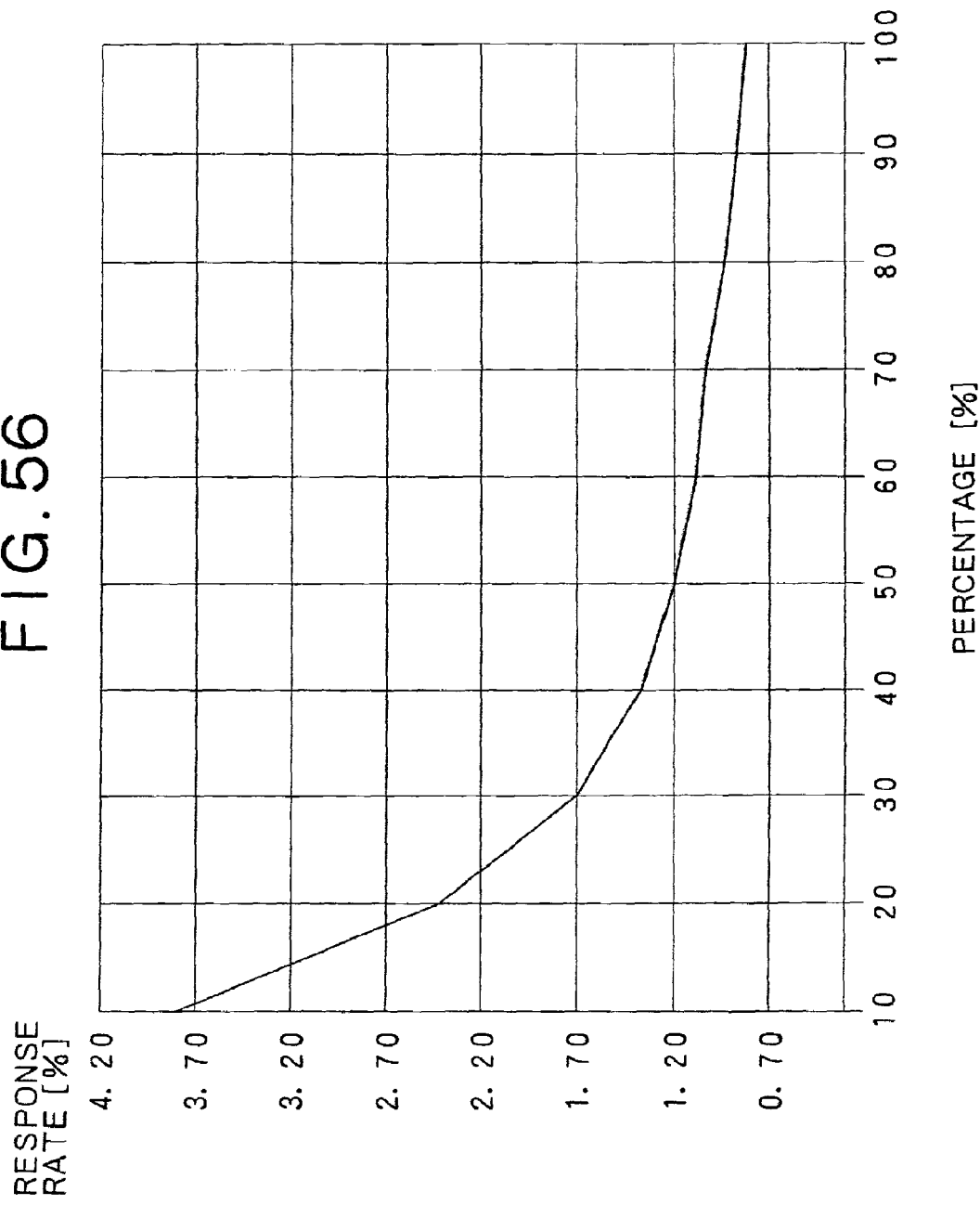
FIG. 56 is a diagram showing a still further typical assessment chart.

On the other hand, FIG. 56 is a diagram showing a typical assessment chart created in the processing represented by the flowchart shown in FIG. 52 by the data mining server 5 for responses to all contents A, B and C. In this case, the responses are a plurality of target variables. As is obvious from the typical assessment chart, if an advertisement mail is sent to only customers with expected response probabilities in the top 10% as selected by the data mining server 5, a response rate of about 4.0% will be obtained. This response rate of 4.0% is clearly higher than the counterpart response rates indicated by the assessment charts shown in FIGS. 53, 54 and 55 for contents A, B and C respectively.

As described above, the data mining server 5 computes an expected response probability for each of customers and for each of contents from results of analysis carried out on responses given by the customers to the contents each sent by the mail server 1 to the customers as an advertisement mail in a test transmission. For specific customers, the data mining server 5 then selects a content that shows highest expected response probabilities for specific customers, and then has the mail server 1 send the selected content to the customers. By using results of an analysis of data such as the expected response probabilities, the data mining server 5 is capable of determining a fee for sending a content or the so-called advertisement fee. It should be noted that a content means a banner advertisement displayed on a web page or an advertisement mail. Such a content is referred to hereafter as an advertisement content.

The data mining server 5 is capable of determining an advertisement fee based typically on response results of a test transmission like those shown in FIGS. 12 to 14. As an alternative, the data mining server 5 extracts customer profiles and expected response probabilities from response results of test transmissions, creating a content's response pattern defining a relation between the customer profile and the expected probability of a response to the content. The data mining server 5 then determines an advertisement fee for a content sent as an advertisement mail only to customers each expected to have a response probability higher than a set threshold value corresponding to a desired response rate as shown in FIGS. 35 and 36. As another alternative for a case in which there is a plurality of original contents, the data mining server 5 selects particular contents to be sent to customers having specific profiles by using response patterns created for the respective original contents as shown in FIGS. 39 to 41. The data mining server 5 then determines an advertisement fee for each of the selected contents sent as an advertisement mail to the customers also on the basis of a desired response rate and, hence, the number of responses, which is derived from the response rate and the number of customers receiving the selected content. It should be noted that the data mining server 5 is also capable of estimating a response rate and the number of responses from an assessment chart shown in FIG. 30, 31, 32, 33, 47, 53, 54, 55 or 56 and determining an advertisement fee from the estimated response rate and the estimated number of responses.

Figure 57:
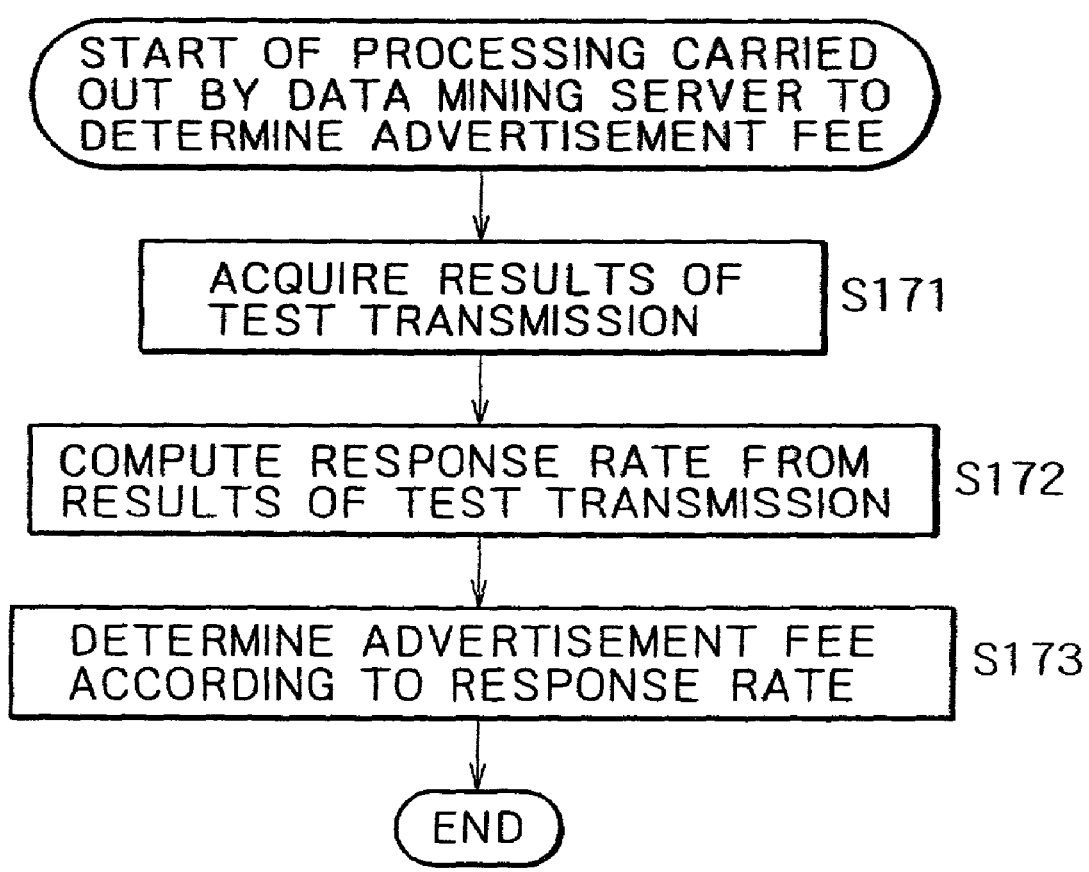
FIG. 57 is a flowchart representing still further processing carried out by the data mining server.

By referring to a flowchart shown in FIG. 57, the following description explains processing carried out by the data mining server 5 to compute an advertisement fee based on response results of test transmissions.

As shown in the figure, the flowchart begins with a step S171 at which the CPU 41 receives response results from the web server 4.

Then, at the next step S172, the CPU 41 computes response rates from the test-transmission response results received in the processing carried out at the step S171. Typically, the CPU 41 computes a response rate from the response results of a test transmission for each content sent as an advertisement mail as shown in FIG. 12, 13 or 14.

Subsequently, at the next step S173, the CPU 41 determines an advertisement fee from a table, which is stored in the storage unit 48 and shows a relation between a rate of responses to each sent content and an advertisement fee. For this reason, the person in charge of the data mining server 5 needs to store the table showing a relation between the response rate and the advertisement fee in advance in the storage unit 48.

Figure 58:
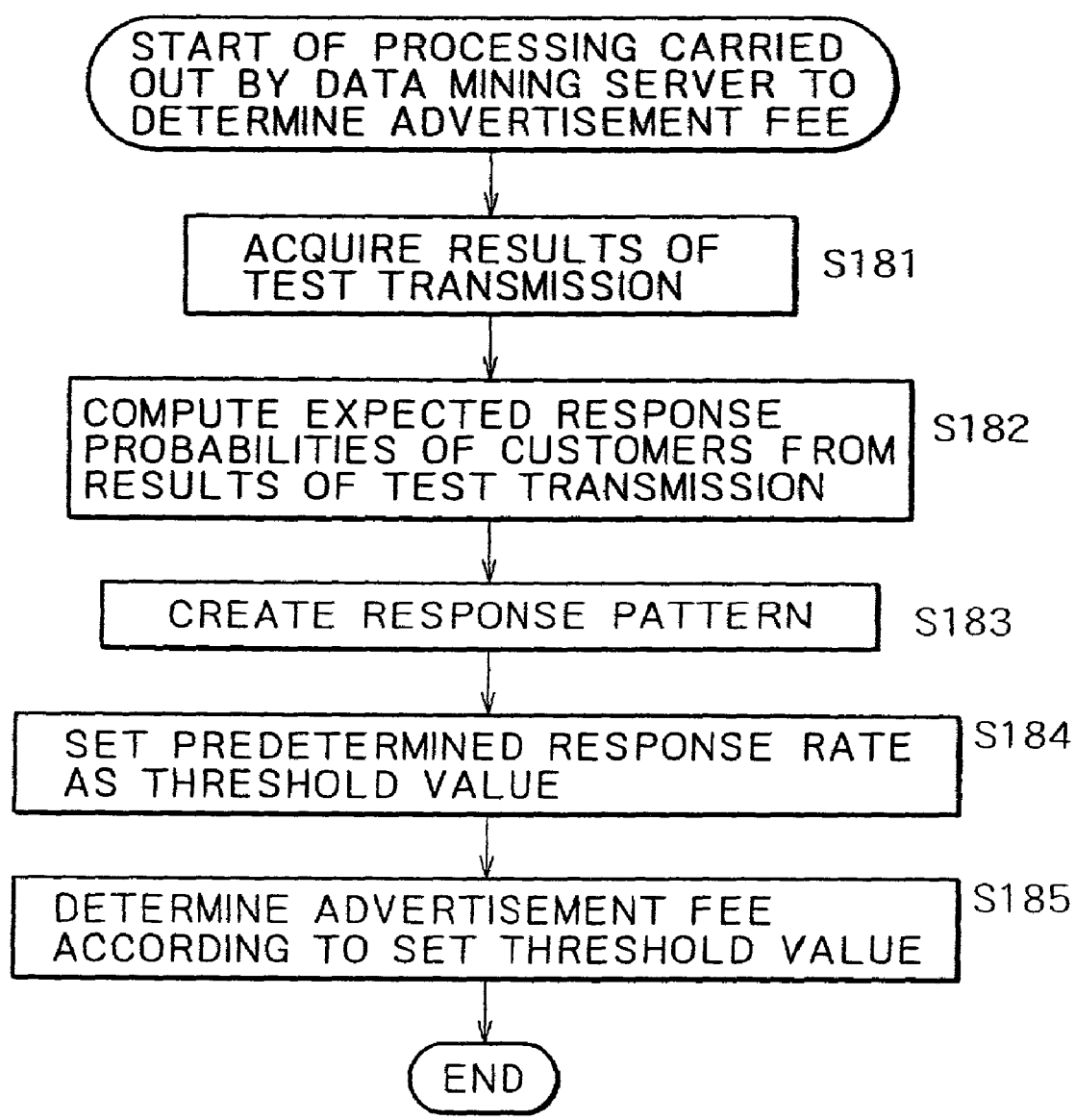
FIG. 58 is a flowchart representing still further processing carried out by the data mining server.

By referring to a flowchart shown in FIG. 58, the following description explains processing carried out by the data mining server 5 to compute an advertisement fee based on response results of test transmissions in accordance with a desired response rate.

As shown in the figure, the flowchart begins with a step S181 at which the CPU 41 acquires response results of test transmissions from the web server 4.

Subsequently, at the next step S182, the CPU 41 computes expected response probabilities of customers from the results of test transmission. The CPU 41 computes expected response probabilities of customers by carrying out typically pieces of processing represented by the flowcharts shown in FIGS. 15 and 17.

Then, at the next step S183, the CPU 41 creates a response pattern representing a relation between the expected response probabilities found in the processing carried out at the step S182 and customer profiles obtained as a result of an analysis of the response results received in the processing carried out at the step S181. The CPU 41 typically creates response patterns like the ones shown in FIGS. 35 and 36.

Subsequently, at the next step S184, the CPU 41 inputs a desired response rate entered by the person in charge of the data mining server 5 via the input unit 46. The CPU 41 then converts the desired response rate into a threshold value T on the response pattern like the ones shown in FIGS. 35 and 36. The response pattern was created in the processing carried out at the step S183. As described earlier, the desired response rate is represented by the area of a hatched portion above the threshold value T as shown in FIGS. 35 and 36.

Then, at the next step S185, the CPU 41 determines an advertisement fee according to the threshold value from a table, which is stored in the storage unit 48 and shows a relation between threshold values and advertisement fees. For this reason, the person in charge of the data mining server 5 needs to store such a table in advance in the storage unit 48.

Figure 59:
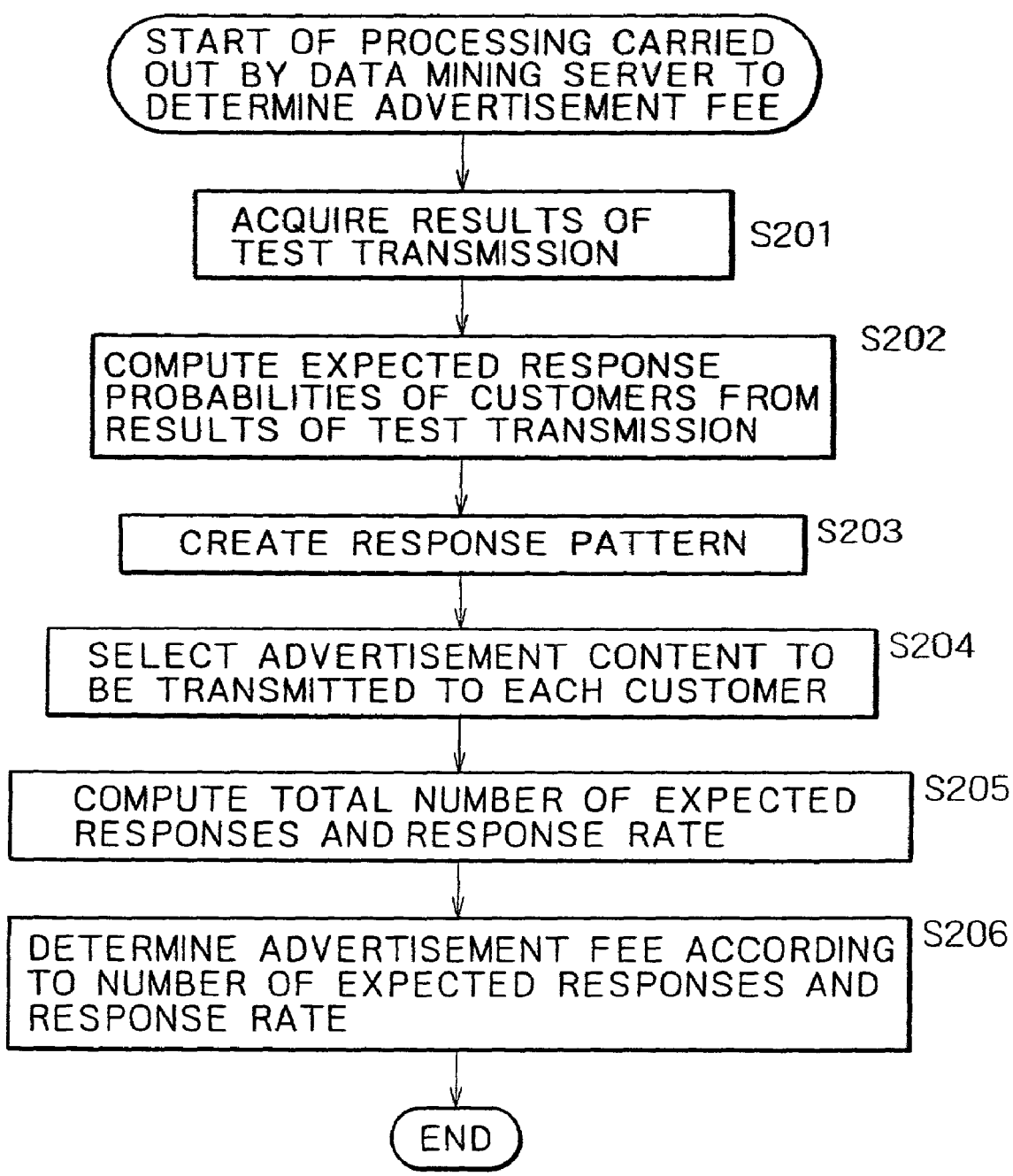
FIG. 59 is a flowchart representing still further processing carried out by the data mining server.

By referring to a flowchart shown in FIG. 59, the following description explains processing carried out by the data mining server 5 to compute an advertisement fee based on response results of test transmissions in accordance with a predicted response rate and a predicted number of responses.

The pieces of processing which are carried out at steps S201 to S203 of the flowchart shown in FIG. 59 are the same as those carried out at steps S181 to S183 of the flowchart shown in FIG. 58. In these pieces of processing, the CPU 41 acquires response results of test transmissions, computes expected response probabilities of customers from the results of test transmission and creates a response pattern. The CPU 41 typically creates response patterns like the ones shown in FIGS. 39 to 41 in the processing carried out at the step S203.

Then, at the next step S204, the CPU 41 selects an advertisement content to be transmitted to each customer. Assume that the CPU 41 creates response patterns like the ones shown in FIG. 39 in the processing carried out at the step S203. In this case, the CPU 41 selects content A to be transmitted to all customers. As another example, assume that the CPU 41 creates response patterns like the ones shown in FIG. 40 in the processing carried out at the step S203. In this case, the CPU 41 selects content B to be transmitted to customers each having a profile on the left side of customer profile P1 and selects content C to be transmitted to customers each having a profile on the right side of customer profile P1.

As a further example, assume that the CPU 41 creates response patterns like the ones shown in FIG. 41 in the processing carried out at the step S203. In this case, the CPU 41 selects content A to be transmitted to customers each having a profile on the left side of customer profile P1, content B to be transmitted to customers each having a profile between customer profiles P1 and P2, and selects content C to be transmitted to customers each having a profile on the right side of customer profile P2.

Then, at the next step S205, the CPU 41 computes a total number of expected responses and a response rate for the advertisement content selected at in the processing carried out at the step S204.

Then, at the next step S206, the CPU 41 determines an advertisement fee according to number of expected responses and the response rate, which were found in the processing carried out at the step S205, from a table stored in the storage unit 48. The table shows a relation between advertisement fees, the number of responses and the response rate. For this reason, the person in charge of the data mining server 5 needs to store a table showing a relation between advertisement fees, the number of responses and the response rate in the storage unit 48 in advance.

Figure 60:
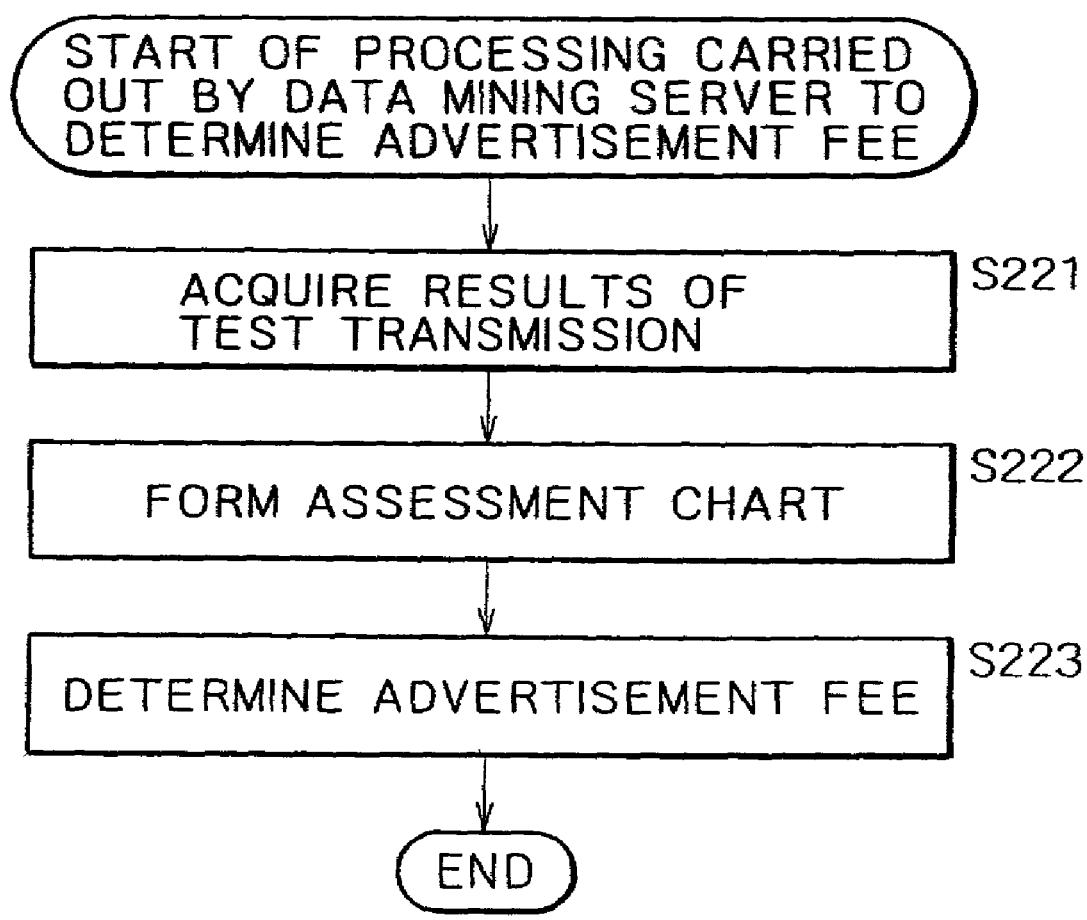
FIG. 60 is a flowchart representing still further processing carried out by the data mining server.

By referring to a flowchart shown in FIG. 60, the following description explains processing carried out by the data mining server 5 to compute an advertisement fee based on an assessment chart.

As shown in the figure, the flowchart begins with a step S221 at which the CPU 41 acquires response results of test transmissions from the web server 4.

Subsequently, at the next step S222, the CPU 41 creates an assessment chart based on the response results. In the case of 1 target-variable type, the CPU 41 carries out the processing represented by the flowchart shown in FIG. 46 to create an assessment chart. For a plurality of target-variable types, on the other hand, the CPU 41 carries out the processing represented by the flowchart shown in FIG. 52 to create an assessment chart.

Then, at the next step S223, the CPU 41 determines an advertisement fee according to a desired response rate entered by the person in charge of the data mining server 5 from a table, which is stored in the storage unit 48 and shows a relation between the response rate and the advertisement fee. If the person in charge of the data mining server 5 enters a desired number of responses instead of a desired response rate, the entered number of responses is converted into a response rate from the assessment chart. The response rate is then used to find an advertisement fee from the table. For this reason, the person in charge of the data mining server 5 needs to store a table showing a relation between the response rate and the advertisement fee in advance in the storage unit 48.

Assume that the advertisement fee per response is P yen and an advertisement cost is proportional to the number of responses. In this case, the person in charge of the data mining server 5 computes the advertisement cost as follows:

Advertisement cost=Number of responses×$P$

If the advertisement cost is not proportional to the number of responses, on the other hand, the person in charge of the data mining server 5 stores a table showing a relation between the number of responses and the advertisement cost in advance in the storage unit 48.

As described above, the mail server 1 is an apparatus separated from the data mining server 5. It should be noted, however, that the functions of the mail server 1 and the data mining server 5 can also be combined into a single apparatus.

The sequence of pieces of processing described above is carried out sequentially one piece after another by hardware. It should be noted, however, that the processing can also be carried out by execution of software.

If the sequence of pieces of processing described above is carried out by execution of software, programs composing the software are executed by typically a microcomputer embedded in dedicated hardware or a personal computer that is capable of carrying out a variety of functions by execution of a variety of programs installed in the personal computer from a storage medium or a remote source by way of a network.

The programs are stored in advance in the ROM 22, 42 or 62, or installed in advance in a hard disk of the storage unit 28, 48 or 68 embedded in the server 1 or 5 or the personal computer 7 or 8 as shown in FIGS. 3 to 5, or distributed to the user as package media such as the magnetic disks 31, 51 and 71 including floppy discs, optical discs 32, 52 and 72 including CD-ROMs (Compact Disc Read-Only Memories) and DVDs (Digital Versatile Discs), MO (Magnetic Optical) discs 33, 53 and 73 including MDs (Mini-Discs) or semiconductor memories 34, 54 and 74. The package media is mounted on the drive 30, 50 or 70 of the server 1 or 5 or the personal computer 7 or 8 to allow a program to be installed from the package media into the hard disk of the storage unit 28, 48 or 68.

In the embodiments, processing steps prescribing the program to be executed to perform various kinds of processing are not necessarily carried out sequentially one step after another along the time axis in accordance with an order described by a flowchart. Instead, the processing steps may include pieces of processing, which are carried out individually or concurrently typically in the so-called parallel processing or the so-called object oriented processing.

In this specification, a system is a complete apparatus comprising a plurality of sub-apparatuses.

In accordance with the information-processing apparatus as well as the information-processing method, which are provided by the present invention, and programs stored in the storage medium also provided by the present invention, in an operation to transmit a plurality of contents to information-processing terminals, an expected value of a response received from one of the information-processing terminals in response to each of the contents is calculated. Assessment information on any one of the information-processing terminals with a largest expected value is created for each of the contents on the basis of the expected values computed for each of the contents. Pieces of such assessment information, which are each created for one of the contents, are then synthesized to create an asssessment function of the expected values for all the contents. As a result, the expected rate of responses to a plurality of contents sent to a number of customers can be increased.

While the preferred embodiment of the present invention has been described using the specific terms, such description is for illustrative purposes only, and it is to be understood that changes and variations may be made without departing from the spirit or scope of the following claims.

What is claimed is:

1. An information-processing apparatus comprising:
   computation means for computing an expected value of a response transmitted by a plurality of information-processing terminals in response to each of a plurality of contents transmitted to said information-processing terminals; and select means for selecting some of the plurality of contents to be transmitted to each of said information-processing terminals based on said expected value computed by said computation means for each of said contents, wherein said information-processing terminals comprise at least a pair of terminals used by independent users, each user having independent preferences, wherein said plurality of contents includes user specific information relating to each of said information-processing terminals, wherein said computation means computes said expected value by regular extraction based on a formula, wherein said formula is one of a linear association expression, a nueral network, a signoid function, a rule form of a conditional, a decision tree model, or a statistical technique based on a linear model, a discriminative analysis, a logistic recurssion/regression, or a cluster analysis, wherein said linear association expression is a linear expression of a sum of terms which are each a product of a numerical data denoting each user's independent preferences and a coefficient denoting the plurality of transmitted contents, and wherein said expected value can be expressed as a ratio of a maximum response rate and a minimum response rate.

2. The information-processing apparatus according to claim 1, wherein said information-processing apparatus further comprises transmission means for transmitting contents selected by said select means to any of said information-processing terminals.

3. The information-processing apparatus according to claim 1, wherein said computation means computes an expected value of any one of said information-processing terminals from results of a test transmission carried out for said information-processing terminal.

4. The information-processing apparatus according to claim 1, wherein, for any specific one of said information-processing terminals, said select means selects a content whose expected value computed by said computation means.

5. The information-processing apparatus according to claim 1, wherein said expected value is a probability of a response expected to be received from any one of said information-processing terminals or an expected response rate of responses received from said information-processing terminals.

6. The information-processing apparatus according to claim 1, wherein said expected value is a predicted probability of a response.

7. The information-processing apparatus according to claim 1, wherein said contents are different from each other because some text parts are modified.

8. The information-processing apparatus according to claim 1, wherein said contents are each an electronic mail or a web banner advertisement.

9. The information-processing apparatus according to claim 1, wherein said contents each include hyperlink information.

10. The information-processing apparatus according to claim 9, wherein said computation means computes said expected value on the basis of click information of said hyperlink information.

11. An information-processing method comprising:
computing an expected value of a response transmitted by a plurality of information-processing terminals in response to each of a plurality of contents transmitted to said information-processing terminals; and selecting some of the plurality of contents to be transmitted to each of said information-processing terminals based on said expected value computed for each of said contents, wherein said information-processing terminals comprise at least a pair of terminals used by independent users, each user having independent preferences, wherein said plurality of contents includes user specific information relating to each of said information-processing terminals, wherein the computing step computes said expected value by regular extraction based on a formula, wherein said formula is one of a linear association expression, a nueral network, a signoid function, a rule form of a conditional, a decision tree model, or a statistical techniciue based on a linear model, a discriminative analysis, a logistic recurssion/regression, or a cluster analysis, wherein said linear association expression is a linear expression of a sum of terms which are each a product of a numerical data denoting each user's independent preferences and a coefficient denoting the plurality of transmitted contents, and wherein said expected value can be expressed as a ratio of a maximum response rate and a minimum response rate.

12. A method, stored on a computer-readable medium, comprising:
computing an expected value of a response transmitted by a plurality of information-processing terminals in response to each of a plurality of contents transmitted to said information-processing terminals; and selecting some of the plurality of contents to be transmitted to each of said information-processing terminals based on said expected value computed for each of said contents, wherein said information-processing terminals comprise at least a pair of terminals used by independent users, each user having independent preferences, wherein said plurality of contents includes user specific information relating to each of said information-processing terminals, wherein the computing steps computes said expected value by regular extraction based on a formula, wherein said formula is one of a linear association expression, a nueral network, a sigmoid function, a rule form of a conditional, a decision tree model, or a statistical technique based on a linear model, a discriminative analysis, a logistic recurssion/regression, or a cluster analysis, wherein said linear association expression is a linear expression of a sum of terms which are each a product of a numerical data denoting each user's independent preferences and a coefficient denoting the plurality of transmitted contents, and wherein said expected value can be expressed as a ratio of a maximum response rate and a minimum response rate.

13. An information-processing apparatus comprising:
computation means for computing an expected value of a response transmitted by a plurality of information-processing terminals in response to each of a plurality of contents transmitted to said information-processing terminals;

first producing means for producing a first assessment information on a set of largest expected values computed by said computation means for said responses transmitted by said information-processing terminals in response to said plurality of contents based on said set of largest expected values which are each computed by said computation means for one of said contents; and second producing means for producing a second assessment function of said set of largest expected values computed for all said contents including user specific information relating to each of said information-processing terminals by synthesizing pieces of said assessment information which are each produced by said first producing means for one of said contents, wherein said information-processing terminals comprise at least a pair of terminals used by independent users, each user having independent preferences, wherein said plurality of contents includes user specific information relating to each of said information-processing terminals, wherein said computation means computes said expected value by regular extraction based on a formula, wherein said formula is one of a linear association expression, a nueral network, a sigmoid function, a rule form of a conditional, a decision tree model, or a statistical technique based on a linear model, a discriminative analysis, a logistic recurssion/regression, or a cluster analysis, wherein said linear association expression is a linear expression of a sum of terms which are each a product of a numerical data denotina each user's independent preferences and a coefficient denoting the plurality of transmitted contents, wherein said expected value can be expressed as a ratio of a maximum response rare and a minimum response rate, and wherein said response transmitted in response to each of the plurality of contents may be a selective transmission or a random transmission.

14. An information-processing method comprising:

computing an expected value of a response transmitted by a plurality of information-processing terminals in response to each of a plurality of contents transmitted to said information-processing terminals;

producing assessment information on a set of largest expected values for said responses transmitted by said information-processing terminals in response to said contents based on said set of largest expected values each computed for one of said contents; and producing an assessment function of said set of largest expected values for all said contents by synthesizing pieces of said assessment information each produced for one of said contents, wherein said information-processing terminals comprise at least a pair of terminals used by independent users, each user having independent preferences, wherein said plurality of contents includes user specific information relating to each of said information-processing terminals, wherein the computing step computes said expected value by regular extraction based on a formula, wherein said formula is one of a linear association expression, a nueral network, a sigmoid function, a rule form of a conditional, a decision tree model, or a statistical techniciue based on a linear model, a discriminative analysis, a logistic recurssion/regression, or a cluster analysis, wherein said linear association expression is a linear expression of a sum of terms which are each a product of a numerical data denoting each user's indenendent preferences and a coefficient denoting the plurality of transmitted contents.

wherein said expected value can be expressed as a ratio of a maximum response rate and a minimum response rate, and wherein said response transmitted in response to each of the plurality of contents may be a selective transmission or a random transmission.

15. A method, stored on a computer-readable medium, comprising:

computing an expected value of a response transmitted by a plurality of information-processing terminals in response to each of a plurality of contents transmitted to said information-processing terminals;

producing assessment information on a set of largest expected values for said responses transmitted by said information-processing terminals in response to said contents based on said set of largest expected values each computed for one of said contents; and producing an assessment function of said set of largest expected values for all said plurality of contents by synthesizing pieces of said assessment information produced for each one of said plurality of contents, wherein said information-processing terminals comprise at least a pair of terminals used by independent users, each user having independent preferences, wherein said plurality of contents includes user specific information relating to each of said information-processing terminals, wherein the computing step computes said expected value by regular extraction based on a formula, wherein said formula is one of a linear association expression, a nueral network, a sigmoid function, a rule form of a conditional, a decision tree model, or a statistical technique based on a linear model, a discriminative analysis, a logistic recurssion/regression, or a cluster analysis, wherein said linear association expression is a linear expression of a sum of terms which are each a product of a numerical data denotina each user's independent preferences and a coefficient denoting the plurality of transmitted contents, wherein said expected value can be expressed as a ratio of a maximum response rate and a minimum response rate, and wherein said response transmitted in response to each of the plurality of contents may be a selective transmission or a random transmission.

* * * * *